United States Patent
Hudman et al.

(10) Patent No.: US 11,561,578 B2
(45) Date of Patent: Jan. 24, 2023

(54) ADJUSTABLE HEAD-MOUNTED DISPLAY

(71) Applicant: Valve Corporation, Bellevue, WA (US)

(72) Inventors: Joshua Mark Hudman, Issaquah, WA (US); Clement Gallois, Seattle, WA (US); Montgomery Vincent Goodson, Kirkland, WA (US); Eric James Hope, Bellevue, WA (US); Carl Samuel Conlee, IV, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 92 days.

(21) Appl. No.: 17/021,822

(22) Filed: Sep. 15, 2020

(65) Prior Publication Data
US 2021/0080996 A1 Mar. 18, 2021

Related U.S. Application Data

(60) Provisional application No. 62/901,471, filed on Sep. 17, 2019.

(51) Int. Cl.
*G06F 1/16* (2006.01)

(52) U.S. Cl.
CPC ............ *G06F 1/163* (2013.01); *G06F 1/1679* (2013.01)

(58) Field of Classification Search
CPC ........ G06F 1/163; G06F 1/1679; G06F 3/011; A42B 3/042
See application file for complete search history.

(56) References Cited

U.S. PATENT DOCUMENTS

| | | | | |
|---|---|---|---|---|
| 5,321,416 A * | 6/1994 | Bassett | .................. | A42B 3/145 348/121 |
| 5,954,642 A * | 9/1999 | Johnson | ............. | G02B 27/0176 600/300 |
| 9,964,770 B2 * | 5/2018 | Guo | .................... | G02B 27/0176 |
| 10,251,289 B2 * | 4/2019 | Chen | .................. | G02B 27/0176 |
| 10,845,604 B2 * | 11/2020 | Morimoto | ............ | G02B 27/017 |
| 11,166,513 B2 * | 11/2021 | King | ...................... | A42B 3/145 |
| 2011/0127305 A1 | 6/2011 | Yates | | |
| 2016/0363772 A1 | 12/2016 | Miller et al. | | |
| 2018/0295733 A1 * | 10/2018 | Wen | ...................... | H05K 5/0086 |
| 2018/0307282 A1 * | 10/2018 | Allin | ....................... | G06F 1/203 |
| 2018/0321707 A1 * | 11/2018 | Hu | ........................... | G02C 5/22 |

OTHER PUBLICATIONS

PCT Search Report and Written Opinion dated Dec. 22, 2020 for PCT Application No. PCT/US20/50957, 16 pages.
International Preliminary Report on Patentability for PCT Application No. PCT/US20/50957, dated Mar. 31, 2022, 12 pages.

* cited by examiner

*Primary Examiner* — Rockshana D Chowdhury
(74) *Attorney, Agent, or Firm* — Lee & Hayes, P.C.

(57) ABSTRACT

A head-mounted display including a front, a back, a first actuator, a second actuator, a first adjustable member extending between the front and the back and operably engaging the first actuator, and a second adjustable member extending between the front and the back and operably engaging the second actuator. The first adjustable member and the second adjustable member may be adjustable in length via the second actuator to vary a gap distance between the front and the back. In some embodiments, the head-mounted display may include a wire routing assembly for routing wire(s) between the front and the back of the head-mounted display. Additionally, in some embodiments, the head-mounted display may include a harness for engaging a user.

29 Claims, 38 Drawing Sheets

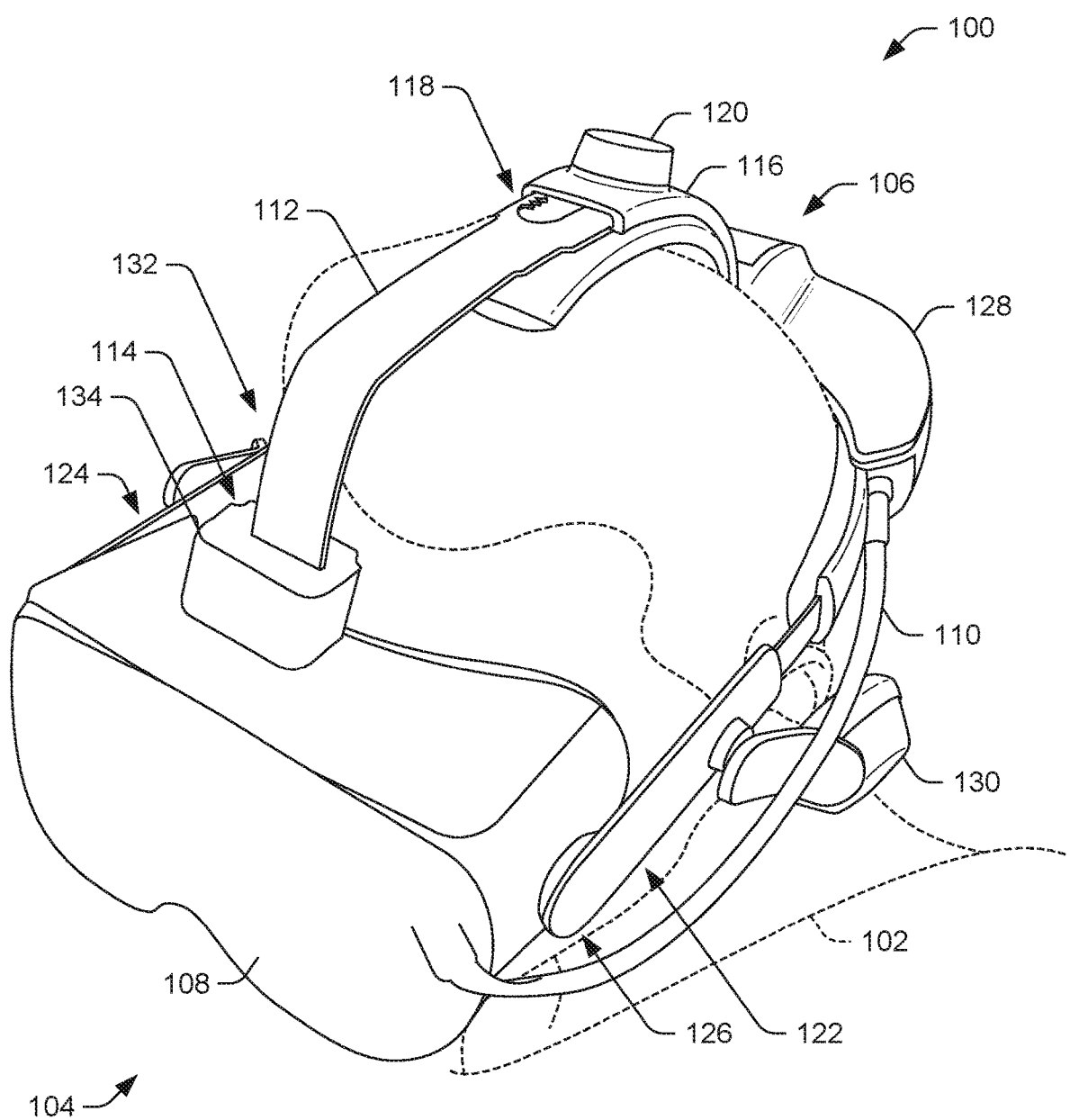
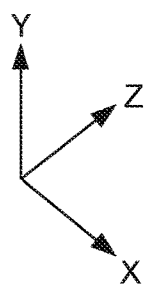
FIG. 1

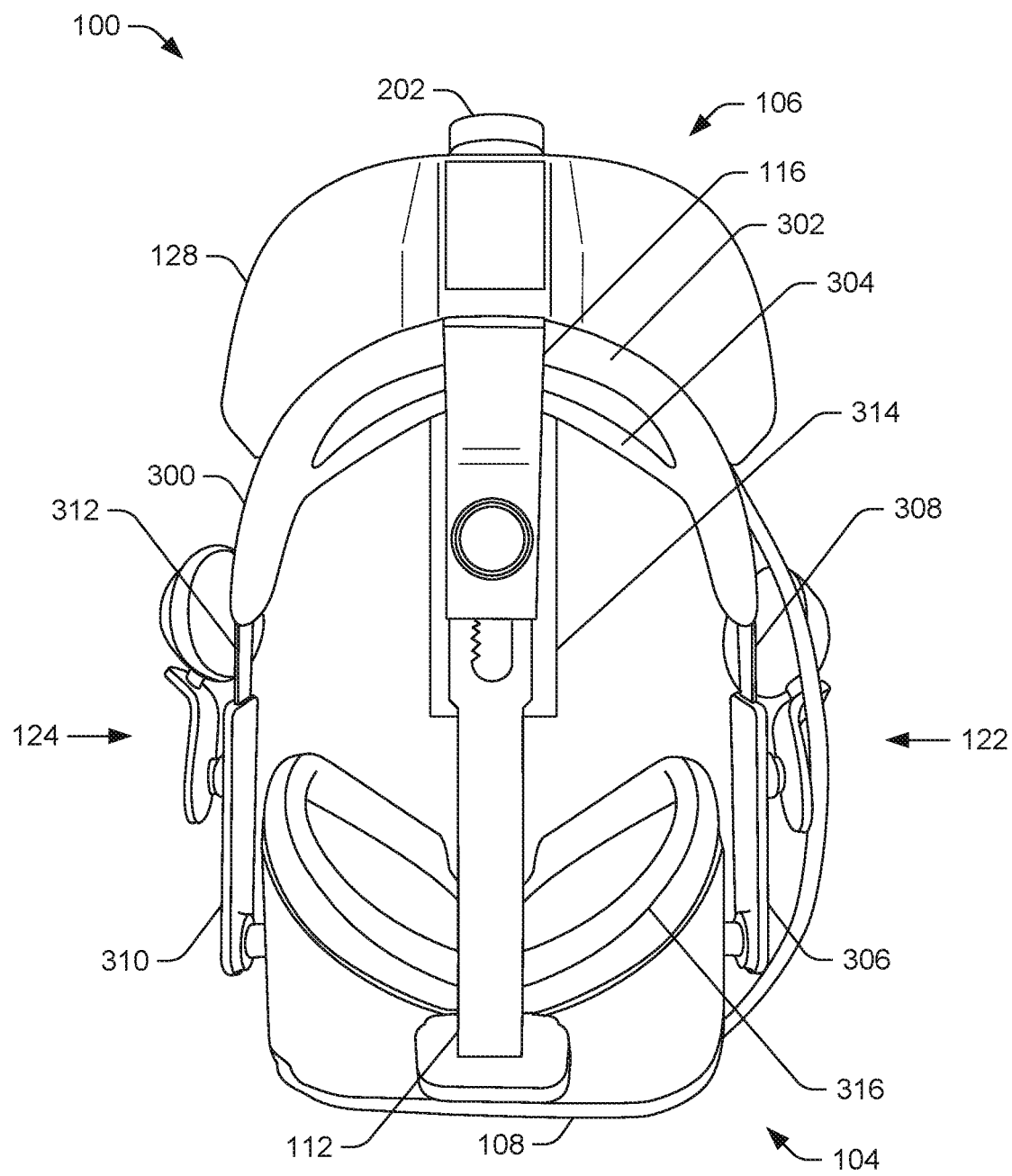
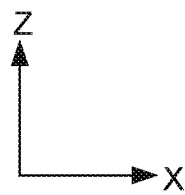

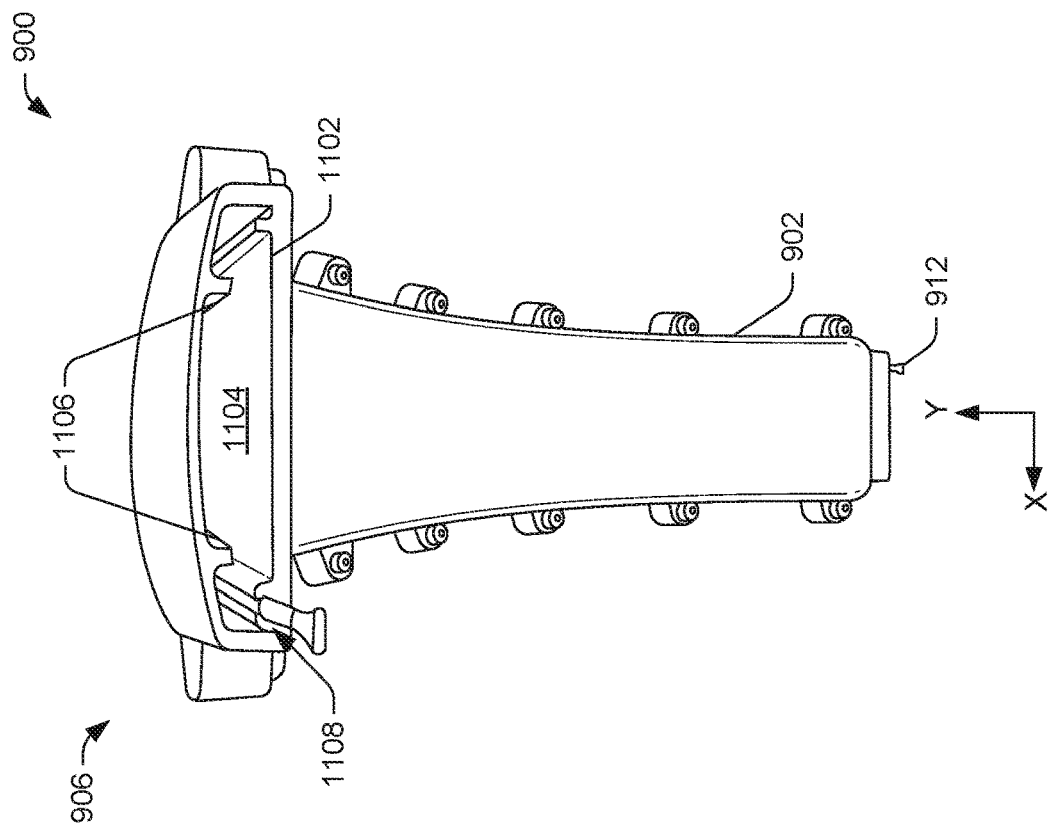
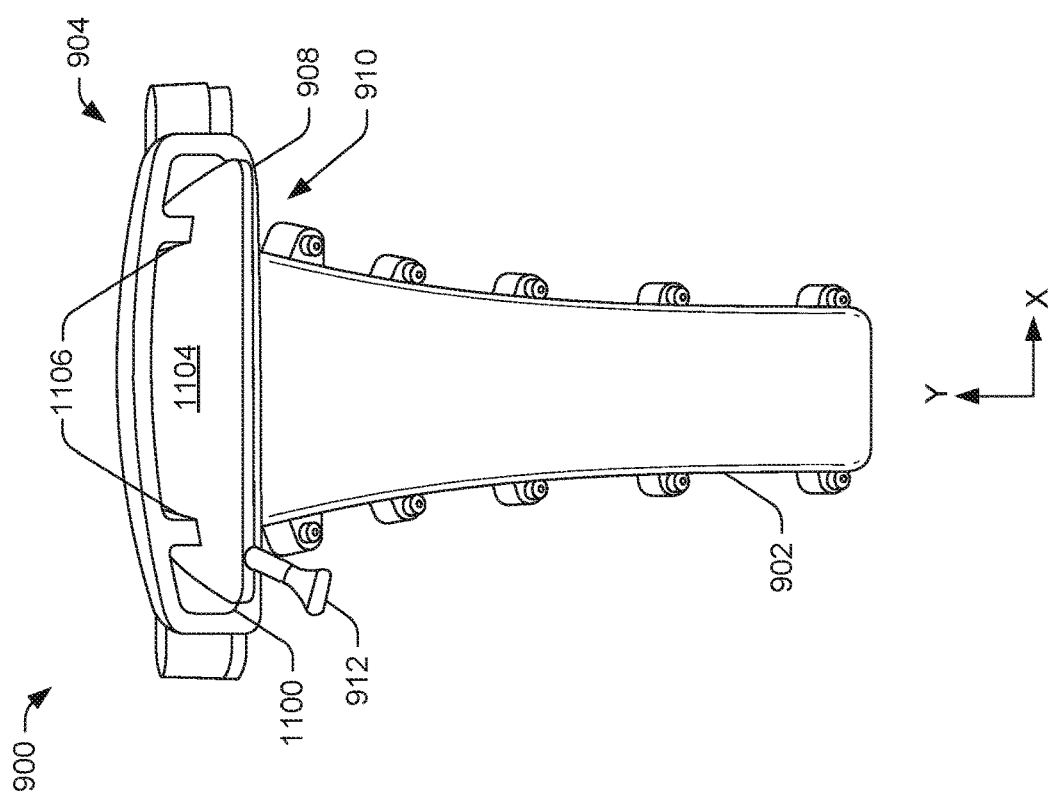

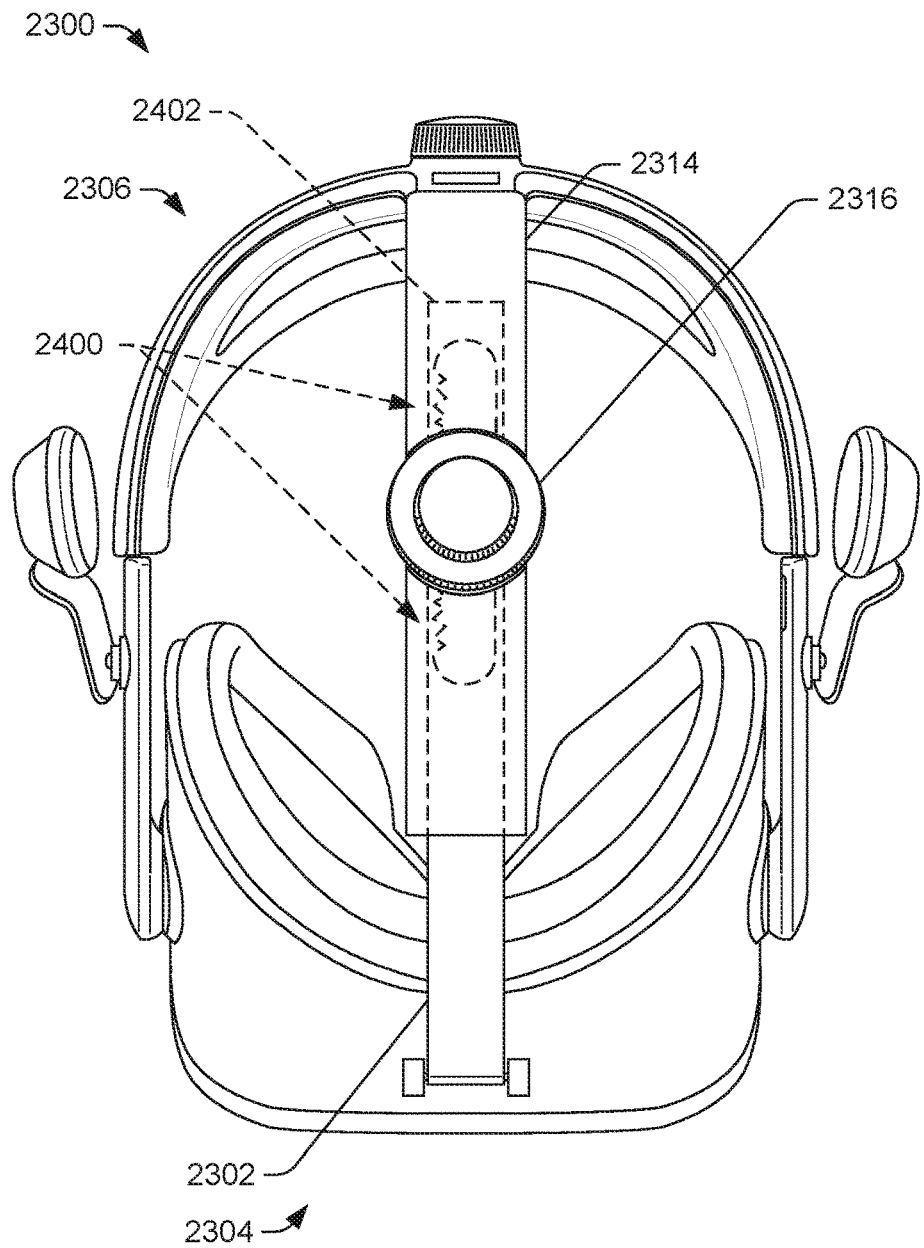
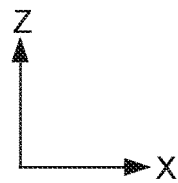
FIG. 24

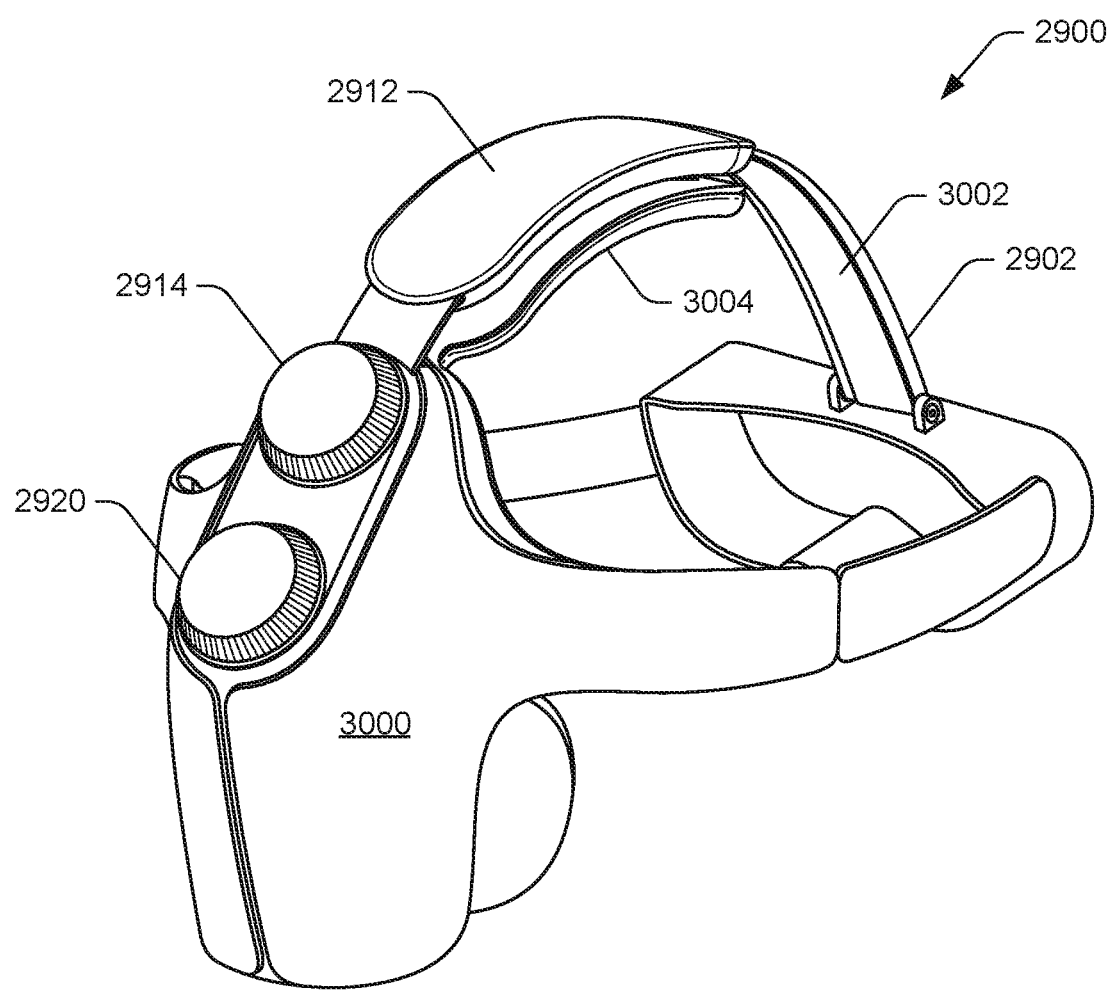
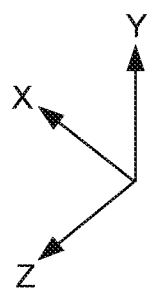
FIG. 30

ADJUSTABLE HEAD-MOUNTED DISPLAY

CROSS REFERENCE TO RELATED APPLICATIONS

This application claims priority to U.S. Provisional Application No. 62/901,471, filed Sep. 17, 2019, entitled "Adjustable Head-Mounted Display," the entirety of which is herein incorporated by reference.

BACKGROUND

Head-mounted displays are used in various fields, including engineering, medical, military, and video gaming. In some instances, head-mounted displays may present information or images to a user as part of a virtual reality or augmented reality environment. As an example, while playing a video game, a user may wear a head-mounted display to immerse the user within a virtual environment.

Conventional head-mounted displays provide inadequate or no adjustment to accommodate differing head sizes and/or adjust a tightness of the head-mounted display on the user. As a result, some users may find it difficult to enjoyably wear head-mounted displays. For instance, if too snug, the head-mounted display may be uncomfortable to wear. Alternatively, if too loose, the head-mounted display may not properly secure to the user. Conventional head-mounted displays may therefore fail to provide adequate mechanisms to accommodate for different users, permit quick and convenient adjustment, and/or properly and comfortably wear head-mounted displays.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

FIG. 1 illustrates a front perspective view of a user wearing an example head-mounted display, according to an embodiment of the present disclosure.

FIG. 3 illustrates a top view of the example head-mounted display of FIG. 1, according to an embodiment of the present disclosure.

FIG. 11A illustrates a first end view of the example wire routing assembly of FIG. 9, according to an embodiment of the present disclosure.

FIG. 11B illustrates a second end view of the example wire routing assembly of FIG. 9, according to an embodiment of the present disclosure.

FIG. 24 illustrates a top view of the example head-mounted display of FIG. 23, according to an embodiment of the present disclosure.

FIG. 30 illustrates a rear perspective view of the head-mounted display of FIG. 29, according to an embodiment of the present disclosure.

DETAILED DESCRIPTION

Figure 2:
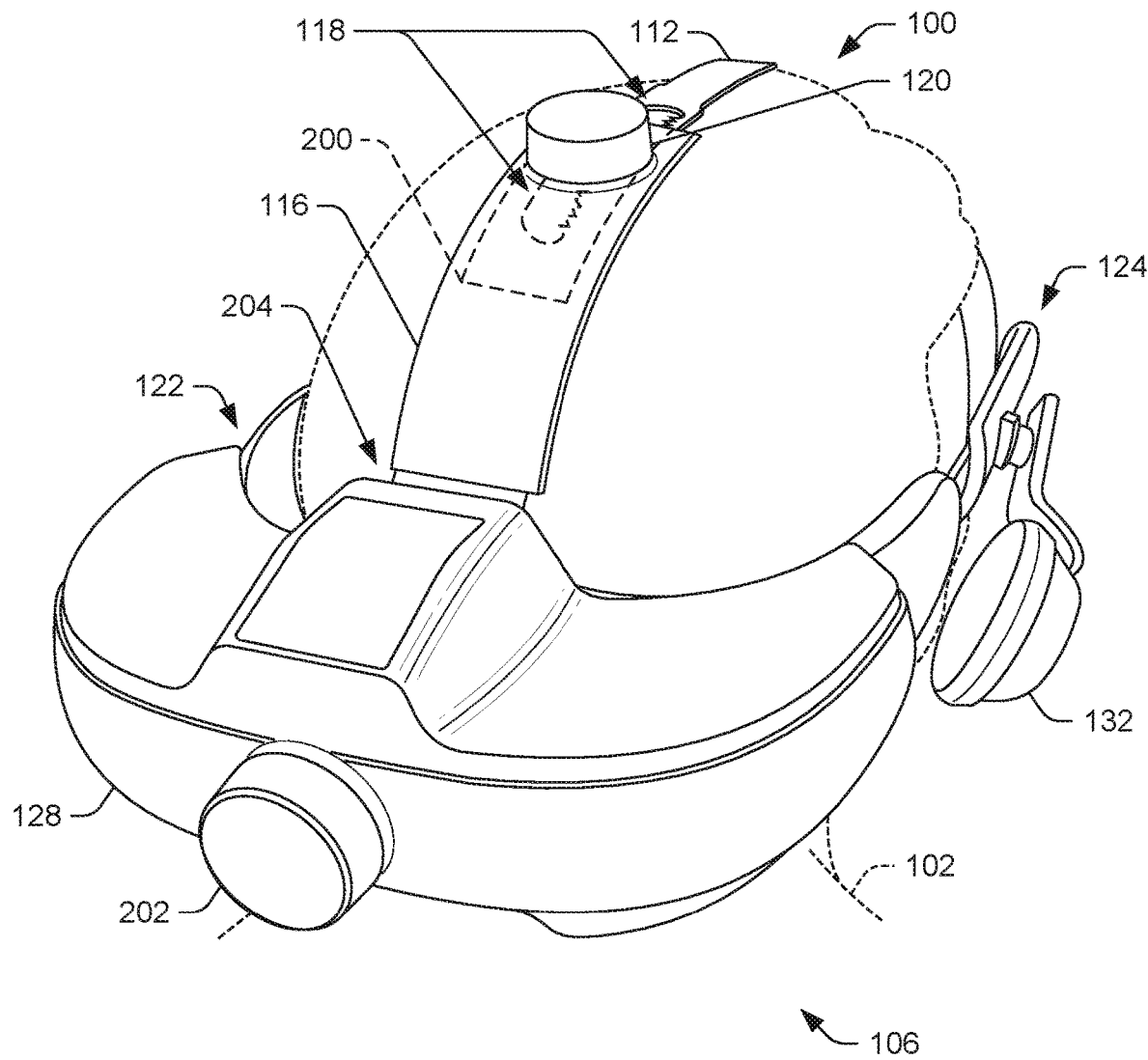
FIG. 2 illustrates a rear perspective view of the user wearing the example head-mounted display of FIG. 1, according to an embodiment of the present disclosure.

As mentioned above, head-mounted displays (HMDs) have a wide range of applications and in some instances, may need to accommodate for varying head sizes among different users. Conventional HMDs, however, offer little to no adjustment to adapt to different users and/or incrementally fasten and loosen the HMD to the user. For instance, conventional HMDs may use elastic or hook and loop straps to secure the HMD to the head of the user. Such mechanisms, however, are fairly crude and rudimentary and users may find it difficult to adjust HMDs on-the-fly and/or in small increments. As such, the HMD may not securely mount to the user and/or the user may spend time readjusting or retightening the HMD. Such alterations, however, may detract from the utility of HMDs and/or may negatively affect user experiences. Additionally, failing to properly secure or mount the HMD may impact a quality of images presented in virtual reality (VR) and/or augmented reality (AR) environments, for instance. Traditional HMDs may also include wires, cables, or other cords that may tangle or increase a bulkiness of the HMD. Accordingly, HMDs may be uncomfortable and/or inconvenient to wear for extended periods of time.

This application describes, in part, a HMD that snuggly, comfortably, and securely fits around or mounts to a head of a user. In some instances, the HMD according to the instant application may take many forms, including helmets, visors, goggles, masks, glasses, and other head or eye wear worn on the head of the user. The HMD may include a front having a display worn on the face, adjacent to the eyes, of the user that outputs images (or other content) for viewing by the user. In some instances, the images may be output by an application or computing device (e.g., video game console) communicatively coupled to the HMD. Additionally, in some instances, the user may operate a handheld-controller in conjunction with the HMD to further engage the user in VR or AR environments.

A back of the HMD may include a basket, cradle, support, frame, or harness configured to secure around a back of the head of the user. In some instances, the harness may engage under and/or with the occipital lobe, thereby clutching the back of the head of the user and securing the HMD to the user. In some instances, the harness, or portions of the harness, may be spring-loaded or tension-loaded to maintain constant pressure on the back of the head. Such pressure may assist in fastening the HMD to the user through ergonomically conforming to the head. Additionally, or alternatively, the harness may include one or more ball joints for conforming to the head of the user. For example, the harness may couple to portions of the HMD via a ball joint (e.g., a rear housing) for articulating about one or more axis to comfortably position the harness on the head. Still, in some instances, the harness may include different material thicknesses and/or voids for providing flexure about one or more axes. This multi-axis flexure may allow the harness to evenly distribute forces against the back of the head for securing the HMD to the user.

In some instances, the harness may include a portion that engages with the head of the user above the occipital lobe and which circumferentially and/or radially extends around at least a portion of the head of the user. In some instances, the HMD may also include harness(es) that engage with a top of the head of the user. Accordingly, in some instances, the HMD may include multiple portions designed to engage with different, or respective, portions of the head of the user. For instance, first portion of the HMD may engage with head of the user below the occipital lobe, a second portion of the HMD may engage with the head of the user above the occipital lobe, and/or a third portion may engage along the top of the head of the user. The portions of the HMD may coordinate to secure and/or mount the HMD to the head of the user.

The HMD may adjust and accommodate for varying head sizes among users and/or may incrementally tighten and loosen the HMD to the user. For instance, the HMD may include strands, cords, sections, straps, bands, or other members that operably couple the front of the HMD and the back of the HMD. The members may engage with mechanisms, fasteners, fixtures, or actuators that are actuatable to secure and release the HMD to the user. As an example, the members may include attachment mechanisms or adjustable elements such as teeth, connectors, slits, tabs, notches, tabs, and/or other slots that extend along a portion of the length of the member and which engage with the actuators. The actuators may include mechanisms that are configured to engage with the slots, for instance, at different portions along the length of the member to tighten and loosen the HMD from the head of the user. For instance, the actuators may include attachment mechanisms or adjustable elements such as dials, levers, wheels, slides, buckles, arms, and/or knobs.

In some instances, the engagement between the members and the actuators may resemble ratchet mechanisms, slide and lock mechanisms, friction mechanisms, etc. Through this engagement, and through actuating (e.g., pulling, twisting, rotating, etc.) the actuators, the length of the members may be adjusted. For instance, the user may actuate the actuators to adjust the length of the members and position the HMD relative to the eyes of the user and/or increase and decrease a tightness of the HMD on the user. The actuators may increase or decrease a distance or gap distance interposed between the front of the HMD and the back of the HMD. As such, the user may be provided the option to adjust the distance between the front and the back of the HMD to allow the user to incrementally tighten the HMD to a desired position or tightness. In some instances, the actuators may adjust the members to, but not beyond, a maximum extension, and decreased down to, but not below, a minimum extension.

As an example, the actuators may include a rotatable knob having gears that engage with slots positioned along a portion of a length of the members. Biasing (e.g., rotating) the actuators in a first direction may cause the members to retract, thereby shortening in length and tightening the HMD to the user. When tightened, the front and the back of the HMD may extend or transition inward, together, or towards one another to exert pressure on the head of the user to hold the HMD in place. Biasing (e.g., rotating) the actuators in a second, potentially opposite direction, may cause the members to extend or move outward or away from one another, thereby increasing in length and loosening the HMD from the user. The members and the actuators may therefore operably couple, interact, interconnect, or otherwise engage to secure and/or mount the HMD to the user. The actuators may also allow the user to conveniently adjust the HMD on-the-fly and/or incrementally tighten and loosen the HMD.

In some instances, the HMD according to the instant application may include multiple members to secure and/or mount the HMD to the user and multiple actuators that operably engage with respective members. For instance, the HMD may include one or more lateral members that extend between the front of the HMD and the back of the HMD, at opposing sides of the HMD. A first end of one or more lateral members may hingedly, rotatably, or pivotably couple to the display worn on the face of the user, while a second end of the one or more lateral members may extend towards the back into a housing of the HMD and engage with one or more rear actuators. The one or more lateral members may be engageable with the one or more rear actuators at different positions along the length of the one or more lateral members to allow the length to be increased or decreased, thereby loosening or tightening the HMD to user.

Additionally, or alternatively, the HMD may include one or more top members that extend between the front of the HMD and the back of the HMD, at a top of the HMD. A first end of the one or more top members may couple to a top of the display, while a second end of the one or more top members may extend towards the back of the HMD and engage with one or more top actuators. The one or more top members may be engageable with the one or more top actuators at different positions along the length of the one or more top members to allow the length to be increased or decreased, thereby loosening or tightening the HMD to user, respectively.

Accordingly, when the HMD is worn by the user, the one or more lateral members may extend alongside opposing sides of the head of the user, adjacent to the ears of the user, while the one or more top members may extend along the top of the head of the user. In this sense, the one or more lateral members and the one or more top members, when tightened, may be utilized to secure the HMD to the head of the user in multiple directions and the HMD may engage or mount to respective portions of the user. The one or more lateral members and the one or more top members may therefore assist in holding the HMD in a desired location. However, the HMD may include other members designed to engage with different portions of the user other than those discussed herein.

The actuators may be conveniently located on the HMD and may be conveniently actuated by the user to loosen or tighten the HMD. For instance, an actuator to bias the one or more lateral members may be located at the back of the HMD, while an actuator to bias the one or more top members may be located on the top of the HMD. In some instances, the one or more actuators may be centrally aligned on the HMD. However, in some instances, the top actuator and/or the rear actuator may be located proximate to each other, such as at back of the HMD. Such positioning may locate the top actuator and the rear actuator close to one another for user convenience.

In some instances, the HMD may include one or more wire routes or assemblies that channel wires between the front and the back of the HMD. For instance, the back of the HMD may include a compartment having wireless transceivers, a battery, microphones, input/output devices, and/or other components to permit operation of the HMD. In some instances, the front may include the display and/or an antenna. One or more cables may communicatively couple the front and back of the HMD to provide power, information signals, or images to be output on the display. In some instances, wires, optical fibers, and/or cables may route through the one or more wire routes to alleviate potential issues with wires becoming tangled and/or detracting from an aesthetic appearance of the HMD. For instance, the wire route may include a housing and a slide that operably engages within the housing. The wire route may transition or move between an extended state and a retracted state. To extend at varying lengths, the wire route may include channels that route the wires between the front and the back of the HMD. That is, the wire may include sufficient slack (or a service loop) to allow the slide to extend at varying lengths. As an example, a wire may be disposed within or couple to portions of the wire route, such as the slide, that commutatively couples an antenna located at the front of the HMD to an antenna located at the back of the device may couple to portion on the slide and/or housing to route through the wire route. In some instances, the slide may traverse within the housing and telescopically extend to elongate and retract within the housing as the user tightens and loosens the HMD.

In some instances, the wire route and one or more top members may be integrally formed. For instance, the top member may include an embedded wire to communicatively couple the front and the back of the HMD. The top member may extend at various lengths from a sleeve via an actuation of one or more actuators. Additionally, the top member may retract within the sleeve via an actuation of the one or more actuators. Accordingly, integrally forming the top member and the wire route into a single component, for instance, may resemble a compact enclosure to couple and communicatively coupled the front and the back of the HMD.

Additionally, or alternatively, in some instances, the HMD may include a flexible printed circuit (FPC) that extends from the front to the back of the HMD and communicatively couples one or more components of the HMD. In some instances, the FPC may extend through the sleeve and/or a jacket, which in some instances, may couple or adjoin the top member and the FPC. In some instances, the FPC may include a service loop, or slack, which permits the FPC to extend and retract. In some instances, the service loop may be disposed internal to the sleeve. For example, the FPC may enter the sleeve and traverse or loop within the sleeve and exit the sleeve at an opposite end.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates an example head-mounted display (HMD) 100 positioned on or about a head of a user 102. The HMD 100 may include a front 104 and a back 106 that secure to the head of the user 102 when tightened. The front 104 may include a display 108 positioned in front or over the eyes of the user 102 to render images output by an application (e.g., a video game). In general, the display 108 may represent and/or relate to a housing within which one or more displays are housed. In some instances, the application may execute on a computing device (e.g., a personal computer (PC), game console, etc.) associated with and/or communicatively coupled to the HMD 100. The display 108 may output a series of images (frames) viewed by the user 102 through optics within the HMD 100, making the user perceive the images as if immersed in a VR or AR environment.

The back 106 of the HMD 100 may include components to carry out functions of the HMD 100, such as logic, hardware, memory, processors, batteries, and so forth. Additionally, or alternatively, in some instances, a portion or all of the components may be located at the front 104 of the HMD 100. To communicatively couple the front 104 and the back 106 of the HMD 100, the HMD 100 may include one or more wires, chords, and/or cables 110 that extend between the front 104 and the back 106. In some instances, the cables 110 may be routed along a side of the HMD 100. The cables 110 may provide signal processing, power, and other controls between the front 104 and the back 106 of the HMD 100. For instance, the back 106 of the HMD 100 may include a battery and power may route to the display 108 via the cables 110. However, the cables 110 may be routed through other portions of the HMD 100.

The HMD 100 includes supports, collars, frames, mounts, and/or other structures that attach, fasten, mount, stabilize, and/or otherwise secure the HMD 100 to the user 102. In some instances, the structures of the HMD 100 may position the display 108 relative to the eyes of the user 102. In some instances, the structures may coordinate with one another to support the weight of the HMD 100 and provide a balanced and comfortable experience when the HMD 100 is worn by the user 102. In some instances, the structures may also include curved surfaces that generally conform to contours or ergonomics of the head (or face) of the user 102.

In some instances, the HMD 100 may include multiple members and actuators that respectively engage with one another to adjust for varying head sizes and/or tighten and loosen the HMD 100 to and from the user 102. The members and/or actuators may adjust the structures of the HMD 100 to accommodate for different users and/or according to user preferences. For instance, the HMD 100 may include a top member 112 that traverses along or over a top (crown) of the head of the user 102, between the front 104 and the back 106 of the HMD 100. In some instances, the top member 112 may rest on or contact the top of the head of the user 102. In some instances, the top member 112 may include straps, bands, strips, belts, chords, or harnesses that are configured to operably vary in length (or exposed length) to tighten the HMD 100 to the user 102 and loosen the HMD 100 from the user 102. In some instances, the top member 112 may be made from materials such as plastic, metal, rubber, composites, and/or any combination thereof.

The top member 112 may include a first end 114 coupled to the display 108, or at the front 104 of the HMD 100, and a second end that extends towards the back 106 of the HMD 100 (Z-direction). As shown in FIG. 1, the second end of the top member 112 may extend into a sleeve 116, which extends from the back 106 of the HMD 100 in a direction towards the front 104 of the HMD 100 (Z-direction). The sleeve 116 may be sized and configured to receive or accept the top member 112, a portion of the top member 112, and/or the second end of the top member 112.

The top member 112 may include teeth, tabs, hooks, tabs, adjustable elements or mechanisms, or other slots 118 positioned longitudinally along a length (Z-direction), or a portion of the length, of the top member 112, between the first end 114 and the second end. Within the sleeve 116, the slots 118 may operably couple or otherwise engage with a top actuator 120. In doing so, the top member 112 may operably couple the front 104 of the HMD 100 and the back 106 of the HMD 100 or may be disposed between the front 104 and the back 106 of the HMD 100. That is, the top member 112 may couple to the front 104 at the first end 114 via the display 108, and may couple to the back 106 of the HMD 100 via the top member 112 and/or the second end of the top member 112 engaging with the top actuator 120. In some instances, the top actuator 120 may resemble a dial, lever, wheel, slide, buckle, and/or knob that is actuatable (e.g., turn, twist, rotate, pull, etc.) to adjust a length of the top member 112.

The top actuator 120 may attach, mount, or otherwise couple to the sleeve 116. A first portion of the top actuator 120 may extend through the sleeve 116 to be grasped by the user 102, while a second portion of the top actuator 120 may be disposed internal to the sleeve 116 to operably engage with the slots 118 of the top member 112. For instance, the top actuator 120 may include teeth, gears (e.g., spur), a pinion, tabs, or a sprocket that engages with the slots 118. In some instances, an engagement between the top member 112 and the top actuator 120 may resemble a ratchet mechanism, a slide and lock mechanism, a female/male connector, a friction mechanism, etc. As such, the top actuator 120 may be mateable with the top member 112 at different positions along the length of the top member 112 to permit the length of the top member 112 extending from the sleeve 116 to increase or decrease.

As an example, the top actuator 120 may include a rotatable knob having a sprocket and the top member 112 may include the slots 118 sized and configured to engage with the sprocket, vice versa. Rotating the top actuator 120 in a first direction (e.g., clockwise and/or about the Y-axis) may cause the front 104 of the HMD 100 and the back 106 of the HMD 100 to move inwards and closer to one another (Z-direction), thereby decreasing a gap distance disposed between the front 104 and the back 106. The top actuator 120 may retract the top member 112 into and/or within the sleeve 116 (Z-direction) such that the HMD 100 may pull the front 104 of the HMD 100 and the back 106 of the HMD 100 inward to exert a greater force or tension against the user 102. The pressure and/or force may tighten and/or secure the HMD 100 to the user 102. Additionally, when tightened, the top actuator 120 may lock and/or maintain an engagement with the slots 118 to hold the HMD 100 in place, prevent the top member 112 from backing out of the sleeve 116, and position the HMD 100 on the user 102. Rotating the knob in a second, opposite direction (e.g., counter-clockwise and/or about the Y-axis), may cause the front 104 of the HMD 100 and the back 106 of the HMD 100 to move outward and apart from one another (e.g., Z-direction), thereby increasing a gap distance disposed between the front 104 and the back 106. In doing so, the front 104 of the HMD 100 and the back 106 of the HMD 100 to may extend apart from another, or be permitted to move apart, to exert a lesser force or tension against the user 102 to loosen the HMD 100. In this sense, when loosened, the top member 112 may extend from the sleeve 116 (Z-direction) such that the front 104 and the back 106 of the HMD 100 are allowed to move apart and the user 102 may remove the HMD 100 and/or reduce a force applied by the HMD 100.

In some instances, actuating the top actuator 120 may vertically align the display 108 relative to the eyes of the user 102. For example, extending and retracting the top member 112 may provide slack or take up slack for adjusting a vertical position of the display 108 on the face of the user 102.

While FIG. 1 illustrates the sleeve 116 as a certain length, the sleeve 116 may be longer or shorter than that shown. For instance, the sleeve 116 may be longer such that the slots 118 are encapsulated or disposed within the sleeve 116 between a fully extended state and a fully retracted state. That is, the slots 118 may be internal to the sleeve 116 such that the slots 118 are not visible from an exterior of the HMD 100. Having the slots 118 disposed within the sleeve 116 may prevent hair from becoming entangled within the slots 118 and/or the top actuator 120. Accordingly, at the various lengths the top member 112 extends and retracts within the sleeve 116, the slots 118 may be disposed within the sleeve 116.

Additionally, the HMD 100 may include one or more adjustable members that traverse laterally (Z-direction) or along sides of the head of the user 102, between the front 104 and the back 106 of the HMD 100. For instance, the HMD 100 may include a first lateral member 122 and a second lateral member 124 that extend along the side of the head of the user 102, from the front 104 of the HMD 100 towards the back 106 of the HMD 100. In some instances, the first lateral member 122 may be located on a first side (e.g., left) of the HMD 100 while the second lateral member 124 may be located on a second side (e.g., right) of the HMD 100, spaced apart in the X-direction. As shown in FIG. 1, in some instances, the first lateral member 122 and the second lateral member 124 may be disposed on opposing sides of the HMD 100, or coupled to opposing side of the display 108.

In some instances, the first lateral member 122 and the second lateral member 124 may include or represent straps, bands, strips, belts, chords, or harnesses that vary in length to tighten the HMD 100 to the user 102 and loosen the HMD 100 from the user 102. For instance, the first lateral member 122 may include a first end 126 coupled to the display 108, or at the front 104 of the HMD 100, and a second end that laterally extends towards the back 106 of the HMD 100 (Z-direction). In some instances, the first lateral member 122 and/or the second end of the first lateral member 122 may extend or move into a compartment or housing 128 located at the back 106 of the HMD 100. Similarly, the second lateral member 124 may include a first end that couples to the display 108 or at the front 104 of the HMD 100, and a second end that extends towards the back 106 of the HMD 100 (Z-direction) and into the housing 128.

In some instances, the first end 126 of the first lateral member 122 and the first end of the second lateral member 124 may pivotably or hingedly, rotatably, or pivotably attach or otherwise couple to the display 108. Pivotably coupling to the display 108 may allow the first lateral member 122 and the second lateral member 124 to maneuver, accommodate, and conform to different head sizes, or allow angular positioning of the display 108 on the user 102.

The housing 128 may be sized and configured to receive the first lateral member 122 (or the second end of the first lateral member 122) and the second lateral member 124 or the second end of the second lateral member 124). In some instances, the first lateral member 122 and the second lateral member 124 may telescopically extend into the housing 128 of the HMD 100 to permit the first lateral member 122 and the second lateral member 124 to extend from and retract within the housing 128. As will be discussed herein, the first lateral member 122 and/or the second lateral member 124 may include teeth, tabs, hooks, adjustable attachment mechanisms, and/or other slots positioned along a length, or a portion of the length, of the first lateral member 122 and the second lateral member 124. The slots of the first lateral member 122 and/or the slots of the second lateral member 124 may operably couple or otherwise engage with a rear actuator located at the back 106 of the HMD 100. The first lateral member 122 and the second lateral member 124 may therefore couple the front 104 of the HMD 100 and the back 106 of the HMD 100 or in other words, may be disposed between the front 104 and the back 106 of the HMD 100. In some instances, the first lateral member 122 and/or the second lateral member 124 may engage with the rear actuator inside the housing 128.

The rear actuator may resemble a dial, lever, wheel, slide, buckle, and/or knob that is actuatable (e.g., turn, twist, rotate, pull, etc.). The rear actuator may include teeth, gears (e.g., spur), pinion, or a sprocket that engages with the slots of the first lateral member 122 and the second lateral member 124. In some instances, the engagement between the first lateral member 122 and the second lateral member 124 and the rear actuator may resemble a ratchet mechanism, a slide and lock mechanism, a female/male connector, a friction mechanism, etc. As such, the rear actuator may be mateable with the first lateral member 122 and the second lateral member 124 at different positions along the length of the first lateral member 122 and the second lateral member 124, respectively, to permit the length of the first lateral member 122 and the second lateral member 124 to adjust via actuation of the rear actuator.

As an example, the rear actuator may include a rotatable knob having a sprocket, and the first lateral member 122 and the second lateral member 124 may include the slots (similar to the slots 118) sized and configured to engage with the sprocket. Rotating the rear actuator in a first direction (e.g., clockwise and/or about the Z-axis) may cause the front 104 of the HMD 100 and the back 106 of the HMD 100 to move inwards and closer to one another (Z-direction). When actuated in the first direction, the rear actuator may retract the first lateral member 122 and the second lateral member 124 into or within the housing 128, or towards the back 106 of the HMD 100. Retracting the first lateral member 122 and the second lateral member 124 may cause the HMD 100 to exert a greater force or tension against the user 102 to tighten the HMD 100. When tightened, the rear actuator may lock and/or maintain an engagement with the slots of the first lateral member 122 and the second lateral member 124 to hold the HMD 100 in place and position the HMD 100 on the user 102. Rotating the knob in a second, opposite direction (e.g., counter-clockwise and/or about the Z-axis), may cause the front 104 of the HMD 100 and the back 106 of the HMD 100 to move outward and apart from one another (e.g., Z-direction). In doing so, a force applied against the user 102 may reduce and the HMD 100 may loosen from the user 102. When loosened, the first lateral member 122 and the second lateral member 124 may extend from the housing 128 thereby pushing the front 104 and the back 106 of the HMD 100 apart.

Using the top actuator 120 and the rear actuator, the user 102 may position or otherwise mount the HMD 100 according to user preferences. For instance, the user 102 may be provided the ability to adjust the top member 112, the first lateral member 122, and/or the second lateral member 124 to secure the HMD 100 to the user 102 in multiple directions to accommodate for different feels and positioning of the HMD 100 on the user 102.

The HMD 100 may include loudspeakers to provide audio to the user 102. For instance, the HMD 100 may include a first loudspeaker 130 located adjacent a left ear of the user 102 and a second loudspeaker 132 located adjacent to a right ear of the user 102. As shown in FIG. 1, the first loudspeaker 130 may couple to the first lateral member 122 and the second loudspeaker 132 may couple to the second lateral member 124. As such, when the first lateral member 122 and the second lateral member 124 are extended and/or retracted, the first loudspeaker 130 and the second loudspeaker 132 may correspondingly move with the first lateral member 122 and the second lateral member 124. Additionally, in some instances, the first loudspeaker 130 and/or the second loudspeaker 132 may pivotably couple to the first lateral member 122 and the second lateral member 124, respectively, to position the first loudspeaker 130 and the second loudspeaker 132 adjacent to the left ear and the right ear of the user 102, respectively (Y-axis).

As noted above, a computing device, such as a gaming console, may be associated with the HMD 100 and may provide image data content to be presented on the display 108. Additionally, or alternatively, the user 102 may operate a handheld controller associated with content items displayed on the display 108. For instance, the user 102 may grip, hold, or grasp the handheld controller and such grips may be associated with actions in the VR environment, such as dropping objects, grabbing objects, and so forth. In some instances, the display 108 may present images on the display 108 at a refresh rate and based on receiving data from the handheld controller (e.g., proximity data indicating a grip or hand position of the user 102). To communicatively couple the HMD 100 to the computing device and/or the handheld controller, the HMD 100 may include network interfaces. The HMD 100 may communicatively couple to a network in any manner, such as by a global or local wired or wireless connection (e.g., local area network (LAN), intranet, Wi-Fi, Bluetooth, ZigBee, Z-Wave, etc.). The network(s) may therefore facilitate communication between the computing device(s), the handheld controller, and/or the HMD 100. For instance, the front 104 of the HMD 100 may include a first wireless interface or first antenna 134 and the back 106 of the HMD 100 may include a second wireless interface or second antenna disposed within the housing 128. In some instances, the HMD 100 may transmit signals or data via the first antenna 134 or the second antenna depending on which antenna is nearest or faces the computing device (e.g., gaming console).

Surfaces of the HMD 100 in contact with the user 102 may be padded and of a large enough area to comfortably distribute compression forces. Additionally, or alternatively, portions of the HMD 100 in contact with the user 102 may be shaped and/or contoured for conforming to ergonomics of the head. For instance, as the first end 126 of the first lateral member 122 and the first end of the second lateral member 124 may be proximal to the face of the user 102, or may potentially contact the face of the user 102, the first lateral member 122 and/or the second lateral member 124 may include cushioning or other padding. However, other portions of the HMD 100 may also include cushions or other padding to increase a comfort of the HMD 100.

FIG. 2 illustrates a rear perspective view of the HMD 100 being worn by the user 102. As discussed above with regard to FIG. 1, the top member 112 may operably couple to the top actuator 120 and assist in securing the HMD 100 to the user 102. For instance, the top member 112 may be disposed across or over a top of the HMD 100 or the user 102 (e.g., crown). A second end 200 of the top member 112 may extend into the sleeve 116 (Z-direction). As shown in FIG. 2, the slots 118 may engage with the top actuator 120 to tighten and loosen the HMD 100 to the user 102. That is, the top actuator 120 may be engageable at different positions of the top member 112 via an engagement with the slots. Actuating the top actuator 120 may vary an exposed length of the top member 112 external to the sleeve 116, thereby tightening and loosening the HMD 100 to the user 102. Additionally, as discussed above, while FIG. 2 illustrates the slots 118 being disposed external to the sleeve 116, in some instances, the slots 118 may be configured and/or positioned on the top member 112 such that between fully extended and fully retracted states of the top member 112 from the sleeve 116, the slots 118 are disposed internal to the sleeve 116. As such, hair may be avoided from becoming entangled with the slots 118 and/or the top actuator. Additionally, or alternatively, the slots 118 may engage with the top actuator 120 at a location more proximate to the back 106 of the HMD 100. In doing so, the slots 118 may remain within the sleeve 116 between fully retracted and fully extended state.

As shown in FIG. 2, the first lateral member 122 and the second lateral member 124 extend from the front 104 of the HMD 100 to the back 106 of the HMD 100. The first lateral member 122 and the second lateral member 124 may operably couple to a rear actuator 202 to assist in securing the HMD 100 to the user 102.

The rear actuator 202 may attach, mount, or otherwise couple to the housing 128. A first portion of the rear actuator 202 may extend external to the housing 128 to be grasped by the user 102, while a second portion of the rear actuator 202 may be disposed internal or within the housing 128 to operably engage the first lateral member 122 and the second lateral member 124. For instance, second ends of the first lateral member 122 and the second lateral member 124 may respectively route through the housing 128 to operably engage the first lateral member 122 and the second lateral member 124 with the rear actuator 202. As discussed above, the rear actuator 202 may include teeth, gears, pinion, or a sprocket that engages with slots of the first lateral member 122 and the second lateral member 124, respectively. In doing so, the rear actuator 202 may be mateable with the first lateral member 122 and the second lateral member 124 at or along different positions of the first lateral member 122 and the second lateral member 124.

In some instances, the housing 128 may include lateral arms or other members into which the first lateral member 122 and/or the second lateral member 124 extend. For example, the housing 128 may include receptacles or channels to receive the first lateral member 122 and/or the second lateral member 124. By way of example, the housing 128 may include a passageway, slot, or channel through which the first lateral member 122 and the second lateral member 124 (e.g., the second ends) traverse. As the rear actuator 202 is actuated, the first lateral member 122 and the second lateral member 124 may extend into and retract out of the housing 128 to tighten and loosen the HMD 100 to the user 102.

To permit the sleeve 116 to flex, pivot, or rotate, the sleeve 116 may pivotably or rotatably couple via a hinge 204 to the housing 128. In some instances, the hinge 204 may comprise a mechanical structure (i.e., knuckle and pin) or may include other structures, such as a piece of fabric or material, that permits the sleeve 116 to flex or rotate in X-, Y-, and/or Z-directions.

FIG. 2 also illustrates the second loudspeaker 132 coupled to the second lateral member 124.

FIG. 3 illustrates a top view of the HMD 100. In some instances, the top actuator 120 and the rear actuator 202 may be centrally aligned (Z-axis) with one another and/or centrally aligned on the HMD 100.

The HMD 100 may include a rear harness 300 for clutching, grasping, or otherwise engaging with the back of the head of the user 102. When the HMD 100 is worn by the user 102, the rear harness 300 may circumferentially or radially extend around at least a portion of a back of the head of the user 102 (X-direction). For instance, the rear harness 300 may engage sides and/or a back of the head of the user 102. In some instances, the rear harness 300 may include features, contours, and/or structures that correspond to the ergonomic shapes the user 102. The rear harness 300 may also be configured to flex in certain spots and/or locations to abut the head of the user 102 and secure the HMD 100. In some instances, the rear harness 300 may include a first portion 302 designed to engage the head of the user 102 above the occipital lobe and a second portion 304 designed to engage the head of the user 102 below the occipital lobe. The first portion 302 and/or the second portion 304 may include cushions or other materials to increase user comfort.

The first lateral member 122 and the second lateral member 124 are shown extending between the front 104 and the back 106 of the HMD 100. In some instances, the first lateral member 122 and/or the second lateral member 124 may include multiple components, portions, or sections. For instance, the first lateral member 122 may include a first section 306 hingedly, rotatably, or pivotably coupling the first lateral member 122 to the display 108. A second section 308 may couple or otherwise extend from the first section 306, towards the back 106 of the HMD 100 (Z-direction). In some instances, the first section 306 may comprise a rigid section for providing structural support, while the second section 308 may comprise a flexible, or semi-rigid section, that curves towards the back 106 of the HMD 100. As shown in FIG. 3, the second section 308 may extend into, traverse through, abut, or extend along the rear harness 300 towards the rear actuator 202. In some instances, the rear harness 300, such as the first portion 302, may include a channel, surfaces, or a passageway for the first lateral member 122 (or an end thereof) to extend into and/or along. As noted above, the rear actuator 202 may engage the first lateral member 122, such as slots included on or within the second section 308 of the first lateral member 122, and the second section 308 may arc, bend, or otherwise curve through or along the rear harness 300 to engage with the rear actuator 202. In some instances, the first lateral member 122 may extend along or into one or more both of the first portion 302 and/or the housing 128.

Similarly, the second lateral member 124 may include a first section 310 that hingedly, rotatably, or pivotably couples the second lateral member 124 to the display 108. A second section 312 may couple or otherwise extend from the first section 310, towards the back 106 of the HMD 100. In some instances, the first section 310 may comprise a rigid section for providing structural support while the second section 312 may comprise a flexible, or semi-rigid, section that curves towards the back 106 of the HMD 100. As shown in FIG. 3, the second section 312 may extend into, traverse through, abut, or extend along the rear harness 300 towards the rear actuator 202. As such, in some instances, the rear harness 300, such as the first portion 302, may include a channel, surfaces, or a passageway for the second lateral member 124 (or an end thereof) to extend. The rear actuator 202 may engage with the second lateral member 124, such as slots included on the second section 312. The second section 312 may arc, bend, or otherwise curve through or along the rear harness 300 and/or the housing 128 to engage with the rear actuator 202.

The top member 112 may also extend between the front 104 and the back 106 of the HMD 100. The HMD 100 may include a top pad 314 residing beneath the sleeve 116 and the top member 112 (Y-direction). Additionally, the top pad 314 may be sized larger than a width of the sleeve 116 and/or the top member 112 (X-direction). The top pad 314 may provide cushioning between the sleeve 116 and the user 102 and/or between the top member 112 and the user 102. The top pad 314 may also prevent hair of the user 102 becoming tangled with the slots 118 and/or the top actuator 120.

The HMD 100 may include a face cushion 316 coupled to the display 108. The face cushion 316 may be optimized to match ergonomic factors of the user 102 to wrap around a front of the head of the user 102 and seal against the face of the user 102. When the HMD 100 fastens to the user 102, the face cushion 316 may prevent light, or may substantially prevent light, permeating into an interior of the display 108. For instance, the face cushion 316 may include a deformable material that conforms to the shape of the user 102 (e.g., foam). The face cushion 316 may also include a nose recess, which may assist in placing or positioning the HMD 100 relative to the eyes of the user 102.

Figure 4:
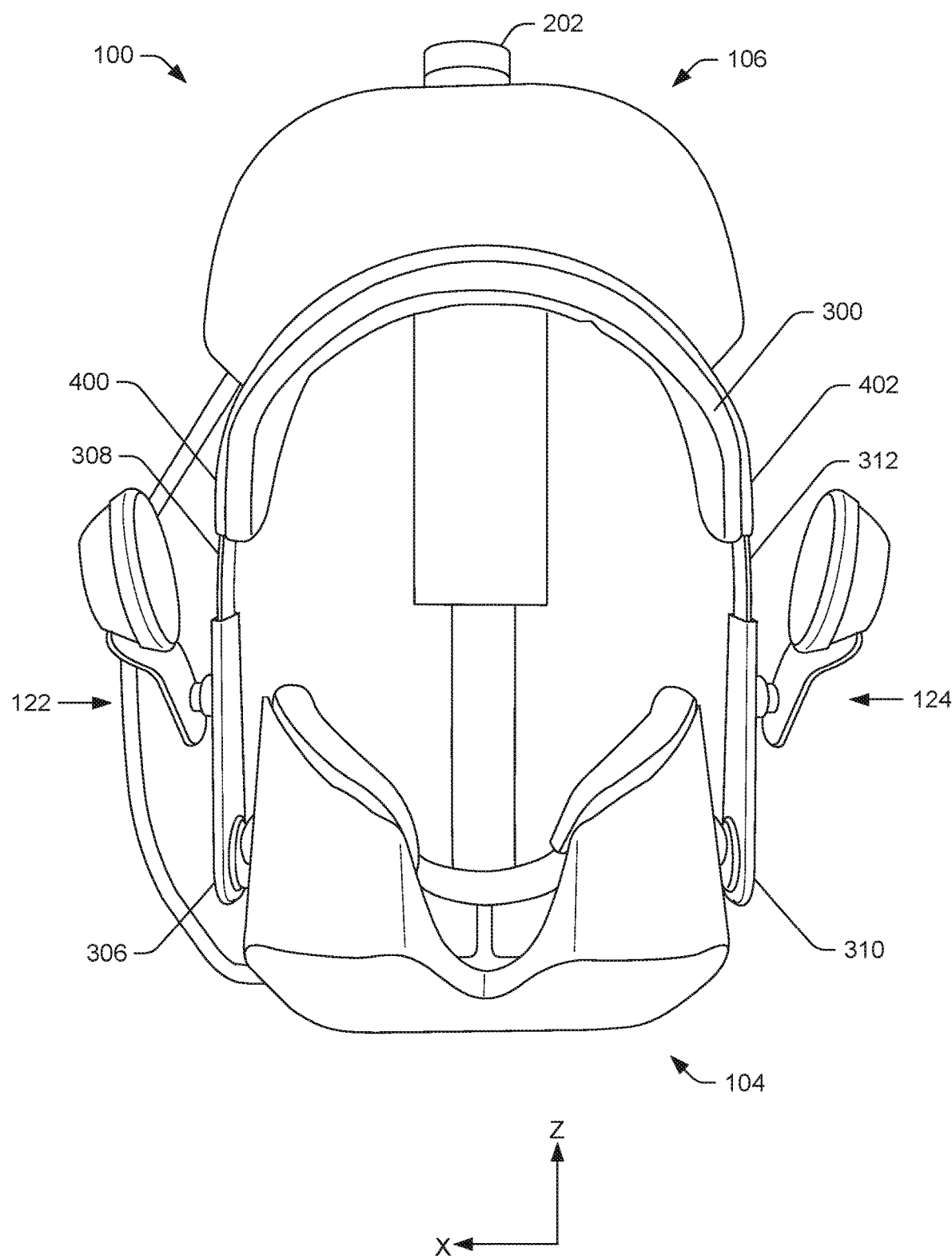
FIG. 4 illustrates a bottom view of the example head-mounted display of FIG. 1, according to an embodiment of the present disclosure.

FIG. 4 illustrates a bottom view of the HMD 100. As discussed above with regard to FIG. 3, the first lateral member 122 and the second lateral member 124 may traverse through channels within the rear harness 300 to extend towards and engage the rear actuator 202. For instance, as shown in FIG. 4, the rear harness 300 may include a first channel 400 disposed on a first side of the HMD 100 (e.g., left) and a second channel 402 disposed on a second side of the HMD 100 (e.g., right). The first channel 400 and the second channel 402 may assist in routing the first lateral member 122 and the second lateral member 124, respectively, to engage with the rear actuator 202. For instance, in some instances, the second section 308 of the first lateral member 122 may extend into the first channel 400, and the second section 312 of the second lateral member 124 may extend into the second channel 402. Actuating the rear actuator 202 may therefore engage the first lateral member 122 and the second lateral member 124 at different positions or lengths to advance the front 104 and the back 106 of the HMD 100 in the Z-direction and tighten the HMD 100 to the user 102. In other words, when tightened, a distance interposed between the first section 306 of the first lateral member 122 and an inlet of the first channel 400 may decrease, while a distance interposed between the first section 310 of the second lateral member 124 and an inlet of the second channel 402 may decrease. Actuating the rear actuator 202 in a different direction may cause the second section 308 of the first lateral member 122 and the second section 312 of the second lateral member 124 to extend from the first channel 400 and the second channel 402, respectively, to loosen the HMD 100.

Figure 5:
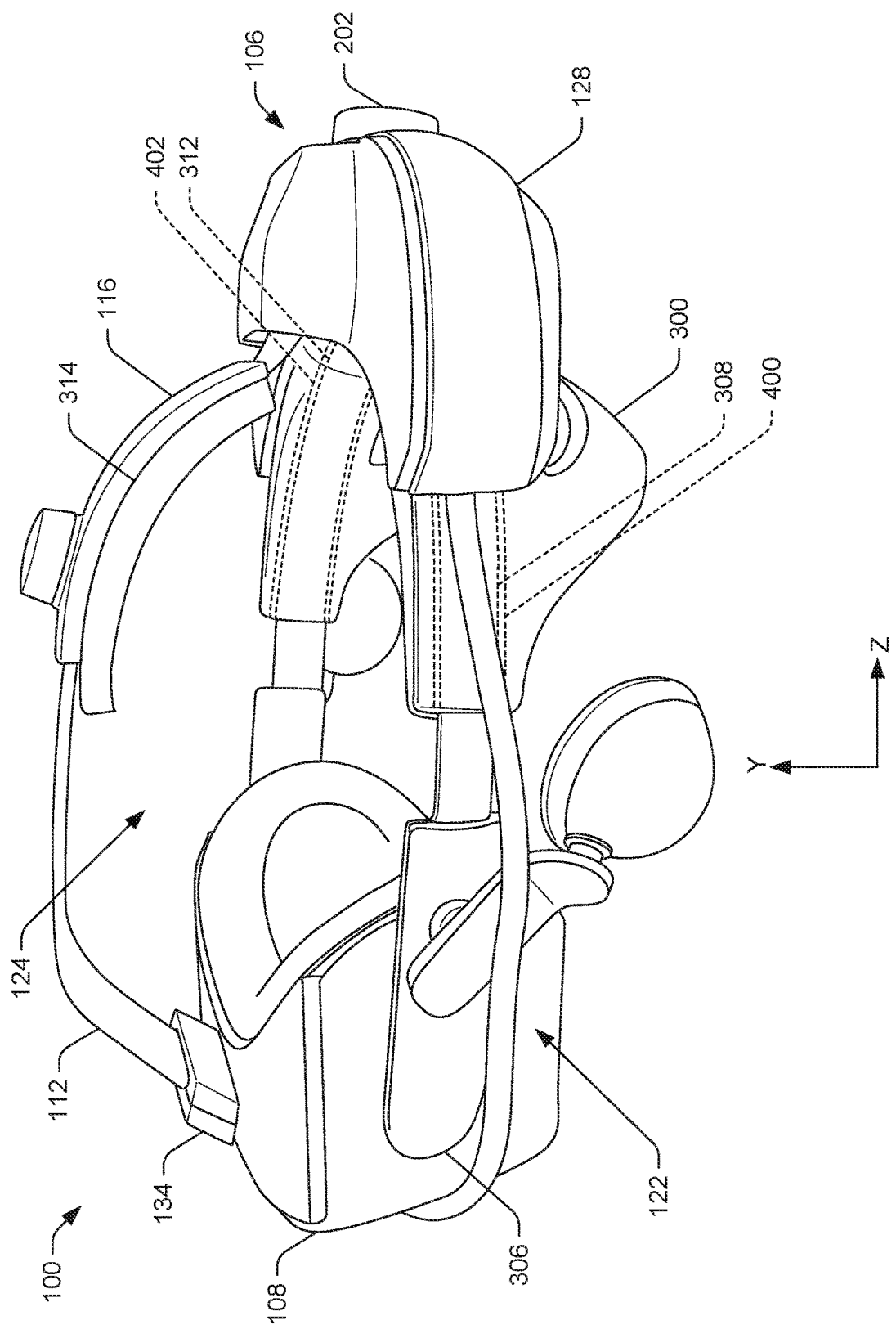
FIG. 5 illustrates a side view of the example head-mounted display of FIG. 1, according to an embodiment of the present disclosure.

FIG. 5 illustrates a side view of the HMD 100. The first section 306 of the first lateral member 122 may couple to the display 108 and the second section 308 of the first lateral member 122 may extend from the first section 306 towards the back 106 of the HMD 100. As noted above, the second section 308 of the first lateral member 122 may include a semi-rigid or flexible material to curve or warp around the back of the head of the user 102 and engage the rear actuator 202 thereby permitting the first lateral member 122 to adjust in length via the rear actuator 202. In some instances, the second section 308 may extend into the first channel 400 within, or adjacent to, the rear harness 300. For instance, FIG. 5 illustrates, in dashed lines, the second section 308 of the first lateral member 122 extending into the first channel 400 and towards the rear actuator 202. Similarly, the second section 312 of the second lateral member 124 may include a semi-rigid or flexible material to curve or warp around the back of the head of the user 102, permitting the second lateral member 124 to adjust in length when the rear actuator 202 is actuated. In some instances, the second section 312 may extend into the second channel 402 within, or adjacent to, the rear harness 300. For instance, FIG. 5 illustrates, in dashed lines, the second section 312 of the second lateral member 124 extending into the second channel 402 and towards the rear actuator 202.

FIG. 5 illustrates the top pad 314 disposed beneath the top member 112 and/or the sleeve 116 (e.g., Y-direction) to rest on the head of the user 102 when the HMD 100 is worn by the user 102. In some instances, the top member 112 may couple to the front 104 of the HMD 100, via a structure of the first antenna 134, and/or may extend through a slot of the structure of the first antenna 134.

Figure 6:
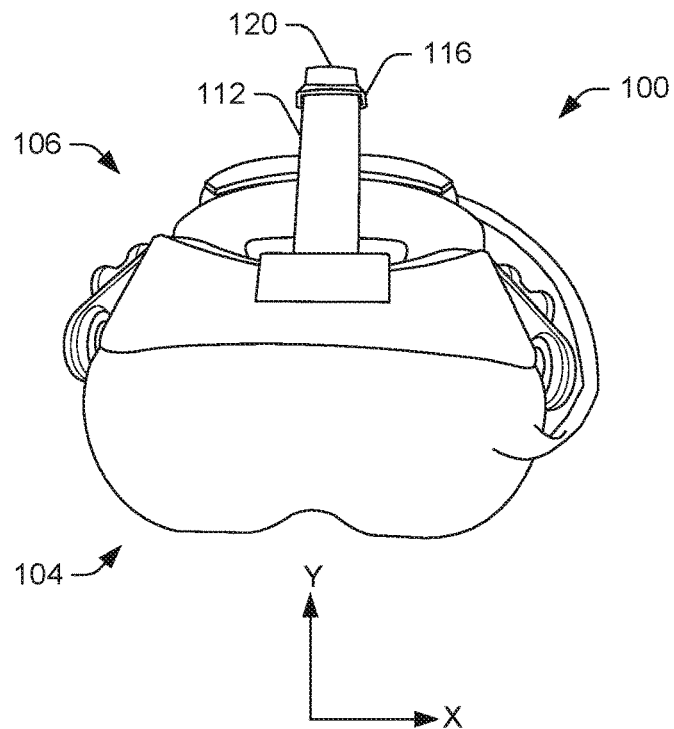
FIG. 6 illustrates a front view of the example head-mounted display of FIG. 1, according to an embodiment of the present disclosure.

FIG. 6 illustrates a front view of the HMD 100, showing the top member 112 extending between the front 104 and the back 106 of the HMD 100 and into the sleeve 116 to engage the top actuator 120, thereby permitting a length of the top member 112 to adjust and extend into and retract from the sleeve 116. In some instances, the top member 112 may be centrally aligned on the HMD 100.

Figure 7:
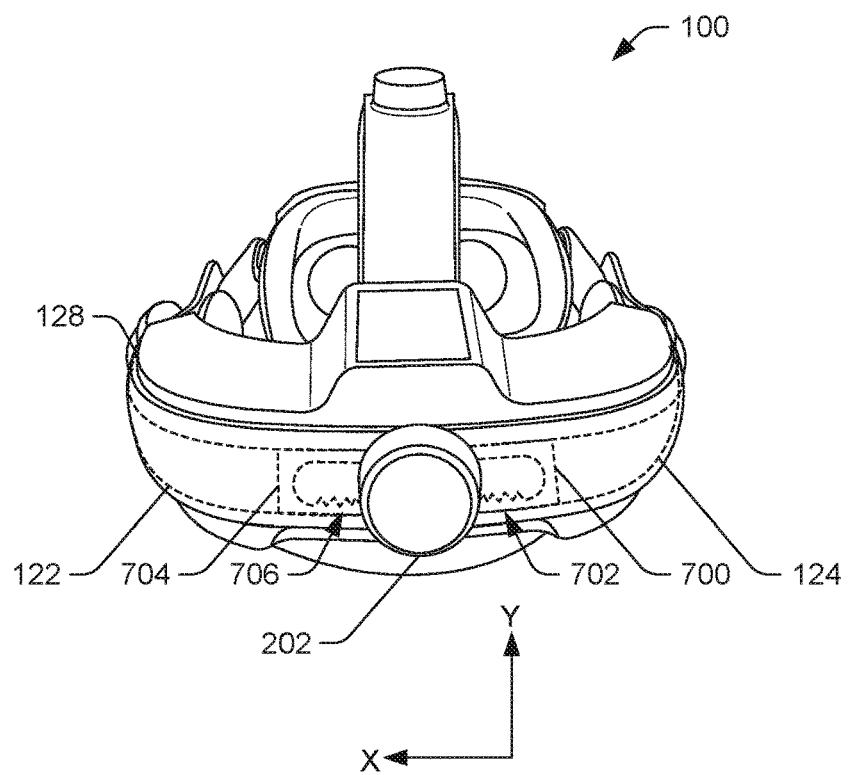
FIG. 7 illustrates a rear view of the example head-mounted display of FIG. 1, according to an embodiment of the present disclosure.

FIG. 7 illustrates a rear view of the HMD 100, showing the first lateral member 122 and the second lateral member 124 extending into, or disposed within, the housing. For instance, as discussed above, the first lateral member 122 and the second lateral member 124 may include ends or portions (e.g., a length thereof) that engage with the rear actuator 202. As shown in FIG. 7, the first lateral member 122 may include a second end 700 opposite the first end 126 coupled to the display 108. The second end 700 may represent an end or portion of the second section 308 of the first lateral member 122 that engages with the rear actuator 202. As noted above, the first lateral member 122 may include slots 702 disposed adjacent to the second end 700 of the first lateral member 122 and/or along a length of the first lateral member 122 proximal to the second end 700. The slots 702 may be complimentary to engage with mechanisms of the rear actuator 202.

Similarly, the second lateral member 124 may include a second end 704. The second end 704 may be opposite the first section 310 coupled to the display 108. The second end 704 may represent an end of the second section 312 of the second lateral member 124 that engages with the rear actuator 202. The second lateral member 124 may include slots 706 disposed adjacent to the second end 704 of the second lateral member 124 and/or along a length of the second lateral member 124 proximate to the second end 704. The slots 706 may be complimentary to engage with mechanisms of the rear actuator 202.

As shown in FIG. 7, at the back 106 the HMD 100, such as within the housing 128, the first lateral member 122 and the second lateral member 124 may crisscross or overlap. When actuated, the second ends (i.e., 700 and 704) of the first lateral member 122 and the second lateral member 124 may traverse in X-directions. For instance, when tightened, the first lateral member 122 and the second lateral member 124 may extend through the rear actuator 202. The second ends of the first lateral member 122 and the second lateral member 124 may therefore extend further away from one another (X-direction). When loosened, the first lateral member 122 and the second lateral member 124 may extend back through the rear actuator 202 and the second ends of the first lateral member 122 and the second lateral member 124 may move closer to one another (X-direction). Rotating the rear actuator 202 in one direction will increase the overlapping relationship of the second end 700 and the second end 704, while rotating the rear actuator 202 in the opposite direction will decrease the overlapping relationship. In this way, the first lateral member 122 and the second lateral member 124 may form a closed loop, whose length is adjustable to accommodate a variety of different head sizes.

The first lateral member 122 and the second lateral member 124 may uniformly extend and retract. That is, as the first lateral member 122 and the second lateral member 124 engage with the rear actuator 202, the first lateral member 122 and the second lateral member 124 may extend and retract at the same time and in the same amount.

In some instances, the first lateral member 122 and the second lateral member 124 may engage with the rear actuator 202 at any position (in the X-direction) within the housing 128 and/or the rear harness 300. For instance, the first lateral member 122 and the second lateral member 124 may engage with the rear actuator 202 at a location proximate, or adjacent to, the rear harness 300 and spaced apart from the back 106 of the HMD 100 in the Z-direction. In some instances, the first lateral member 122 and the second lateral member 124 may engage with the rear actuator 202 at a location proximate, or adjacent to, the back 106 of the HMD 100, such as beneath an exterior cover of the housing 128 at the back 106 of the HMD 100.

Figure 8A:
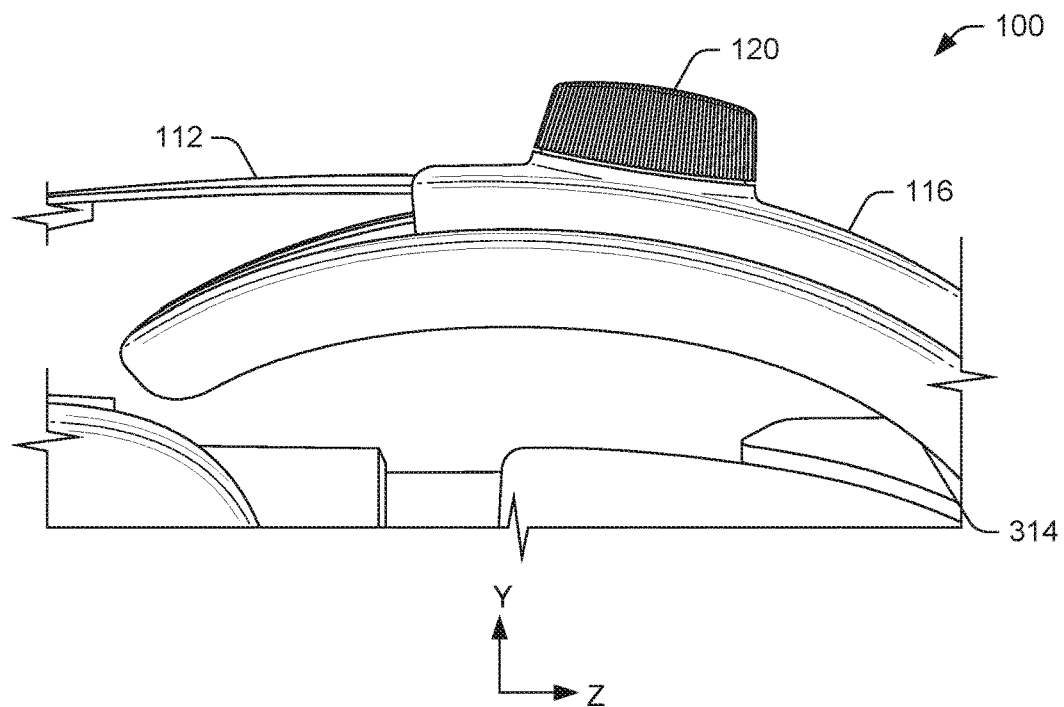
FIG. 8A illustrates a side view of an example actuator of the example head-mounted display of FIG. 1, according to an embodiment of the present disclosure.
Figure 8B:
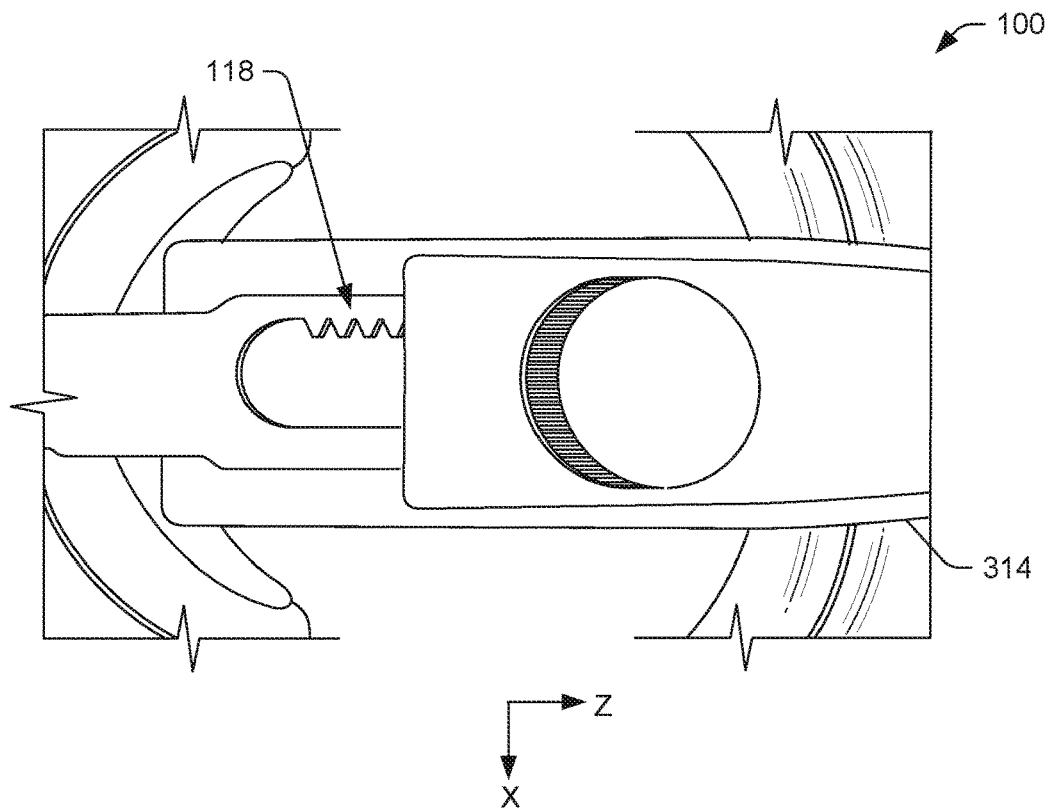
FIG. 8B illustrates a top view of the example actuator of FIG. 8A, according to an embodiment of the present disclosure.

FIGS. 8A and 8B illustrate detailed sectional views showing the engagement between the top member 112 and the top actuator 120. The top member 112 extends into the sleeve 116 (Z-direction) to operably engage the top actuator 120. For instance, as shown in FIG. 8B, the top member 112 includes the slots 118 that engage with the top actuator 120. While the slots 118 are illustrated as a series of teeth that longitudinally extend (Z-direction) along at least a portion of a length of the top member 112, the slots 118 may include any female/male mechanism to engage with a corresponding male/female mechanism of the top actuator 120. For instance, the slots 118 may resemble detents, lips, snaps, flexures, friction couplings, clips, latches, catches, or the like. The top actuator 120 may be rotated (about Y-axis) to shorten and lengthen the length of the top member 112 exposed or disposed external to the sleeve 116 to tighten and loosen the top member 112. As noted above, to accommodate and/or receive the top member 112, the sleeve 116 includes a channel or passageway that permits the top member 112 to extend into and out of the sleeve 116 (Z-direction). Moreover, the first lateral member 122 and/or the second lateral member 124 may include like features and may similarly engage with the rear actuator 202.

Figure 9:
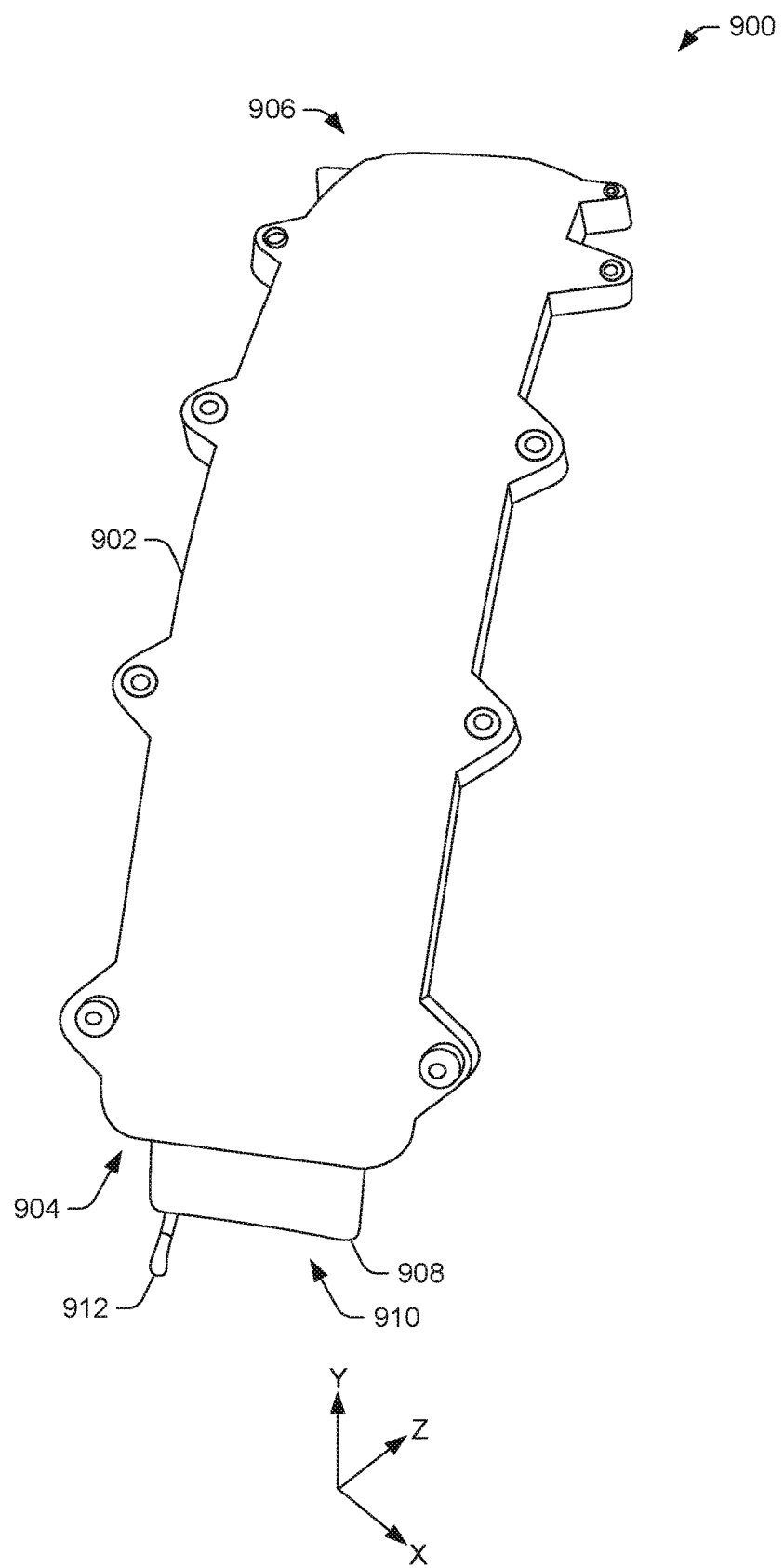
FIG. 9 illustrates a front perspective view of an example wire routing assembly usable with a head-mounted display, according to an embodiment of the present disclosure.

FIG. 9 illustrates a perspective view of a wire route 900. In some instances, the wire route 900 may be used to route one or more wires, cables, chords, or optical fibers between different portions of a HMD. For instance, the wire route 900 may route or more wires between a front of the HMD, such as the front 104 of the HMD 100, and a back of the HMD, such as the back 106 of the HMD 100.

The wire route 900 may include a housing 902 extending between a first end 904 and a second end 906. Between the first end 904 and the second end 906 the housing 902 may arc, resembling a semi-spherical, semi-circle, and/or a semi-cylindrical shape that is designed to extend over a top or crown of the head of a user.

A slide 908 operably engages with or within the housing 902 and is permitted to extend and retract at varying lengths from the housing 902. As an example, the housing 902 may resemble a sleeve within which the slide 908 may telescoping extend and retract. In some instances, FIG. 9 illustrates the wire route 900 in a withdraw or retracted state, or a partially retracted state. In the retracted state, a first end 910 of the slide 908 may extend from the first end 904 of the housing 902 (Z-direction) so as to protrude from within an interior or channel of the housing 902 and be exposed exterior to the housing 902. However, in some instances, the slide 908 may be configured to entirely collapse or extend within the interior of the housing 902 in the retracted state. In transitioning to an extended state, for instance, the first end 910 of the slide 908 may lengthen (Z-direction) and extend from within the housing 902 to protrude outward from the housing 902. In other words, in the extended state or a partially extended state, the first end 910 of the slide 908 may protrude from the first end 904 of the housing 902 by a greater distance than shown in FIG. 9.

In some instances, the slide 908 may include similar contours, geometries, curvatures, and structures as the housing 902 to permit the slide 908 to extend from and retract within the housing 902. In doing so, the housing 902 and the slide 908 may form a convenient mechanism to extend a length of the wire route 900.

As noted above, the wire route 900 may extend between portions of a HMD. In some instances, the wire route 900 may include wires that communicatively couple computing components located at the front of the HMD to computing components located at the back of the HMD. For instance, as shown in FIG. 9, the slide 908 includes a wire 912 protruding or extending from the first end 910 of the slide 908. In some instances, the wire 912 may be partially disposed within the slide 908 (e.g., embedded therein) and/or may extend along and couple to one or more surfaces of the slide 908. As will be discussed herein, the wire 912 may extend from the first end 910 of the slide 908, through the housing 902, and to the second end 906 of the housing 902 to communicatively couple the front and the back of the HMD. As an example, the wire 912 may communicatively couple an antenna (e.g., the first antenna 134 of the HMD 100) located at the front of the HMD with an antenna located at the back of the HMD. In other examples, the wire 912 may provide power to a display of the HMD (e.g., the display 108 of the HMD 100) or may provide signals or data to render content items of the display. Although FIG. 9 may illustrate the wire route 900 or the slide 908 including a single wire, in some instances the wire route 900 may include more than one wire, or may include a bundle of wires, extending between the first end 910 of the slide 908 and the second end 906 of the housing 902.

Figure 10:
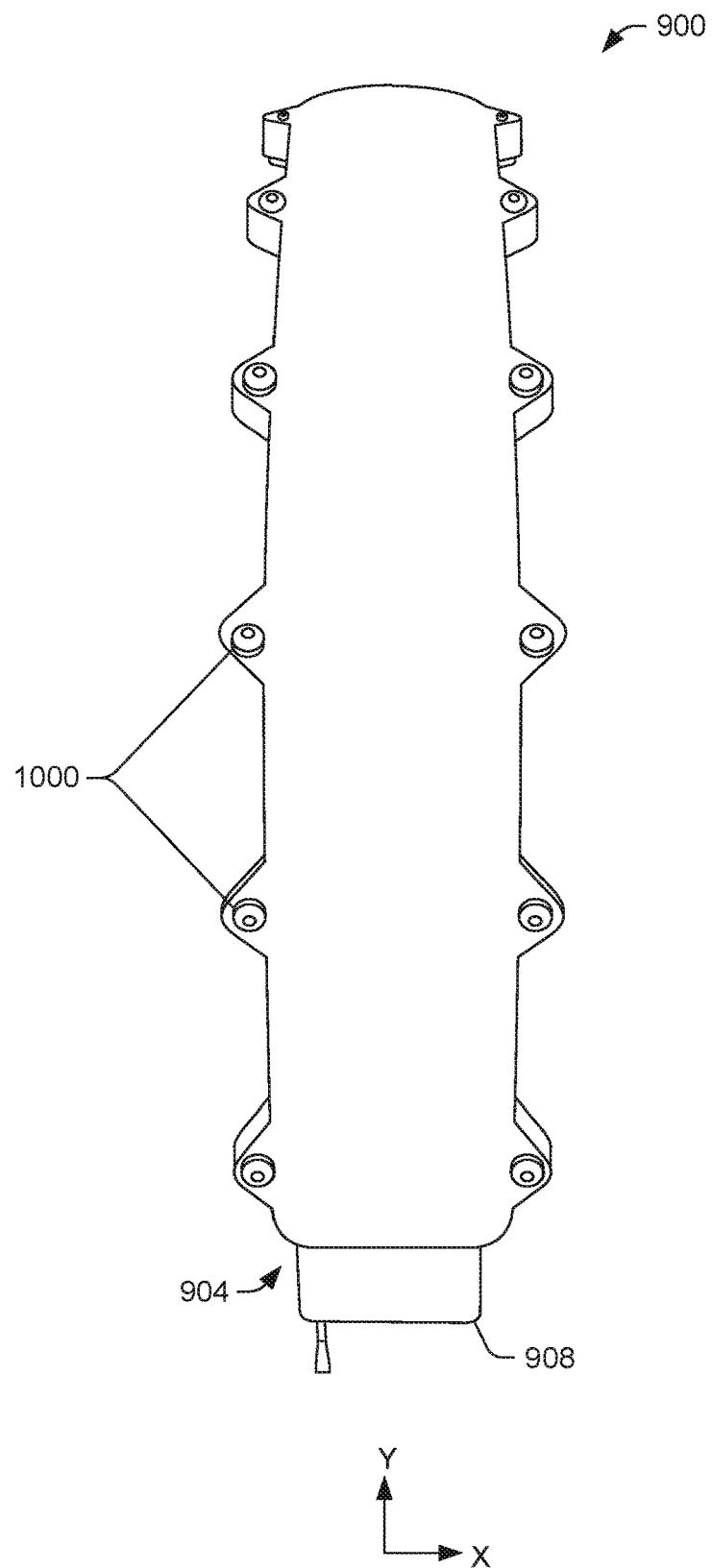
FIG. 10 illustrates a front view of the example wire routing assembly of FIG. 9, according to an embodiment of the present disclosure.

FIG. 10 illustrates a front view of the wire route 900. In some instances, the wire route 900 may include two portions that are adjoined, attached, or coupled via fasteners 1000 (e.g., screws, rivets, bolts, pins, and so forth). For instance, the housing 902 may include two halves that are coupled by the fasteners 1000. When coupled together, the housing 902 may form channel(s) within which the slide 908 may telescopically extend from the first end 904 of the housing 902. However, the wire route 900 and/or the housing 902 may include different shapes, profiles, or curvatures than shown in FIG. 10 and/or may omit the fasteners 1000. As an example, the wire route 900 may include two halves that are snap-fit together and may have a smooth exterior profile and perimeter, without notches, bumps, and/or extrusions.

FIGS. 11A and 11B illustrate end views of the wire route 900. Particularly, FIG. 11A illustrates a view of the first end 904 of the housing 902, while FIG. 11B illustrates a view of the second end 906 of the housing 902.

The first end 904 of the housing 902 may include a first opening 1100 through which the slide 908 may extend. For instance, as shown in FIG. 11A, the slide 908 may extend out of the first end 904 of the housing 902. The second end 906 of the housing 902 may include a second opening 1102. Disposed between the first opening 1100 and the second opening 1102 may be a channel 1104. The channel 1104 may route between the first end 904 and the second end 906 of the housing 902.

The channel 1104 may provide a channel or passageway for the slide 908 within the housing 902. For instance, as the slide 908 extends from and retracts within the housing 902, the channel 1104 may allow the slide 908 to telescopically engage with the housing 902.

In some instances, the channel 1104, a surface of the channel 1104, and/or an interior surface of the housing 902 may include protrusions, ribs, or other struts to secure or position the slide 908 within the housing 902 and/or the channel 1104. For instance, the channel 1104 may include ribs 1106 disposed on a top of the channel 1104 and which extend between the first end 904 of the housing 902 (or the first opening 1100) and the second end 906 of the housing 902 (or the second opening 1102). The ribs 1106 may abut, contact, or operably provide a surface upon which the slide 908 may move.

The ribs 1106 may also offset the slide 908 from contacting an interior surface of the channel 1104. In some instances, the ribs 1106 may offset the slide from the interior surface of the channel 1104 to provide an area through which one or more wires may extend. Such offset may prevent the wires from interfering or prohibiting a movement of the slide 908 within the housing 902 and/or the channel 1104.

As discussed above, the wire 912 may extend through the wire route 900, from the first end 910 of the slide 908 as shown in FIG. 11A, to the second end 906 of the housing 902, as shown in FIG. 11B. That is, a first end of the wire 912 may be disposed at the first end 910 of the slide 908 and a second end of the wire 912 may be disposed at the second end 906 of the housing 902. As such, the wire 912 may traverse through the slide 908, the housing 902, and the channel 1104 between the first end 910 of the slide 908 and the second end 906 of the housing 902.

In some instances, a portion of the wire 912 may couple to or be integrated with the slide 908 such that the wire 912 elongates or extends and contracts or retracts with a movement of the slide 908. For instance, a portion of the wire 912 may be routed through the slide 908, may extend through a channel or passageway of the slide 908, may couple to an exterior surface of the slide 908, and/or may be embedded within the slide 908. In doing so, the wire 912 may remain coupled to the slide 908 as the slide 908 extends from and retracts within the housing 902.

The housing 902 may include an elongated slot 1108 through which a portion of the wire 912 extends. In some instances, the elongated slot 1108 may extend from the second end 906 of the housing 902, or the second opening 1102, towards an interior of the housing 902 or a direction of the first end 904 of the housing 902 (Z-direction). The elongated slot 1108 may be sized and configured to receive at least a portion of the wire 912. For instance, as shown in FIG. 11B, the elongated slot 1108 may comprise a conduit through which a portion of the wire 912 may extend.

As noted above, the wire 912 may be configured to elongate as the slide 908 extends from the housing 902, and contract as the slide 908 retracts within the housing 902. In some instances, a first portion of the wire 912 may route through with the slide 908, a second portion of the wire 912 may route within the elongated slot 1108, and a third portion, interposed between the first portion and the second portion, may coil, loop, snake, or route within the channel 1104. The third portion may provide slack that permits the slide 908 to operably extended at various lengths from the housing 902 while also allowing the slide 908 to collapse within or retract within the housing 902. For instance, as the wire route 900 may be integrated with a HMD, the slack permits the slide 908 to extend from the housing 902 to adjust to the wire route 900 for varying head sizes of users wearing the HMD.

Figure 12A:
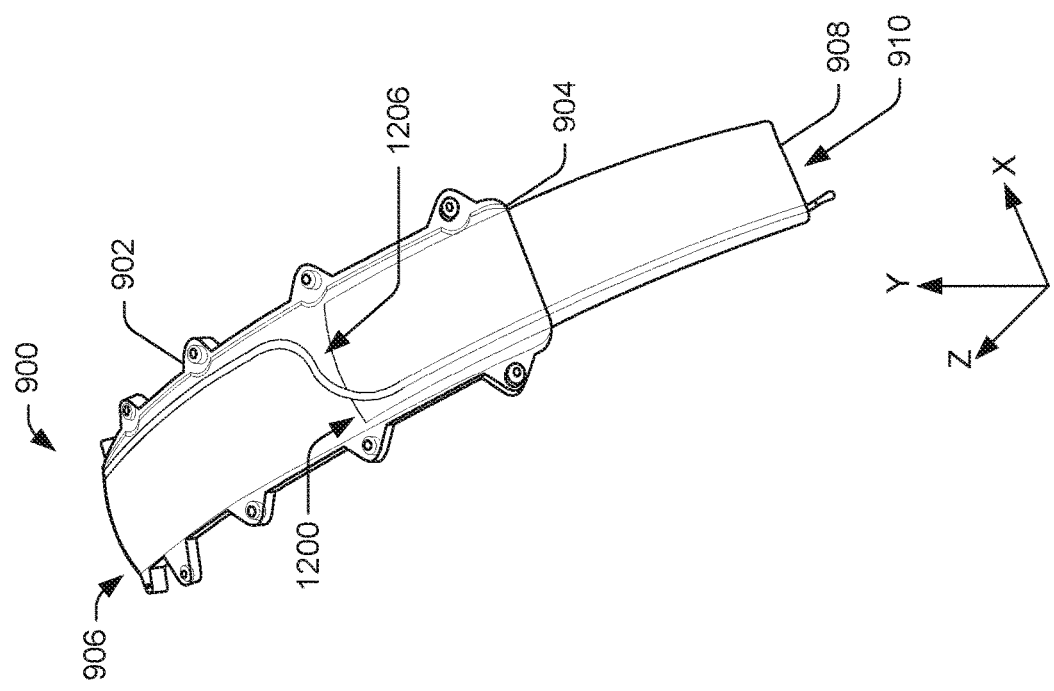
FIG. 12A illustrates a front perspective view of the example wire routing assembly of FIG. 9, showing one or more features as translucent to illustrate example components of the example wire routing assembly, according to an embodiment of the present disclosure.
Figure 12B:
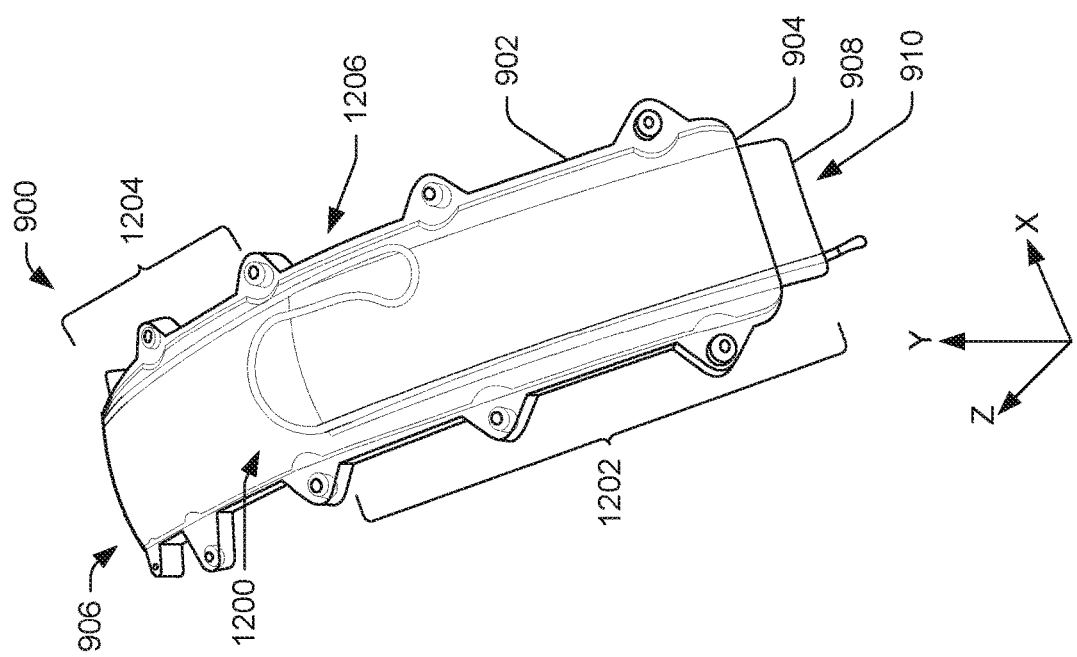
FIG. 12B illustrates a front perspective view of the example wire routing assembly of FIG. 9, showing one or more features as translucent to illustrate example components of the example wire routing assembly, according to an embodiment of the present disclosure.

FIGS. 12A and 12B illustrate an engagement between the housing 902 and the slide 908. In FIGS. 12A and 12B, the housing 902 is shown as translucent to illustrate an operation of slide 908 within the housing 902, such as within the channel 1104 of the housing 902. In some instances, FIG. 12A illustrates the wire route 900 in a retracted, or a partially retracted state, while FIG. 12B illustrates the wire route 900 in an extended, or in a partially extended state. That is, compared to retracted state, in the extended state, the first end 910 of the slide 908 may extend farther from the first end 904 of the housing 902, thereby exposing a greater length of the slide 908 external to the housing 902.

As shown in FIG. 12A, in the retracted state, the slide 908 may minimally protrude or extend from the housing 902 (Y- and Z-direction). For instance, the first end 910 of the slide 908 may protrude from the first end 904 of the housing 902. A second end 1200 of the slide 908 opposite the first end 910 is shown disposed within the housing 902 in the retracted state, more proximate to the second end 906 of the housing 902 in the channel 1104.

In some instances, the housing 902, the slide 908, and/or the channel 1104 may include features, such as flanges or stops, that the second end 1200 of the slide 908 abuts in the retracted state. As such, in some instances, the slide 908 may be prevented from entirely extending into the housing 902. In other instances, in the retracted state, the second end 1200 of the slide 908 may abut against stops such that the first end 910 of the slide 908 extends from housing 902 or the first end 910 of the slide 908 is substantially planar or aligned with the first end 904 of the housing 902.

In the retracted state, FIG. 12A illustrates that the wire 912 may route from the first end 910 of the slide 908, within the housing 902 or the channel 1104, to the second end 906 of the housing 902. The housing 902 may include conduits (e.g., the elongated slot 1108) for receiving the wire 912 (or a portion of the wire 912) and routing the wire 912 from the first end 910 of the slide 908 to the second end 906 of the housing 902. In some instances, as shown in FIGS. 12A and 12B, the wire 912 may route from a first side (e.g., right) of the wire route 900 to a second side (e.g., left) of the wire route 900. Such routing may prevent the wire 912 from buckling or crimping as the slide 908 transitions between retracted and extended states. In some instances, a stiffness of the wire 912, or a thickness of the wire 912, may prevent the wire 912 from buckling.

Returning to the discussion with regard to FIGS. 11A and 11B, a first portion 1202 of the wire 912 may, in some instances, be attached, embedded within, or coupled to the slide 908. The first portion 1202 of the wire 912 may extend from the first end 910 of the slide 908 and along a lengthwise direction of the slide 908 (Z-direction) towards the second end 1200 of the slide 908. A second portion 1204 of the wire 912, opposite the first portion 1202, may extend from the second end 906 of the housing 902, within the elongated slot 1108 and towards the first end 904 of the housing 902. A third portion 1206 of the wire 912 may extend between the first portion 1202 and the second portion 1204 and may provide slack for the slide 908 to extend from the housing 902. In other words, the third portion 1206 of the wire 912 may extend from the second end 1200 of the slide 908 to a position where the wire 912 engages with the elongated slot 1108. In between these two positions, or between the first portion 1202 and the second portion 1204 of the wire 912, as shown in FIG. 12A, the wire 912 may coil or curl within the housing 902 and/or within the channel 1104. The third portion 1206 may therefore provide excess wire to permit the slide 908 to extend from the housing 902 when the wire route 900 transitions between the retracted state to the extended state.

Turning to FIG. 12B, in the extended state, the slide 908 may extend or protrude from the housing 902 (Y- and Z-directions). In some instances, the slide 908 may telescopically extend from the first end 904 of the housing 902. In the extended state, the first end 910 of the slide 908 may protrude from the first end 904 of the housing 902 by a longer distance compared to a distance the first end 910 of the slide 908 protrudes from the first end 904 of the housing 902 in the retracted state. In other words, compared to the retracted state, in the extended state, the second end 1200 of the slide 908 may be disposed at a farther distance from the second end 906 of the housing 902 than in the retracted state. As shown in FIG. 12B, the third portion 1206 may accordingly provide slack for the slide 908 to extend. That is, in FIG. 12B, the third portion 1206 is extended or elongated to permit the slide 908 to extend to the extended state. The wire 912 may have sufficient slack, or the third portion 1206 may include a sufficient length, to accommodate the slide 908 extending from the housing 902.

In some instances, the slide 908 and/or the housing 902 may include features, such as tabs, flanges, or stops that prevent the slide 908 from disengaging with the housing 902 in the extended state. The stops may therefore prevent the slide 908 from completely exiting out the channel 1104 and decoupling from the housing 902.

Figure 13:
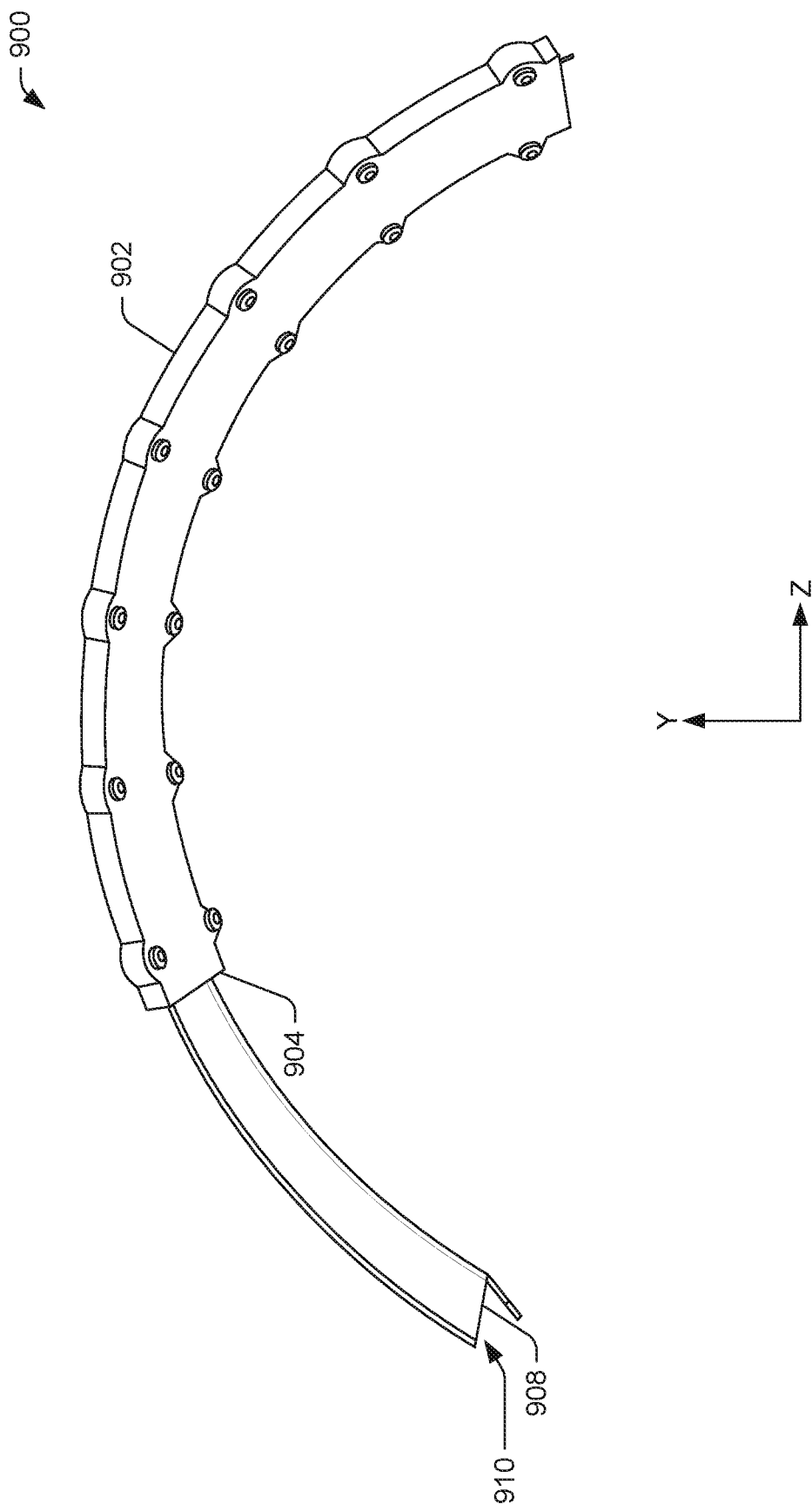
FIG. 13 illustrates a side view of the example wire routing assembly of FIG. 9, according to an embodiment of the present disclosure.

FIG. 13 illustrates a side view of the wire route 900, showing the wire route 900 in the extended or partially extended state. The first end 910 of the slide 908 is shown extending from the first end 904 of the housing 902.

The housing 902 and the slide 908 may be arcuate, curved, and/or include a similar curvature or lengths to permit the slide 908 to extend from, and retract within, the housing 902.

Figure 14:
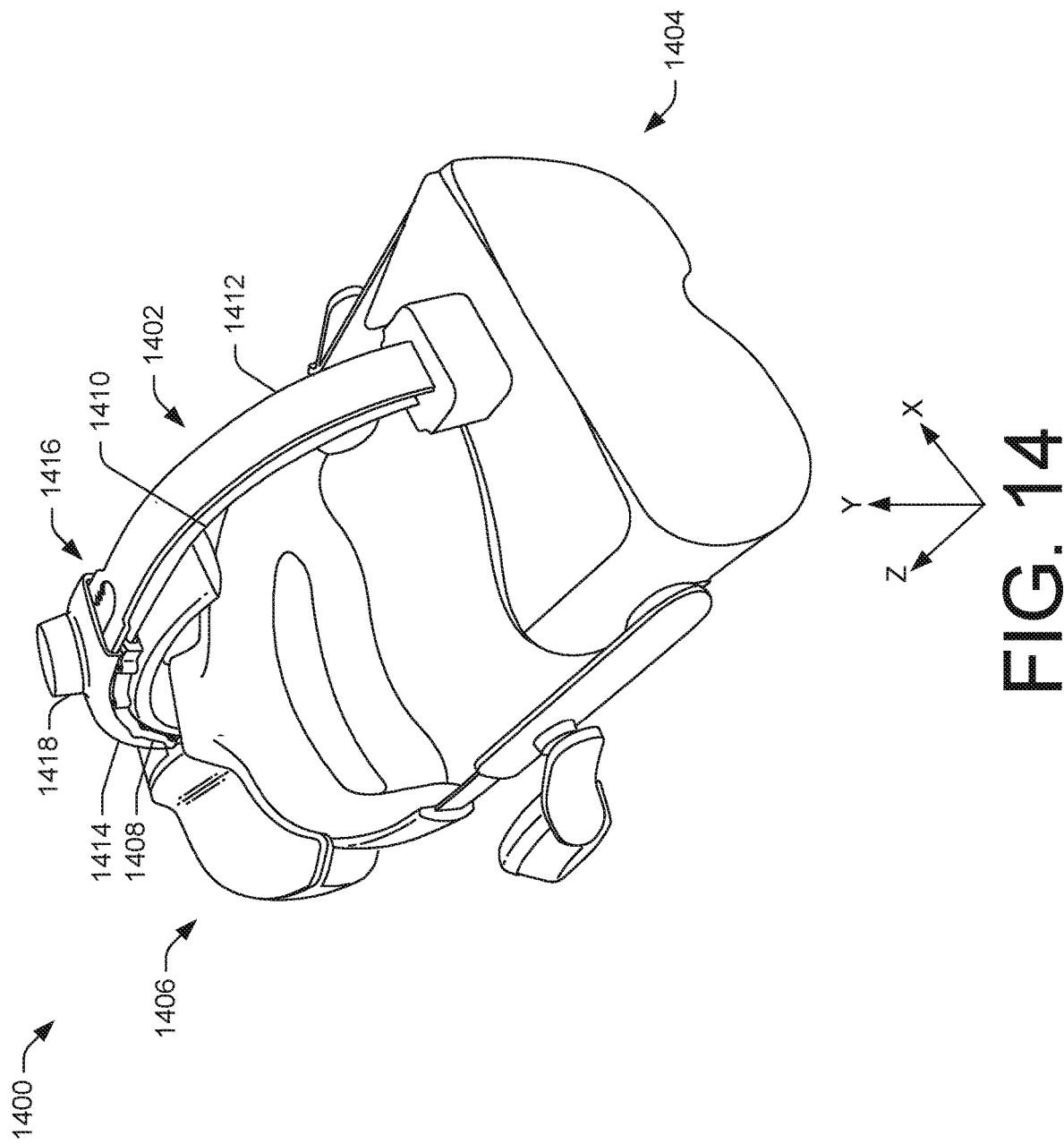
FIG. 14 illustrates a perspective view of an example head-mounted display, showing the wire routing assembly of FIG. 9 being usable with the example head-mounted display, according to an embodiment of the present disclosure.

FIG. 14 illustrates a perspective view of a head mounted display (HMD) 1400. In some instances, the HMD 1400 may include similar components or features as the HMD 100. For instance, the HMD 1400 may include a display, structures to adjust and accommodate for varying head sizes, loudspeakers for outputting audio to a user wearing the HMD 1400, and so forth. However, as shown in FIG. 14, the HMD 1400 includes a wire route 1402 for routing one or more wires between a front 1404 of the HMD 1400 and a back 1406 of the HMD 1400. In some instances, the wire route 1402 may be similar to, represent, or include similar features as the wire route 900. For instance, the wire route 1402 may include a housing 1408 and a slide 1410 that is operable to telescopically extend from the housing 1408 at varying lengths.

The wire route 1402 may be disposed beneath (Y-direction) a top member 1412 and the sleeve 1414. In some instances, the housing 1408 and the sleeve 1414 may attach or couple to one another. The top member 1412 may be similar to and/or represent the top member 112 and may adjust in length to extend and retract to accommodate for varying users wearing the HMD 100 and/or to accommodate for different tightness on users. For instance, the top member 1412 may include slots 1416 that engage with a top actuator 1418. The top actuator 1418 may be coupled to the sleeve 1414 having an opening and in which the top member 1412 is permitted to extend from and retract within. In doing so, the top member 1412 may adjust in length.

The wire route 1402 is configured to extend and retract as the top member 1412 is adjusted. The wire route 1402 may therefore adjust to accommodate varying users and/or as the top actuator 1418 is actuated. As the top member 1412 extends from the sleeve 1414, so as to increase in length, the wire route 1402 may correspondingly increase in length. For instance, when the top member 1412 extends from the sleeve 1420, the length of the slide 1410 extending from the housing 1408 may increase. Correspondingly, when the top member 1412 extends into the sleeve 1420, so as to decrease in length, the wire route 1402 may correspondingly decrease in length. For instance, when the top member 1412 extends into the sleeve 1414, the length of the slide 1410 extended from the housing 1408 may decrease and retract within the housing 1408.

The top actuator 1418 may drive and retract the slide 1410 from and into the housing 1408. For instance, as the top member 1412 operably couples the front 1404 of the HMD 1400 and the back 1406 of the HMD 1400, via the sleeve 1414, when the top actuator 1418 is actuated, the front 1404 of the HMD 1400 and the back 1406 of the HMD 1400 may extend apart (Z-direction) or retract together (Z-direction). Movement of the front 1404 and the back 1406 of the HMD 1400 may cause the slide 1410 to correspondingly extend from the housing 1408 and retract within the housing 1408.

In some instances, the housing 1408 and the sleeve 1414 may include similar lengths and/or may extend from the back 1406 of the HMD 1400 at similar distances.

Wires routed through the wire route 1402 may include sufficient slack to permit the slide 1410 to extend from and retract within the housing 1408. As such, the wires may be moveable within the housing 1408 to permit the slide 1410 to extend. For instance, the wire route 1402, such as the housing 1408, may include channels that route the wire(s) between the front 1404 and the back 1406 of the HMD 1400 and/or assist or prevent the wire(s) from snagging, buckling, or crimpling within the housing 1408 as the slide 1410 telescopically extends from and into the housing 1408.

In some instances, routing wires through the wire route 1402 may avoid wires being routed or disposed alongside a side of the HMD 1400, which may increase an aesthetic appearance of the HMD 1400 and/or may prevent cables and/or portions of the user (e.g., hair) snagging or tangling with the wires. In other words, rerouting cables or other wires between portions of head-mounted displays may promote free movement of the user and/or reduce external clutter on sides of head-mounted displays, for instance. In some instances, the wire route 1402 may be configured to route a single wire, multiple wires, a chord, and/or a bundle of wires. For instance, the wire route 1402 may include a first wire for powering a display at the front 1404 of the HMD 1400, a second wire to communicatively link antennas of the HMD 1400, and/or a third wire to provide image data for output on the display of the HMD 1400. However, in some instances, the HMD 1400 may additionally or alternatively include wires routing alongside the HMD 1400 for communicatively coupling components at the front 1404 of the HMD 1400 with components at the back 1406 of the HMD 1400.

Figure 15:
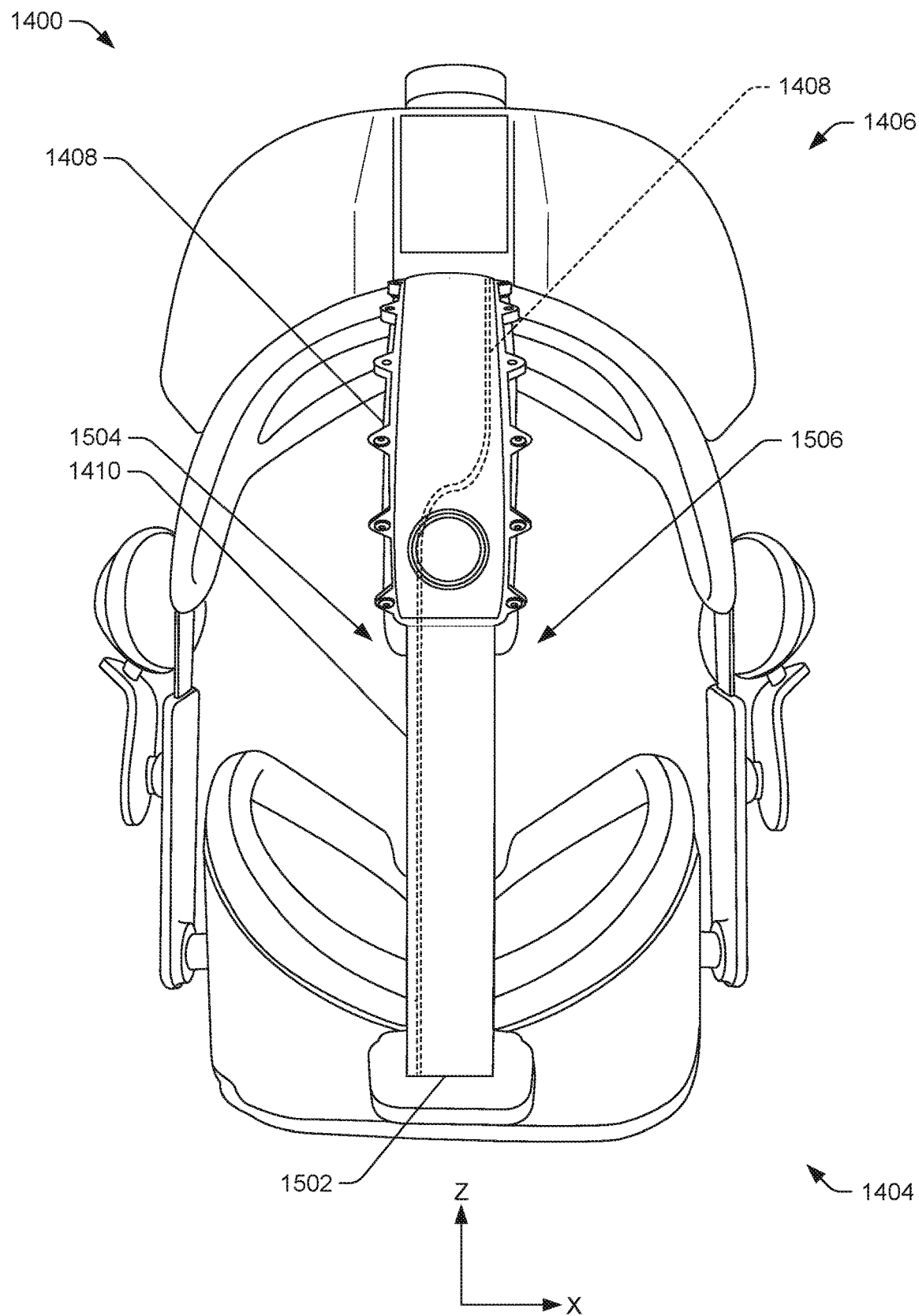
FIG. 15 illustrates a top view of the example head-mounted display of FIG. 14, according to an embodiment of the present disclosure.

FIG. 15 illustrates a top view of the HMD 1400. In FIG. 15 portions of the top member 1412 and the sleeve 1414 are shown as translucent to illustrate a wire 1500 routing from the front 1404 of the HMD 1400 to the back 1406 of the HMD 1400. The wire 1500 is represented generally by dotted lines in the wire route 1402.

As shown, the wire 1500 may route from a first end 1502 of the slide 1410 along a longitudinal length of the slide 1410 (Z-direction) to the back 1406 of the HMD 1400 to one or more components disposed in a compartment or housing at the back 1406 of the HMD 1400. The second end may be disposed within the housing 1408.

The first end 1502 of the slide 1410, or a first end of the top member 1412, may hingedly, rotatably, or pivotably couple to the HMD 1400 to permit an adjust of a display on the face of the user. In some instances, the wire 1500 may route along a first side 1504 of the wire route 1402, within the slide 1410, and transition to routing through the housing 1408 along a second side 1506 (i.e., spaced apart in the X-direction from the first side 1504) of the wire route 1402. The wire route 1402 may include channels on respective sides or components of the wire route 1402 for receiving and routing the wire 1500.

Figure 16:
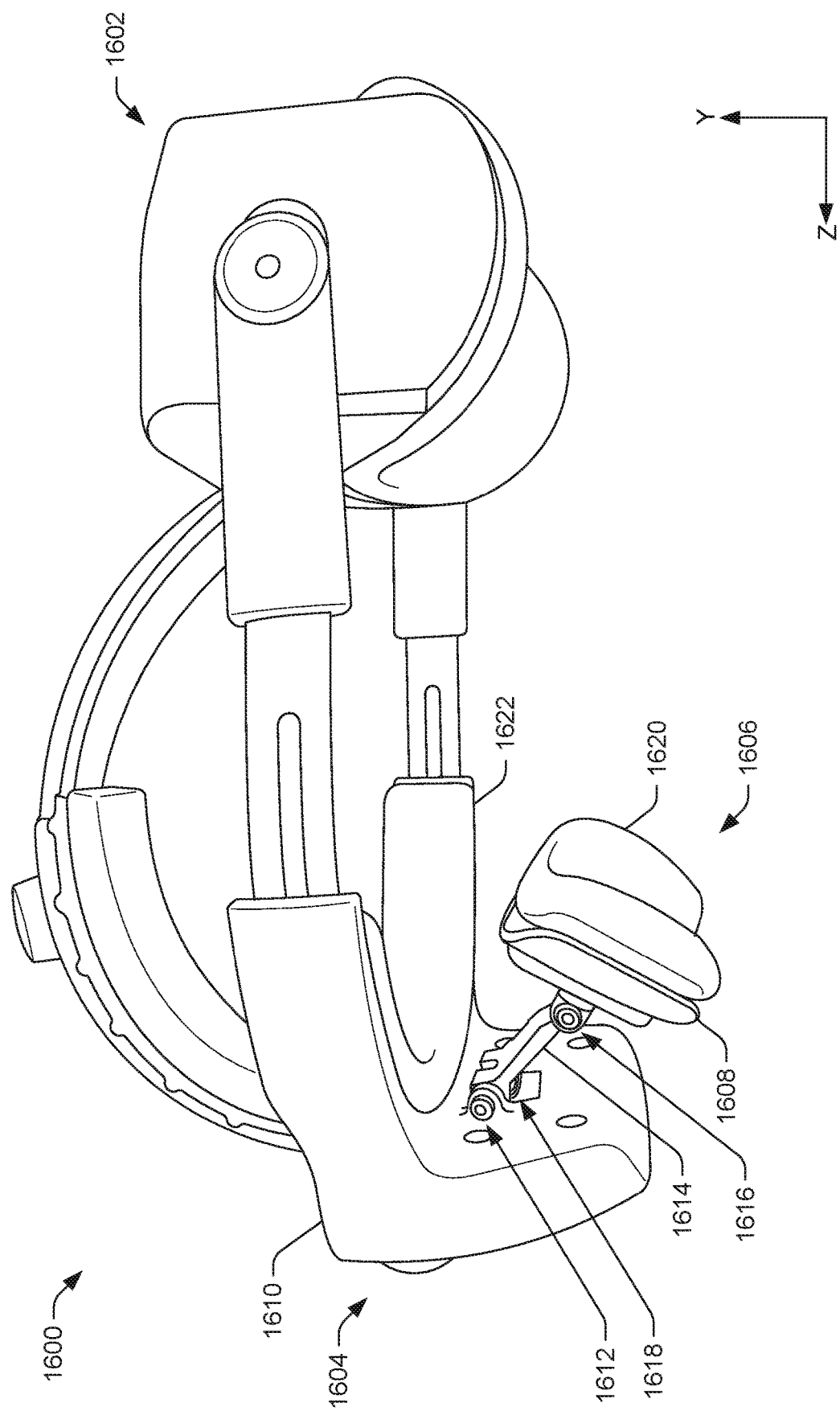
FIG. 16 illustrates a side view of an example head-mounted display, showing a support configured to engage with a user, according to an embodiment of the present disclosure.

FIG. 16 illustrates a side view of a head-mounted display (HMD) 1600. In some instances, the HMD 1600 may include similar components as the HMD 100 and/or the HMD 1400. For instance, the HMD 1600 may include members and actuators for adjusting a size of the HMD 1600 when worn by a user and may include a wire route, such as the wire route 900 or the wire route 1402 for routing wires between a front 1602 and a back 1604 of the HMD 1600.

The HMD 1600 may include a harness 1606 disposed at the back 1604 of the HMD 1600 that adjusts and/or conforms to various users. The harness 1606 may be centrally aligned with a longitudinal axis (Z-direction) of the HMD 1600 to clutch the center of the back of the head of a user. That is, when the HMD 1600 is worn by the user, the harness 1606 may pivot and centrally cusp, grab, or clutch the back of the head of the user. The harness 1606 may also be spring-loaded or tension-loaded (e.g., helical spring, torsion spring, conical spring, etc.) to extend and maintain contact with the back of the head of the user. The harness 1606 may also flex about one or more axes so as to conform to the back of the head.

In some instances, the harness 1606 may include a frame 1608 that pivotably couples to a housing 1610 at the back 1604 of the HMD 1600. In some instances, the frame 1608 may couple to the housing 1610 via a first hinge 1612, a strut 1614, and/or a second hinge 1616. The first hinge 1612 may couple to a first end of the strut 1614 and permits the strut 1614 to translate in horizontal and vertical directions towards the front 1602 and a top of the HMD 1600 (Y-direction and Z-direction). The strut 1614 may pivot about the first hinge 1612 to move outward, or extend away, from the housing 1610 towards the user and/or may pivot about the first hinge 1612 (X-axis) to move inward, or towards, the housing 1610 (Z-direction). In doing so, the harness 1606 may horizontally and vertically position to clutch the back of the head. The strut 1614 may be centrally aligned with the longitudinal axis of the of the HMD 1600 (Z-direction).

Additionally, the frame 1608 may pivot about the second hinge 1616 (X-axis) to further assist in clutching the back of the head. For instance, the second hinge 1616 may couple to a second end of the strut 1614 and may permit the frame 1608 to reposition below and/or clutch the occipital lobe. In doing so, when secured to the user, the harness 1606 may provide stability and lock the HMD 1600 under the base of the head to prevent movement of the HMD 1600 (e.g., when the head is tilted). Additionally, the frame 1608 may be centrally aligned with the longitudinal axis of the of the HMD 1600 (Z-direction) to couple on the back of the head.

As discussed herein, the harness 1606 may include springs (e.g., helical spring, torsion spring, conical spring, etc.), shapes, certain material thicknesses, and/or other biasing members to apply a constant pressure or force against the back of the head. For instance, the harness 1606 may include a spring 1618 (e.g., torsion spring, leaf spring, etc.) disposed between the strut 1614 and the housing 1610. The spring 1618 may operably engage with the strut 1614 to position the strut 1614 outward from the housing 1610, so as to abut the head of the user. The spring 1618 may apply a force to the strut 1614 to translate the strut 1614 in the Z-direction or towards the front 1602 of the HMD 1600. Additionally, in some instances, the spring 1618 may be disposed over a pin of the first hinge 1612 to bias the strut 1614 about the X-axis.

As the harness 1606 is designed to clutch the back of the head, the harness 1606 may include a pad 1620 coupled to the frame 1608 to increase user comfort. In some instances, the strut 1614 may hingedly, rotatably, or pivotably couple to a first side of the frame 1608 and the pad 1620 may couple to a second side of the frame 1608, opposite the first side. Additionally, a shape of the frame 1608 and/or the pad 1620 may bend, curve, arc, or include other features and/or shapes to correspond to the ergonomics of the user. Additionally, or alternatively, the harness 1606 may engage or couple to the housing via a ball joint to articulate about one or more axes.

The HMD 1600 may further include other structures to position and/or secure the HMD 1600. For instance, the housing 1610 may include lateral support(s) 1622 configured to circumferentially or radially extend around a portion of the head of the user. In some instances, the lateral support(s) 1622 may include flanges or other projections that extend outward from a middle of the HMD 1600 so as to engage left and right portions of the head of the user. When the HMD 1600 is tightened onto the user (e.g., via atop member that is adjustable and/or lateral members that are adjustable), the lateral support(s) 1622 may distribute compression forces across the head. Portions of the lateral support(s) 1622 contacting the head may include padding.

As shown in FIG. 16, the lateral support(s) 1622 may be disposed above (Y-direction) the harness 1606. In some instances, the lateral support(s) 1622 may grip or clutch the back of the head of the user at a position above the occipital lobe. The HMD 1600 may therefore include structures that clutch to the head of the user below the occipital lobe (e.g., harness 1606) and structures that clutch to the head of the user above the occipital lobe (e.g., lateral support(s) 1622).

Figure 17:
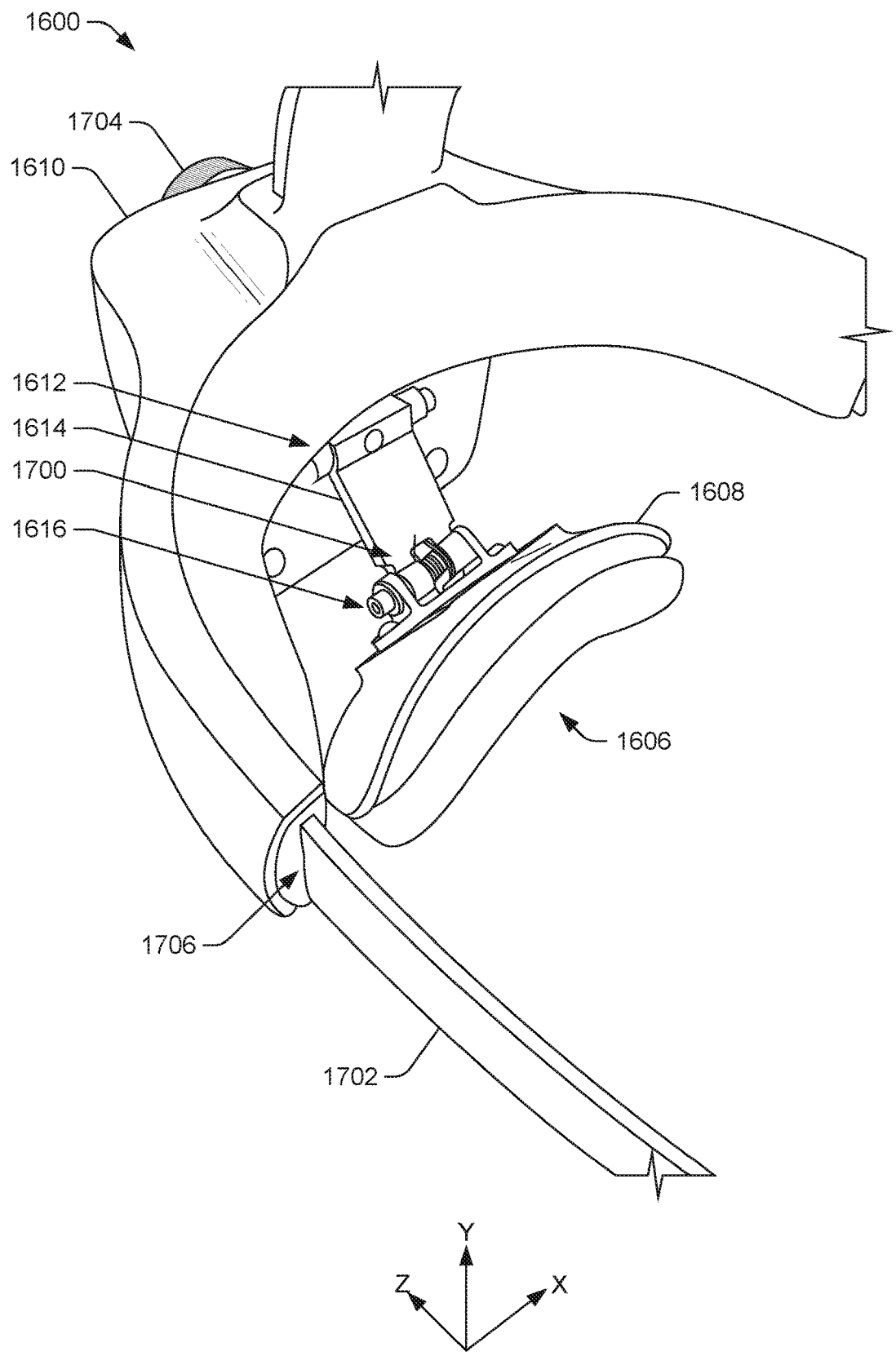
FIG. 17 illustrates a partial top perspective view of the example head-mounted display of FIG. 16, according to an embodiment of the present disclosure.

FIG. 17 illustrates a top perspective view of the HMD 1600. As shown, the harness 1606 extends from the housing 1610 and in a direction towards the front 1602 of the HMD 1600 (Z-direction). As discussed above, the harness 1606 may be permitted to rotate and position to conform and clutch to the occipital lobe of the user via the first hinge 1612, the strut 1614, and the second hinge 1616. Furthermore, FIG. 17 illustrates that the harness 1606 may include a spring 1700 (or other biasing member) to maintain pressure or force against the head of the user, which may further assist in securing the HMD 1600 to the user. The spring 1700 may bias about the X-axis to clutch and/or position the frame 1608 beneath the occipital lobe.

When the HMD 1600 is secured to the user, or while the HMD 1600 is being secured to the user, the first hinge 1612, the strut 1614, the second hinge 1616, the spring 1618, and/or the spring 1700 may collectively operate in unison to situate the frame 1608 against the occipital lobe. That is, as the back of the head among users may include different shapes or ergonomics, the harness 1606 may position and adjust to accommodate different users.

The harness 1606 may also be configured to operate in conjunction with members that increase or decrease a size of the HMD 1600 on the user. For instance, the HMD 1600 may include members that engage with actuators and adjust a length of the members. As an example, and as shown in FIG. 17, the HMD 1600 may include a member 1702 (which may represent and/or correspond to the second lateral member 124) and an actuator 1704 (which may represent and/or correspond to the rear actuator 202). As the HMD 1600 is tightened to the user, via an actuation of the actuator 1704, the member 1702 may retract within the housing 1610 via channels 1706. In pulling the front 1602 of the HMD 1600 towards the back 1604 of the HMD 1600, vice versa, the harness 1606 may reposition horizontally (Z-direction) and vertically (Y-direction) to engage the head of the user.

Figure 18:
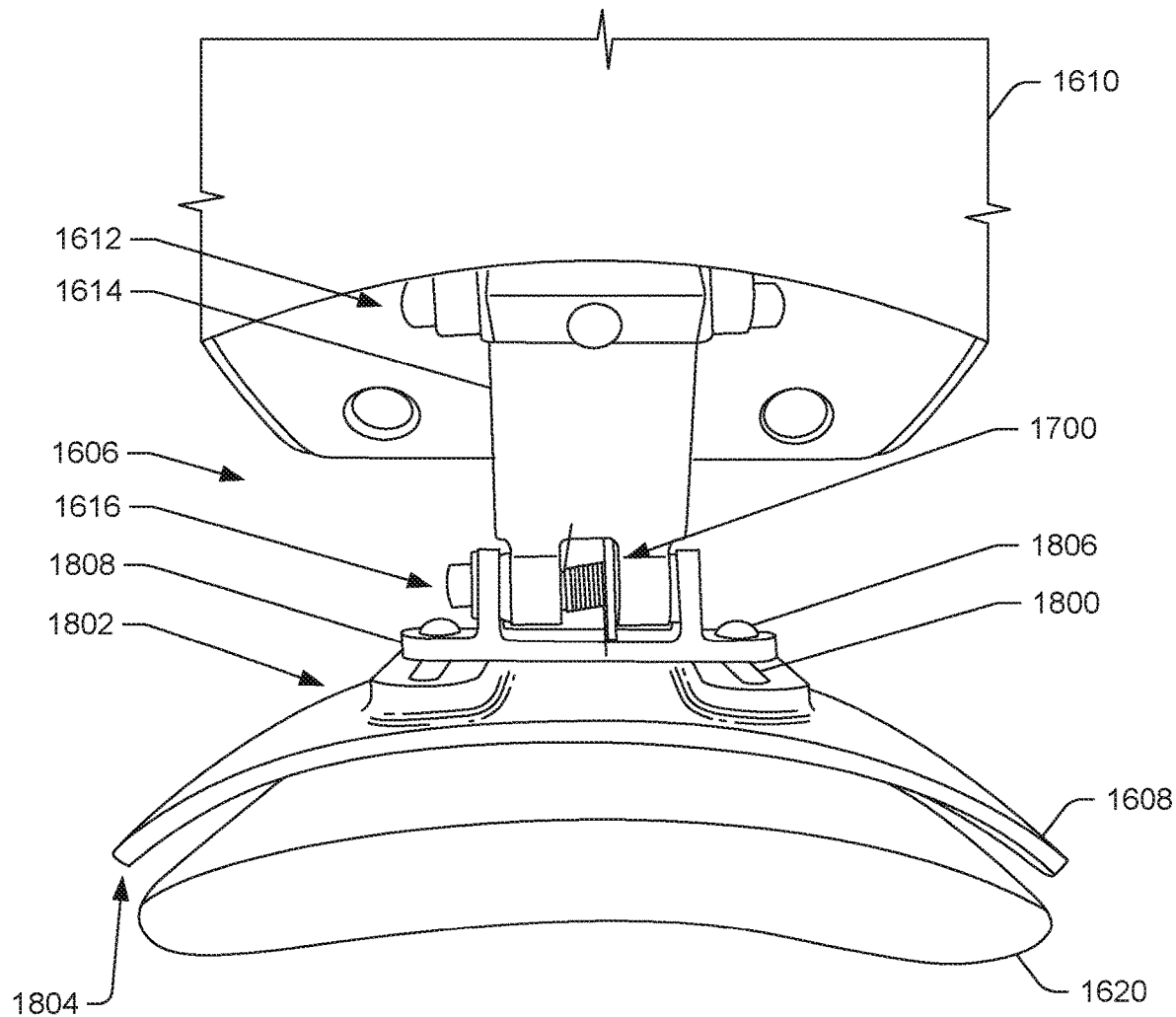
FIG. 18 illustrates a top view of the example head-mounted display of FIG. 16, according to an embodiment of the present disclosure.

FIG. 18 illustrates a top view of the harness 1606 of the HMD 1600, showing the frame 1608 being operably coupled to the housing 1610 via the first hinge 1612, the strut 1614, the second hinge 1616, the spring 1618, and the spring 1700 (e.g., torsion spring, leaf spring, etc.). The frame 1608 may curve, arc, or include other features and/or shapes to correspond to the ergonomics of the user (e.g., X-direction) so as to clutch to the head and/or radially wrap around or circumferentially extend around at least a portion of the back of the head. For instance, the frame 1608 may be semi-circular shaped, substantially semi-circular shaped, arcuate, or curved.

The frame 1608 may include a first portion that extends, flares, or curves in a first direction, away from a longitudinal axis (Z-axis) of the frame 1608 to clutch a right side of the back of the head of the user. The frame 1608 may also include a second portion that extends, flares, or curves in a second direction, away from the longitudinal axis of the frame 1608 to clutch a left side of the back of the head of the user. In some instances, the frame 1608 may include a third portion, interposed between the first portion and the second portion, that is flat to clutch a central part of the back of the head of the user.

As shown, the spring 1700 may bias the frame 1608 about the X-axis to maintain pressure against the head. For instance, depending on an orientation of the spring 1700, the spring 1700 may bias the frame towards a top or a bottom of the HMD 1600. Additionally, in some instances, the spring 1700 may be disposed over a pin of the second hinge 1616 to bias the frame 1608 about the X-axis.

The harness 1606 may include additional mechanisms that assist in positioning the harness 1606 about the user and/or increase user comfort. For instance, FIG. 18 illustrates that the frame 1608 may include slots 1800. In some instances, the slots 1800 may be disposed on a back (or first side) of the frame 1608, opposite to a front (or second side) of the frame 1608 that includes the pad 1620. The slots 1800 may extend in a heightwise direction of the of the frame 1608 (Y-direction), or in a direction from a bottom 1802 of the frame 1608 to a top 1804 of the frame, and may be spaced apart from one another in a widthwise direction of the frame 1608 (X-direction). Fasteners 1806 may extend through a mount 1808 to engage the slots 1800. For instance, the fasteners 1806 may be disposed through the mount 1808 and couple to the slots 1800 and/or the frame 1608. The fasteners 1806, however, may be loosened such that the frame 1608 may reposition along the slots 1800 (Y-direction). The user may therefore be provided with an additional degree to personalize a fit of the HMD 1600.

Figure 19:
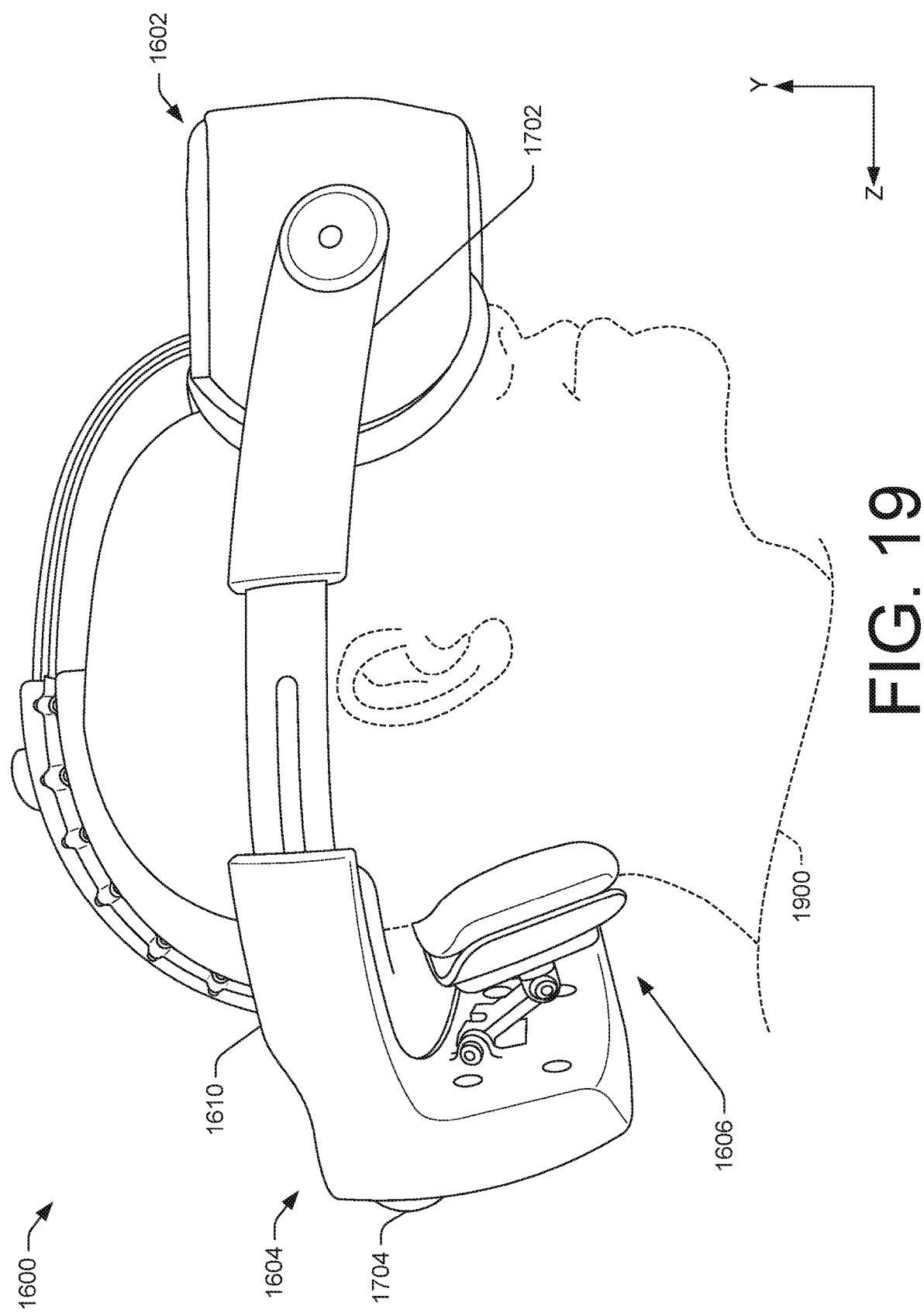
FIG. 19 illustrates a user wearing the example head-mounted display of FIG. 16, showing the support engaging with the user, according to an embodiment of the present disclosure.

FIG. 19 illustrates a user 1900 wearing the HMD 1600. As discussed above with regard to the HMD 100, the user 1900 may wear the HMD 1600 for purposes of immersing the user 1900 in VR or AR environments.

The user 1900 may actuate one or more actuators of the HMD 1600 to secure and/or tighten the HMD 1600. For instance, the user 1900 may actuate the actuator 1704 that is operably coupled to the member 1702. As the user 1900 actuates the actuator 1704 to tighten the HMD 1600, the back 1604 and the front 1602 of the HMD 1600 may be directed inward (Z-direction) to tighten HMD 1600 to the user 1900. When tightened, the harness 1606 may engage with the back of the head of the user 1900, as shown in FIG. 19. That is, as the HMD 1600 is tightened to the user 1900, the harness 1606 may bias against the back of the head of the user 1900. As discussed above, the harness 1606 may include hinges (e.g., the first hinge 1612 and the second hinge 1616), as well as a strut (e.g., the strut 1614) that permits the harness 1606 to reposition laterally and vertically to accommodate the user 1900. As such, and as shown in FIG. 19, the harness 1606 may engage the back of the head of the user 1900 below the occipital lobe.

Moving the actuator 1704 in an opposite direction decreases the force applied by the HMD 1600 and may loosen the HMD 1600 from the user 1900 and/or adjust a fit of the HMD 1600. In doing so, and when loosened, the harness 1606 may maintain contact with the back of the head of the user 1900. That is, including the spring 1618 and the spring 1700 permit the harness 1606 to maintain contact, or pressure, on back of the head of the user 1900. As the user 1900 adjusts the HMD 1600 to vary a force applied by the HMD 1600, the harness 1606 may be directed inward (i.e., Z-direction, towards the user 1900, towards the front 1602) and outward (Z-direction, away from the user 1900, towards the back 1604) and may be permitted to pivot (X-axis) to clutch the head.

Additionally, as shown in FIG. 19, when the HMD 1600 is worn by the user 1900, the lateral support(s) 1622 may circumferentially extend around at least a portion of the back of the head of the user 1900, such as left and right sides of the user 1900. In some instances, once the HMD 1600 is worn by the user, the harness 1606 or the frame 1608 may be disposed internal to the lateral support(s) 1622 (Z-direction).

Figure 20:
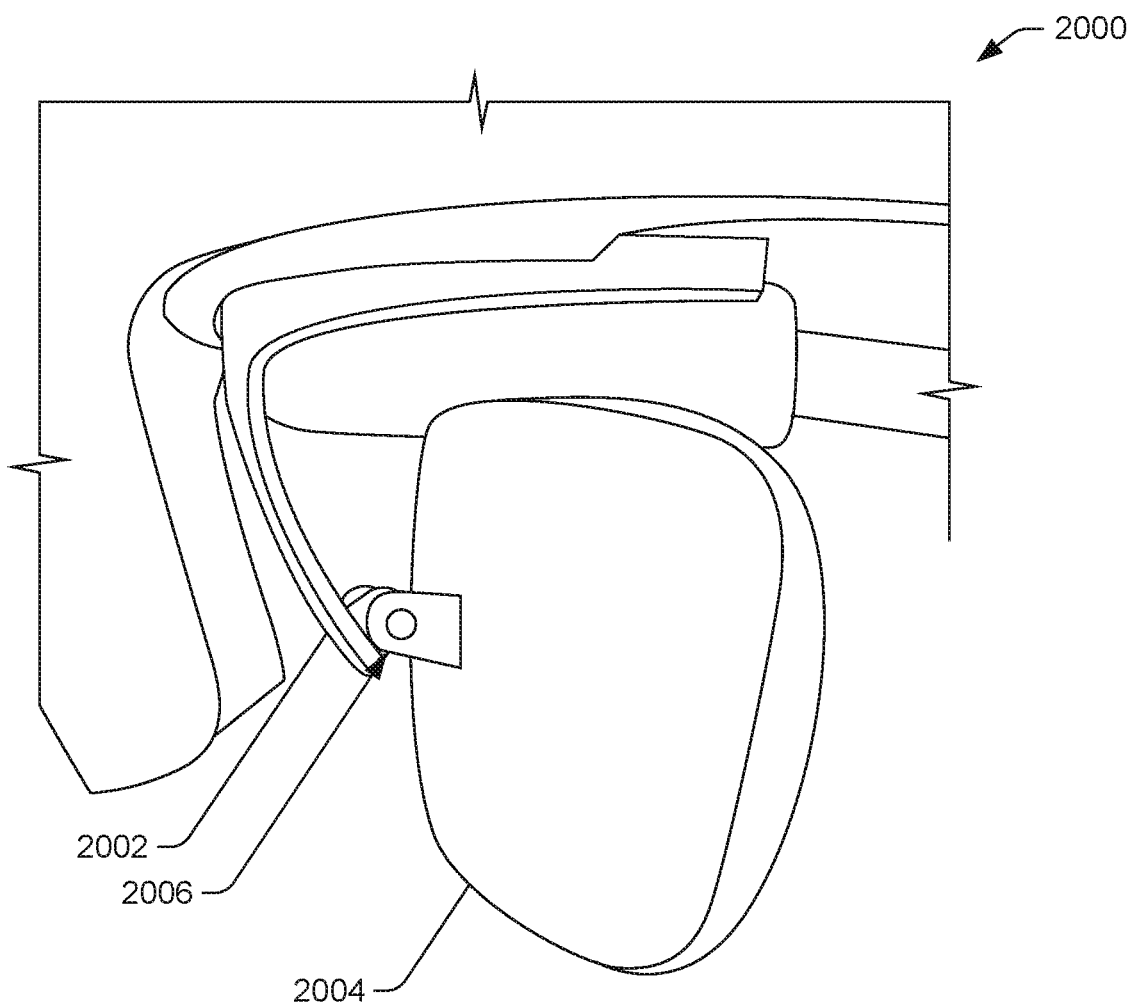
FIG. 20 illustrates a side view of an example head-mounted display, showing a support configured to engage with a user, according to an embodiment of the present disclosure.

FIG. 20 illustrates an example harness 2000. In some instances, the harness 2000 may be usable with a HMD, such as the HMD 100 and/or the HMD 1400. The harness 2000 may be located at a back of the HMD to abut or clutch the back of the head of a user, such as the occipital lobe. As shown in FIG. 20, the harness 2000 may include a strut 2002 that extends from the back of the HMD and engages with a frame 2004 of the harness 2000 via a hinge 2006. The hinge 2006 may assist is positioning the frame 2004 against the back of the head of the user. For instance, the harness 2000 may exert force to the rear of the head just below the occipital lobe to provide stability and position the harness 2000 under the base of the head. In some instances, the frame 2004 may be spring-loaded to conform to the user. Additionally, or alternatively, the frame 2004 may couple to the strut 2002 via a ball joint for pivoting and permitting the frame 200 to abut the head of the user.

Figure 21B:
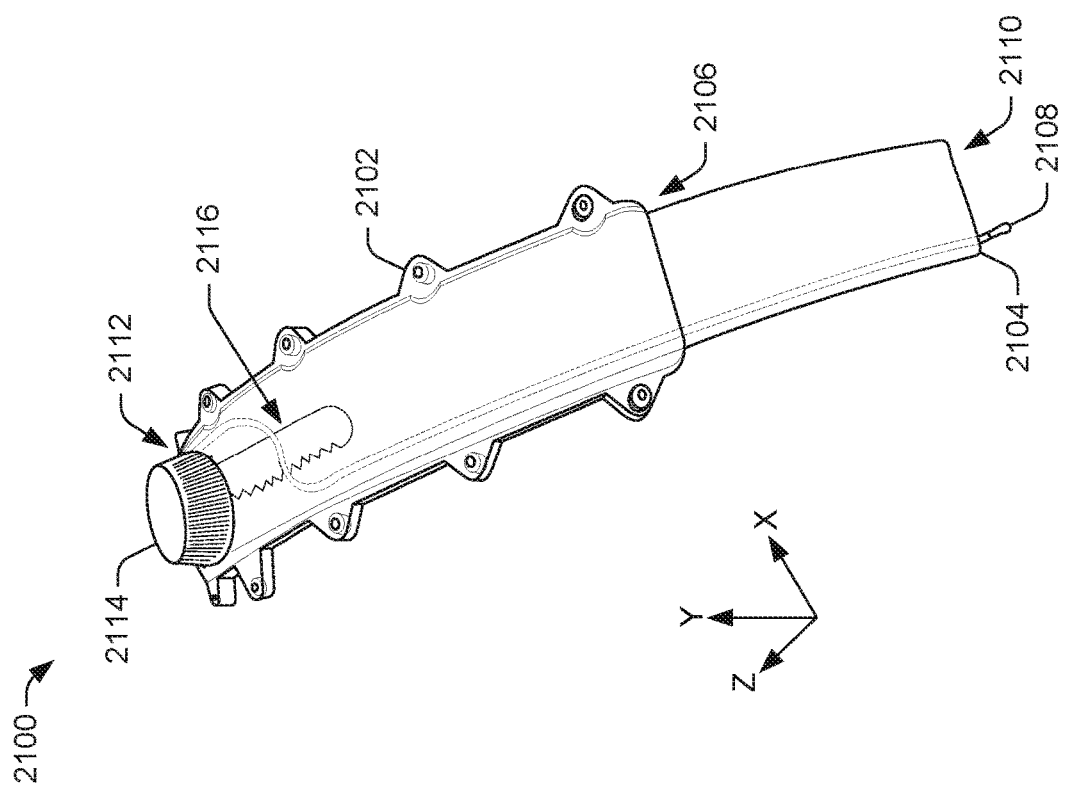
FIG. 21B illustrates a front perspective view of the example wire routing assembly of FIG. 21A, showing one or more features as translucent to illustrate components of the example wire routing assembly, according to an embodiment of the present disclosure.
Figure 21A:
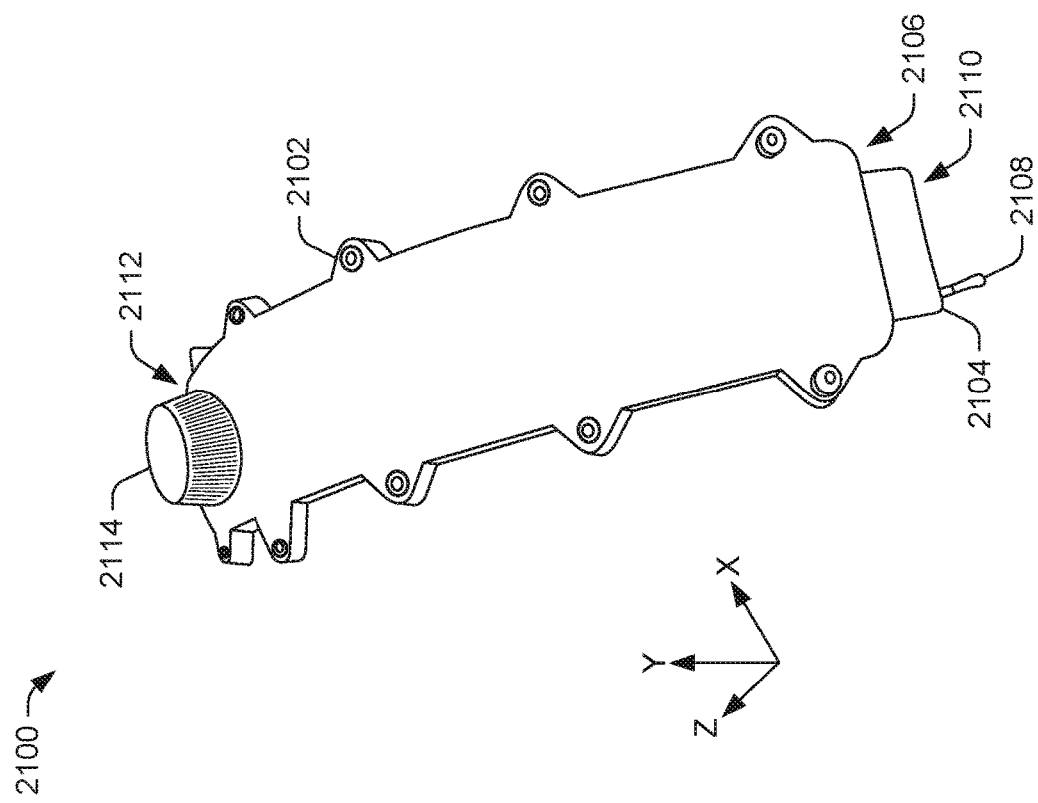
FIG. 21A illustrates a front perspective view of an example wire routing assembly usable with a head-mounted display, according to an embodiment of the present disclosure.

FIGS. 21A and 21B illustrate perspective views of a wire route 2100. FIG. 21A illustrates the wire route 2100 in a retracted or partially retracted state, while FIG. 21B illustrates the wire route 2100 in an extended or partially extended state.

In some instances, the wire route 2100 may be similar to and/or include similar features as the wire route 900 and/or the wire route 1402. For instance, the wire route 2100 may include a housing 2102, a slide 2104 that telescopically extends from a first end 2106 the housing 2102, and a wire 2108 that extends from a first end 2110 of the slide 2104, through the housing 2102, and to a second end 2112 of the housing 2102. In FIG. 21B, the wire 2108 is represented generally by dashed lines to illustrate the wire 2108 routing through the wire route 2100.

In some instances, the wire route 2100 may include an actuator 2114 operable to extend the slide 2104 at varying lengths from the housing 2102. In some instances, the actuator 2114 may include similar features as the top actuator 120 discussed previously herein. The actuator 2114 may be disposed on or coupled to the housing 2102 and operably engage with the slide 2104. For instance, the actuator 2114 may include teeth that engage with slots 2116 of the slide 2104. Through actuating the actuator 2114, the slide 2104 may adjust in length and extend at varying lengths from the first end 2106 of the housing 2102 at varying lengths. For instance, actuating the actuator 2114 may cause the slide 2104 to extend from, or retract within, the housing 2102, or may transition the slide 2104 between extended or retracted states. The engagement between the actuator 2114 and the slide 2104 may therefore resemble a ratchet mechanism that moves the slide 2104 into and out of the housing 2102. The housing 2102 may include a channel for accepting the slide 2104 as the length of the slide 2104 is adjusted.

As discussed above, the wire 2108 may include a sufficient amount of slack to permit the slide 2104 to telescopically extend into the housing 2102. Moreover, the housing 2102 and/or the slide 2104 may include features to permit the wire 2108 to extend and retract without becoming snagged, pinched, or buckled. Accordingly, users may operate the actuator 2114 to accommodate for varying head sizes or tightness.

Figure 22:
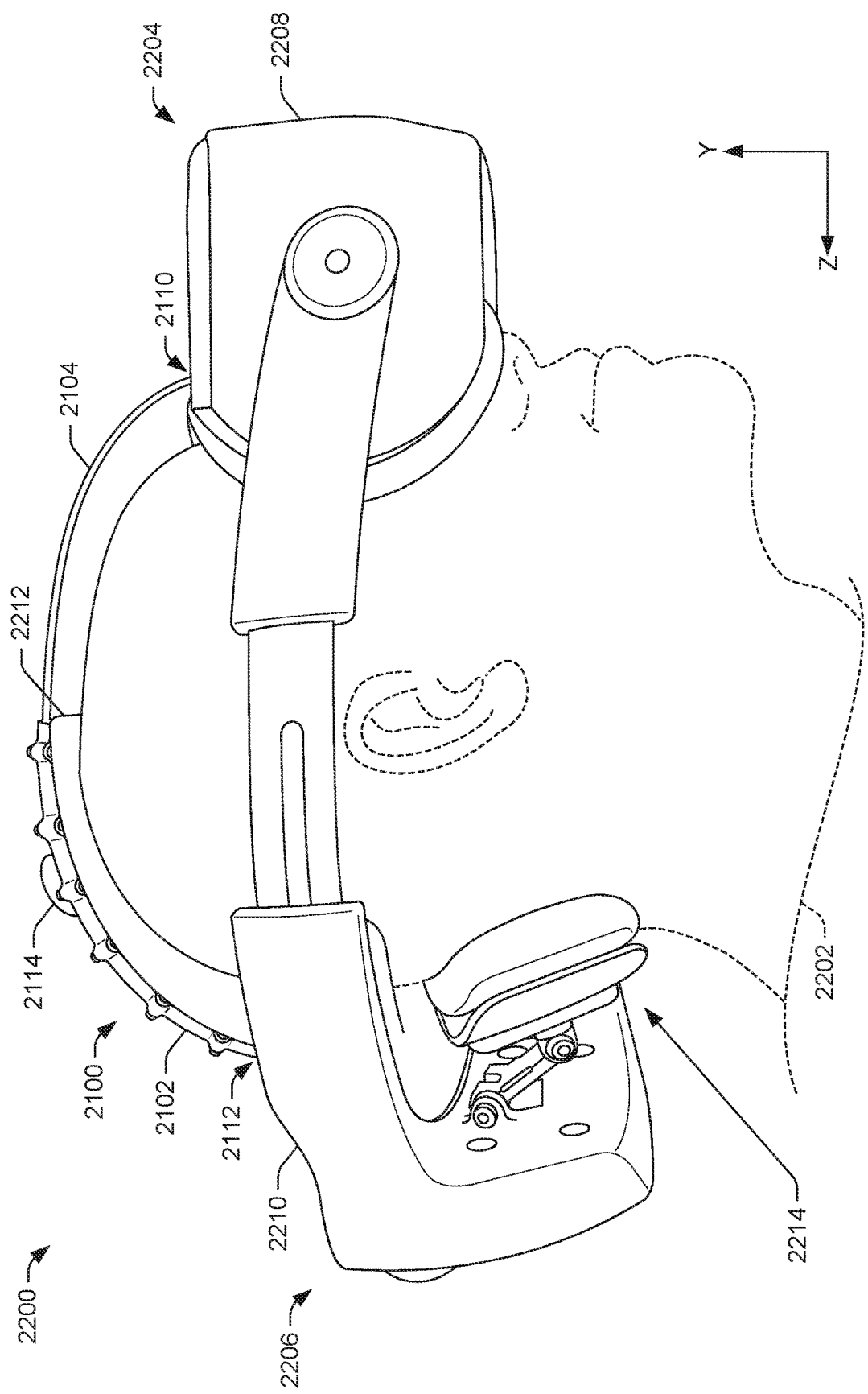
FIG. 22 illustrates a side view of an example head-mounted display, showing the wire routing assembly of FIG. 21A being usable with the example head-mounted display, according to an embodiment of the present disclosure.

FIG. 22 illustrates a HMD 2200 being worn by a user 2202 that includes the wire route 2100. In some instances, the HMD 2200 may represent, correspond to, or include similar features as the HMD 100, the HMD 1400, and/or the HMD 1600 discussed herein above. For instance, the HMD 2200 may include one or more members that adjust in length to accommodate for varying head sizes of users and/or adjust a tightness of the HMD 2200 on the user 2202. The one or more members may span or extend between a front 2204 and a back 2206 of the HMD 2200 and may engage or operably couple to one or more actuators.

As shown in FIG. 22, the wire route 2100 extends between the front 2204 and the back 2206 of the HMD 2200 to span over a top of the head of the user 2202 or over a crown of the head of the user 2202. For instance, the first end 2106 of the slide 2104 may couple to a display 2208 located at the front 2204 of the HMD 2200. In some instances, the first end 2106 may hingedly, rotatably, or pivotably couple to the display 2208 to permit the display 2208 to adjust and conform to the user 2202.

The slide 2104 may extend into or within the housing 2102 and engage the actuator 2114 via the slots 2116 on the slide 2104. The second end 2112 of the housing 2102 may engage with the back 2206 of the HMD 2200, such as a housing or compartment 2210.

The user 2202 may utilize the actuator 2114 to extend a length of the slide 2104 protruding from the housing 2102, thereby adjusting a distance interposed between the front 2204 and the back 2206 of the HMD 2200. That is, actuating the actuator 2114 may cause the slide 2104 to extend from, or retract within, the housing 2102. As the slide 2104 couples to the display 2208, and the housing 2102 couples to the compartment 2210, actuating the actuator 2114 causes the slide 2104 to move to either tighten and/or loosen from the user 2202.

As shown in FIG. 22, the housing 2102 and/or the slide 2104 may include a curvature that corresponds to, or substantially corresponds to, the shape of the top of the head of the user 2202. Additionally, a padding 2212 may be disposed between the housing 2102 and the user 2202 to increase a comfort of the HMD 2200. FIG. 22 also illustrates that the HMD 2200 may include a harness 2214, which may be similar to, correspond to, or include similar features as the harness 1606.

Figure 23:
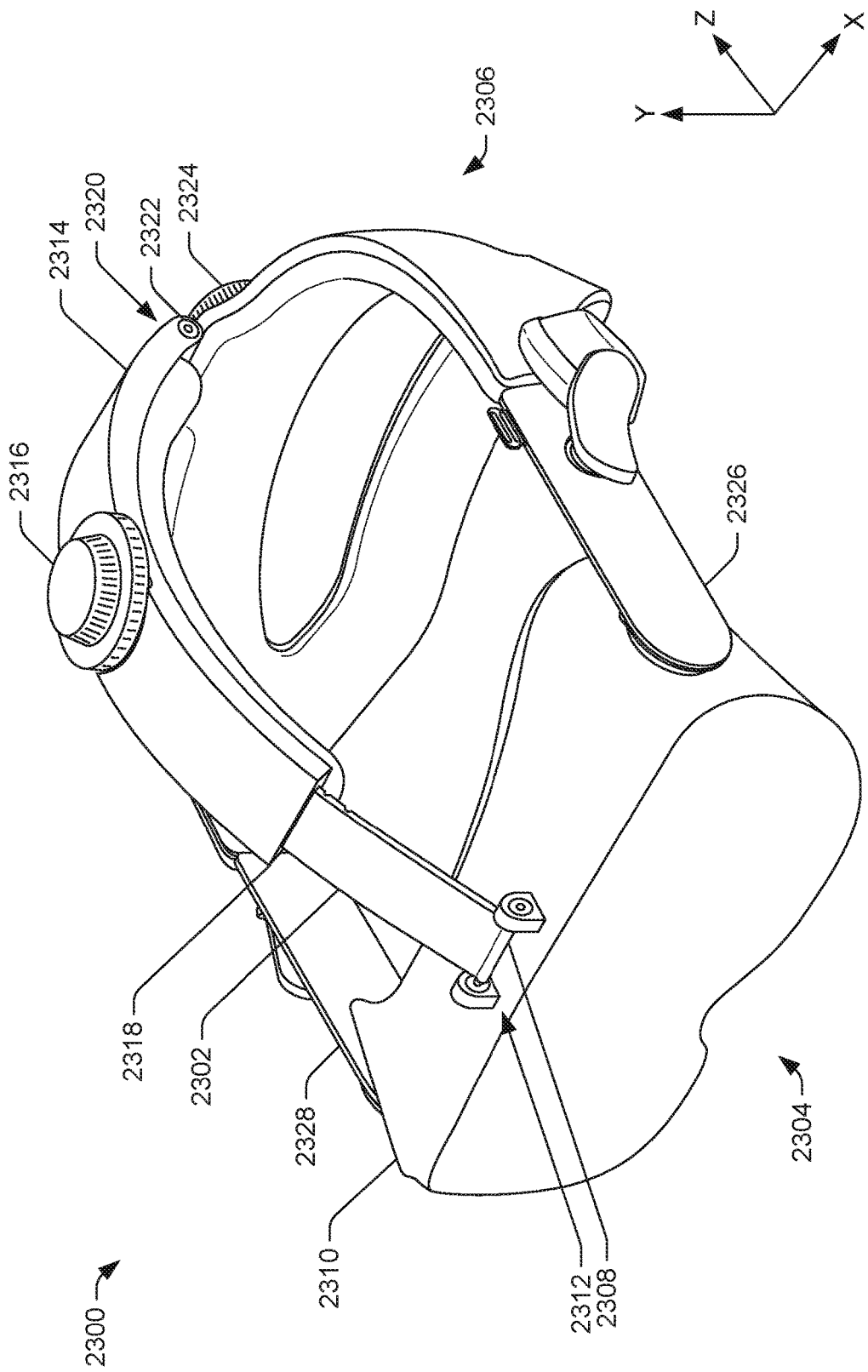
FIG. 23 illustrates a perspective view of an example head-mounted display, according to an embodiment of the present disclosure.

FIG. 23 illustrates an example HMD 2300. As shown in FIG. 23, the HMD 2300 may include a top member 2302 extending from a front 2304 of the HMD 2300 towards a back 2306 of the HMD 2300. A first end 2308 of the top member 2302 is shown coupling to a display 2310 of the HMD 2300 via a hinge 2312. As a result, the top member 2302 may be configured to pivot in relation to the display 2310 (e.g., about the X-axis) so as to confirm the display 2310 to the face of the user when worn.

As shown in FIG. 23, and as discussed above with regard to the HMD 100, the HMD 1400, the HMD 1600, and/or the HMD 2200, the top member 2302 may include a second end disposed within a sleeve 2314. The top member 2302 may include slots that engage with a top actuator 2316 coupled to the sleeve 2314. In some instances, the slots of the top member 2302 may be similar to the slots 118, and the top actuator 2316 may be similar to the top actuator 120, as discussed hereinabove with regard to the HMD 100. Actuating the top actuator 2316 may cause the top member 2302 to telescopically extend and retract at various lengths from the sleeve 2314, thereby increasing or decreasing a tightness of the HMD 2300 on the user. In other words, actuating the top actuator 2316 may increase or decrease an exposed length of the top member 2302 from the sleeve 2314. The slots of the top member 2302 may be disposed internal to or within the sleeve 2314.

In some instances, the top member 2302 may comprise a flexible material (e.g., rubber, plastics, etc.) that is configured to arc, bend, and/or otherwise conform to the head of the user. In some instances, the top member 2302 may also include notches that permit the top member 2302 to bend or flex.

In some instances, the top member 2302 may include a wire that routes between the front 2304 and the back 2306 of the HMD 2300. In some instances, the wire may be integrally formed within the top member 2302 and may extend between the first end 2308 of the top member 2302 and the second end of the top member 2302. Between the first end 2308 and the second end, the wire may traverse around the slots within the top member 2302. Additionally, the wire may include slack external to the top member 2302 (e.g., not embedded therein) that permits the top member 2302 to extend and retract at varying lengths from the sleeve 2314.

FIG. 23 illustrates the top member 2302 extending into the sleeve 2314 at a first end 2318 of the sleeve 2314. A second end 2320, opposite the first end 2318 of the sleeve 2314, may couple to the back 2306 of the HMD 2300 via a hinge 2322. The hinge 2322 may pivotably couple the second end 2320 of the sleeve 2314 to the back 2306 of the HMD 2300.

The HMD 2300 includes a rear actuator 2324 that may engage with one or more lateral members, such as a first lateral member 2326 and a second lateral member 2328. In some instances, the first lateral member 2326 and the second lateral member 2328 may be similar to the first lateral member 122 and the second lateral member 124, as discussed above with regard to the HMD 100, while the rear actuator 2324 may be similar to the rear actuator 202 to operably engage the first lateral member 2326 and/or the second lateral member 2328.

FIG. 24 illustrates a top view of the HMD 2300. As shown, the top member 2302 may extend from the front 2304 of the HMD 2300 towards the back 2306 of the HMD 2300 and operably engage with the top actuator 2316 via slots 2400 extending along a portion of the length of the top member 2302. In FIG. 24, the slots 2400 are represented generally by dashed lines. In some instances, the slots 2400 may be similar to the slots 118 as discussed hereinabove with regard to the HMD 100. Accordingly, actuating the top actuator 2316 may cause the top member 2302 to extend from, and retract within, the sleeve 2314 at varying lengths, thereby tightening and loosening the HMD 2300 to the user. FIG. 24 also illustrates the second end 2402 of the top member 2302 disposed within the sleeve 2314.

Figure 25:
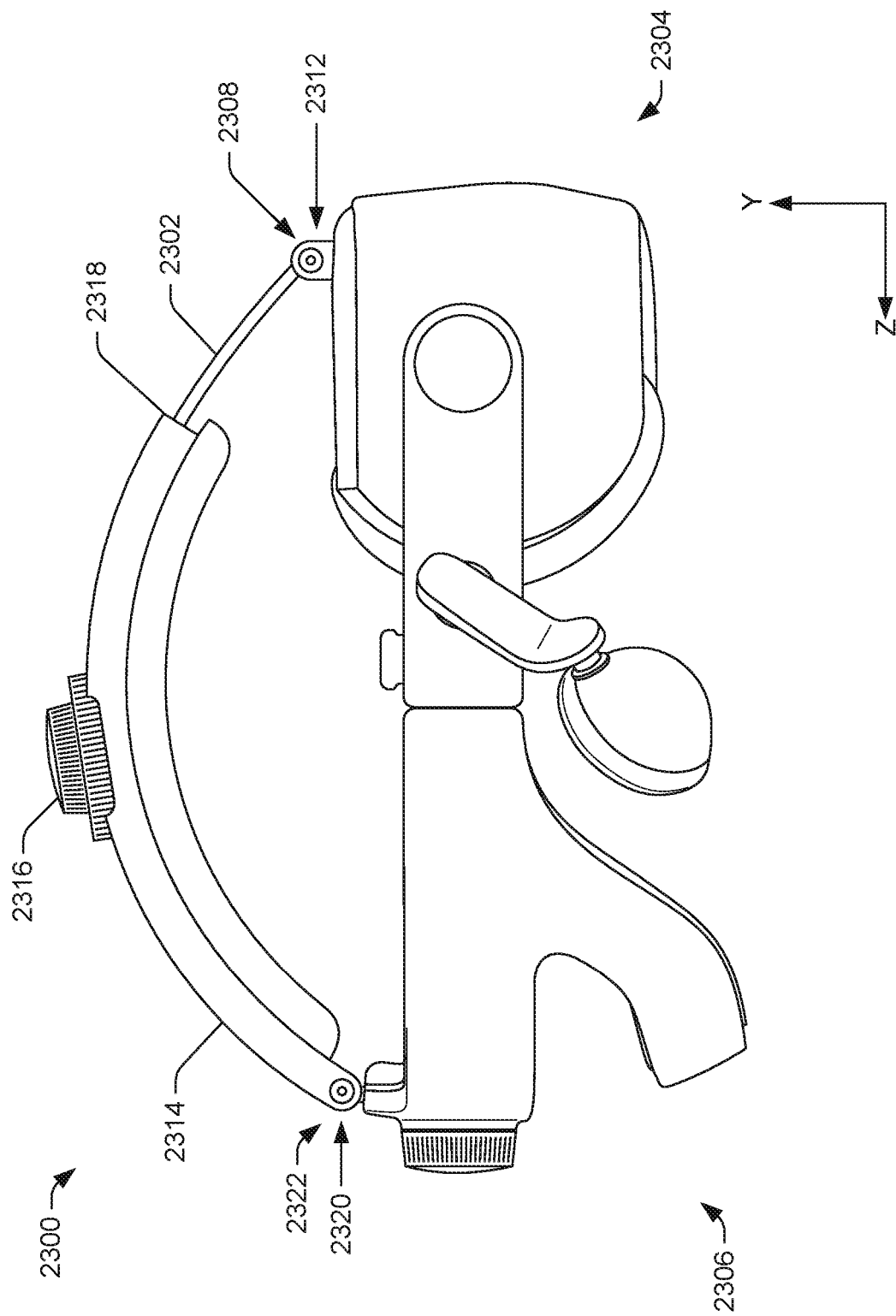
FIG. 25 illustrates a side view of the example head-mounted display of FIG. 23, according to an embodiment of the present disclosure.

FIG. 25 illustrates a side view of the HMD 2300, showing the top member 2302 pivotably coupling to the front 2304 of the HMD 2300, at the first end 2308, and via the hinge 2312. The second end 2320 of the sleeve 2314 may pivotably couple to the back 2306 of the HMD 100 via the hinge 2322. Accordingly, the HMD 2300 may be configured to conform to the head of the user when worn.

The second end 2320 of the top member 2302 may traverse through an opening at the first end 2318 of the sleeve 2314 and the slots 2400 may engage with the top actuator 2316. Additionally, as noted above, the top member 2302 may include a wire disposed therein (e.g., embedded within the top member 2302) or coupled thereto in order to communicatively couple one or more computing components located at the front 2304 (e.g., antenna, display, etc.) with one or more computing components located at the back 2306 (e.g., antenna, battery, etc.).

Figure 26:
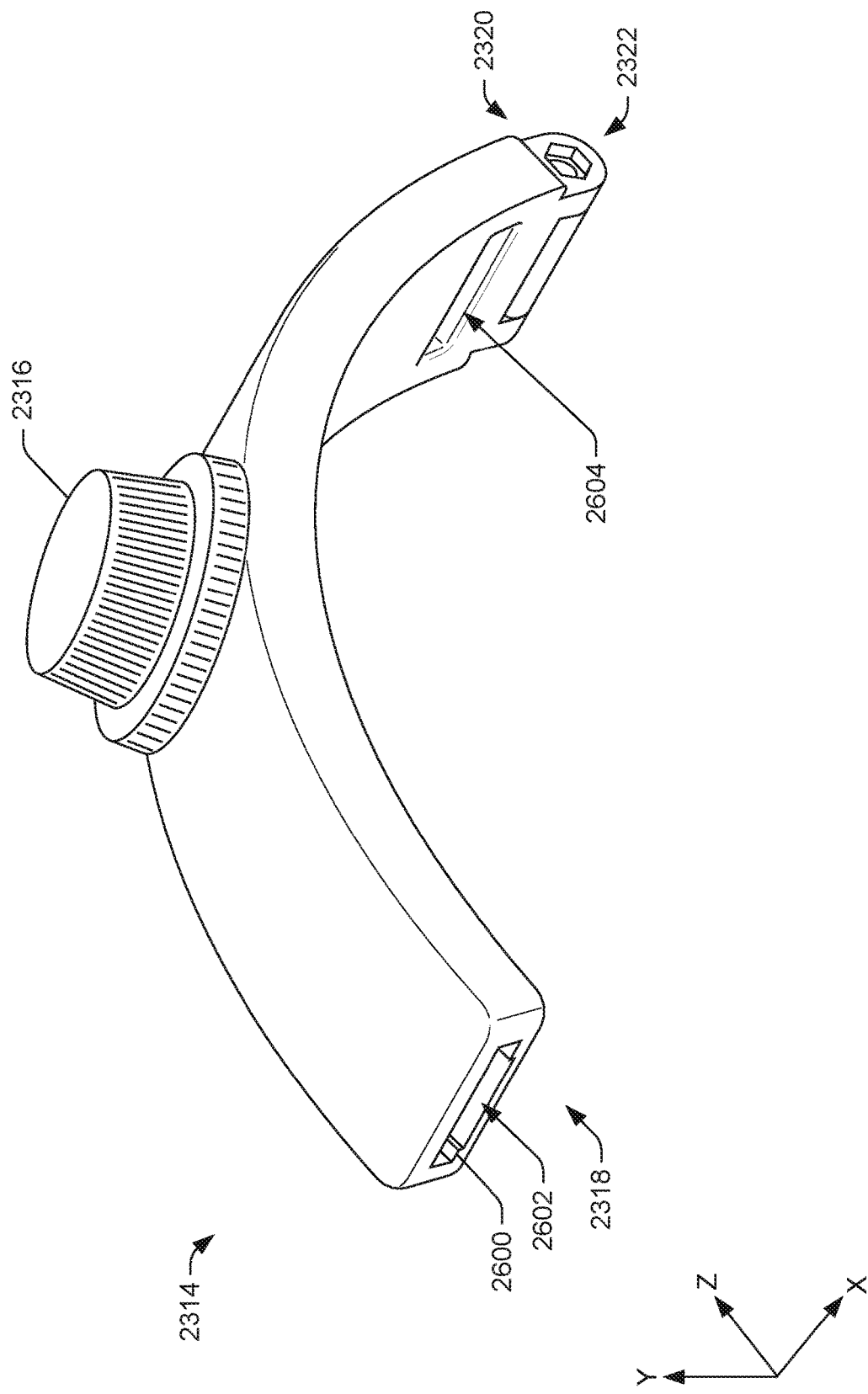
FIG. 26 illustrates an example sleeve usable with the example head-mounted display of FIG. 23, according to an embodiment of the present disclosure.

FIG. 26 illustrates the sleeve 2314 of the HMD 2300. In some instances, the sleeve 2314 may comprise a single piece of material, or may include multiple portions (e.g., two halves) that are assembled or coupled together. As shown, the sleeve 2314 may comprises an arcuate shape between the first end 2318 and the second end 2320.

The first end 2318 may include an opening 2600 sized and configured to receive the top member 2302. In some instances, the opening 2600 may comprise an opening for a channel 2602 disposed within the sleeve 2314. The channel 2602 may include a passageway in which the top member 2302 may telescopically extend from and retract within, thereby permitting the HMD 2300 to tighten and loosen from the user. Within the channel 2602, the slots 2400 may engage with the top actuator 2316. The channel 2602 may also be of sufficient size to permit the one or more wires to extend therethrough.

The second end 2320 of the sleeve 2314 may include the hinge 2322 for pivotably coupling the sleeve 2314 with the back 2306 of the HMD 2300, such as a housing.

Additionally, as shown in FIG. 26, the sleeve 2314 may include an opening 2604 located proximate to the second end 2320 of the sleeve 2314. The opening 2604 may extend thorough a sidewall of the sleeve 2314 to provide access or a passageway into the channel 2602. For instance, as noted above, the top member 2302 may include a wire embedded therein and a first end of the wire may extend from the first end 2308 of the top member 2302, while a second end of the wire may extend from the second end of the top member 2302. As the second end 2402 of the top member 2302 is disposed within the sleeve 2314, the second end of the wire way exit from within the sleeve 2314 and/or the channel 2602 via the opening 2604. However, the opening 2604 may be located elsewhere proximate to the second end 2320 of the sleeve 2314.

Figure 27:
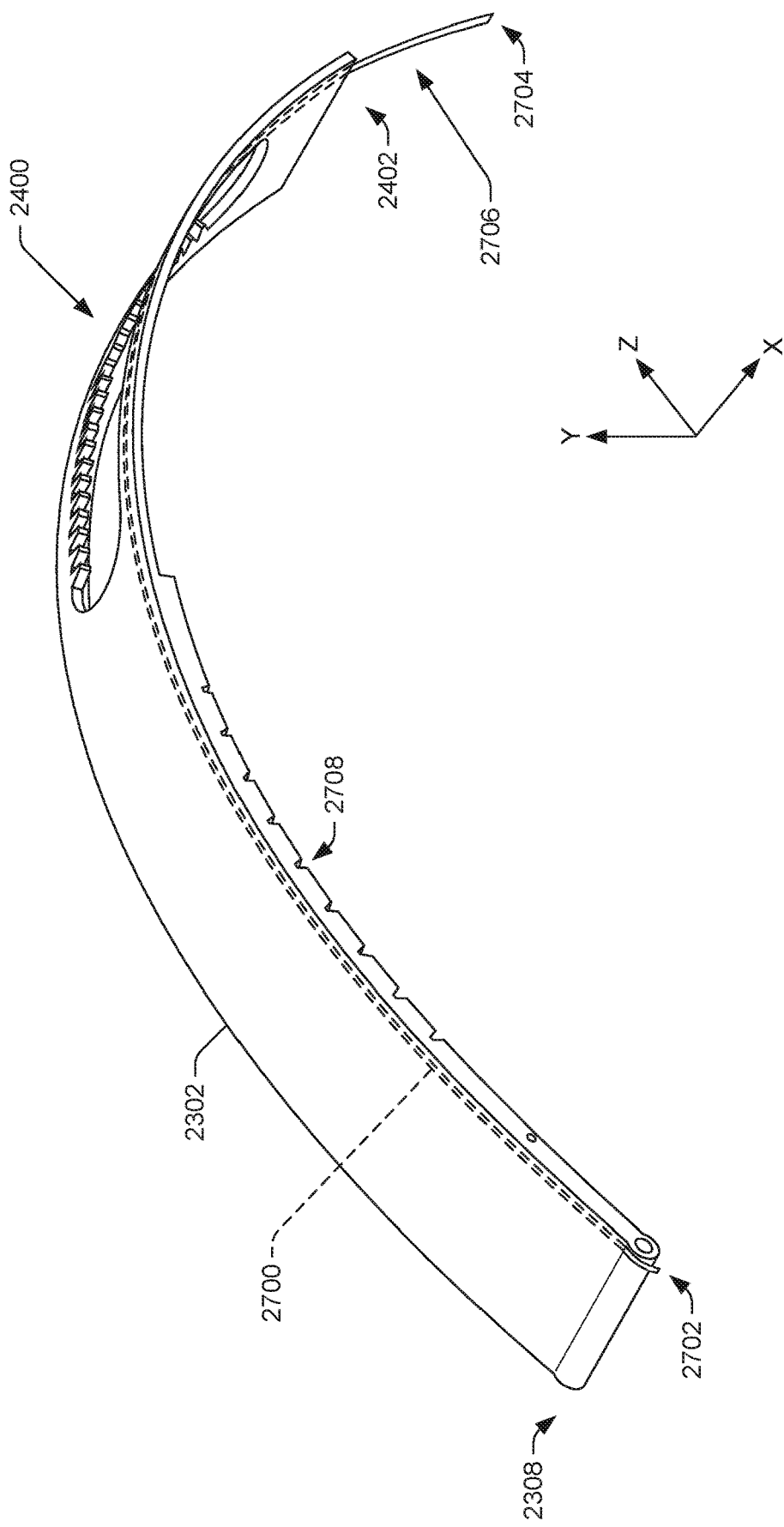
FIG. 27 illustrates an example member operable with the example sleeve of FIG. 26, according to an embodiment of the present disclosure.

FIG. 27 illustrates a perspective view of the top member 2302. As shown, the top member 2302 may comprise an arcuate member that extends between the first end 2308 and the second end 2402. Noted above, the second end 2402 may be sized and configured to insert through the opening 2600, such that the top member 2302 may telescopically extend from and retract within the sleeve 2314.

The top member 2302 may include a wire 2700. In some instances, the wire 2700 may be embedded within the top member 2302. In FIG. 27, the wire 2700 is represented generally by dashed lines to illustrate the wire 2700 within the top member 2302. Additionally, or alternatively, the wire 2700 may attach, adhere, mount, or otherwise couple to the top member 2302. As shown, the wire 2700 may include a first end 2702 extending from the first end 2308 of the top member 2302, and a second end 2704 extending from the second end 2402 of the top member 2302. Between the first end 2702 and the second end 2704, the wire 2700 may traverse through, along, and/or within the top member 2302. Moreover, as the top member 2302 includes the slots 2400 disposed through a thickness or portion of the top member 2302, the wire 2700 may traverse alongside or around the slots 2400.

As discussed above, the second end 2704 of the wire 2700 may feed or be disposed through the opening 2604 of the sleeve 2314. To permit the top member 2302 to extend from the sleeve 2314 at varying lengths, so as to tighten and loosen the HMD 2300 to the user, the wire 2700 may include a sufficient length and/or slack. For instance, the wire 2700 may include slack 2706 between the second end 2402 of the top member 2302 and the second end 2704 of the wire 2700. The slack 2706 may permit the top member 2302 to extend from the sleeve 2314 at varying lengths. In some instances, the slack 2706 may coil within the sleeve 2314 to prevent the wire 2700 from buckling or crimping when extending from and retracting within the sleeve 2314.

The top member 2302 may include materials (e.g., rubber, composites, plastics, etc.) that permit the top member 2302 to flex or arcuate. In addition, the top member 2302 may include dents, depressions, divots, or notches 2708 that permit or assist in permitting the top member 2302 to bend.

Figure 28:
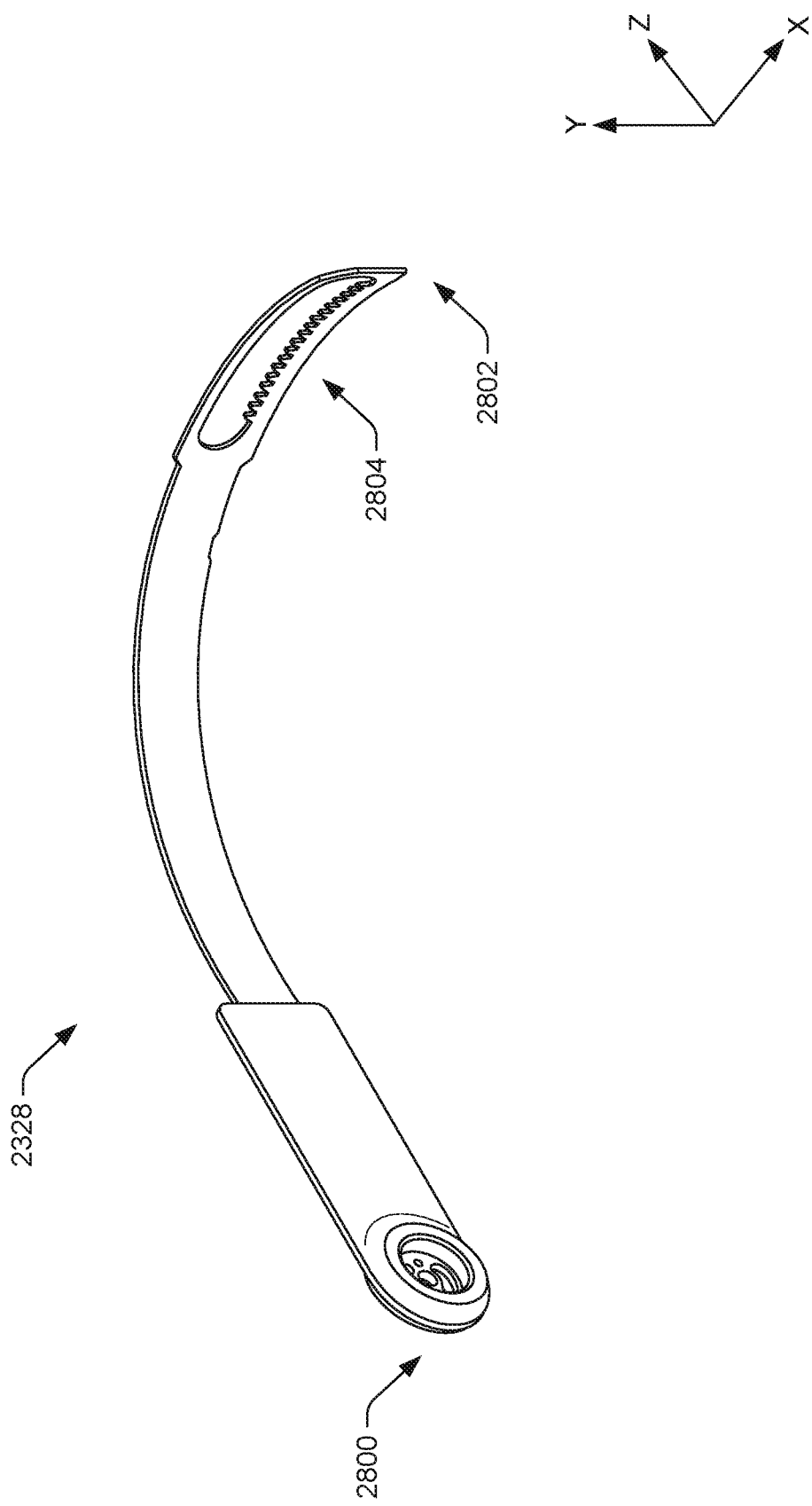
FIG. 28 illustrates an example member usable with the example head-mounted display of FIG. 23, according to an embodiment of the present disclosure.

FIG. 28 illustrates a perspective view of the second lateral member 2328. The second lateral member 2328 may include a first end 2800 for hingedly or pivotably coupling to the front 2304 (e.g., a display) of the HMD 2300, and a second end 2802 for engaging with the rear actuator 2324 of the HMD 2300. For instance, as shown, the second lateral member 2328 may include slots 2804 extending along at least a portion of the length of the second lateral member 2328 and which are configured to engage at varying positions with the rear actuator 2324. In some instances, the slots 2804 may be similar to the slots 706.

As shown, the second lateral member 2328 may have an arcuate shape designed to extend between the front 2304 and the back 2306 of the HMD 2300. As such, the second lateral member 2328 may include flexible and/or semi-rigid materials (e.g., plastic, components, rubber, etc.).

The first lateral member 2326 may include similar features as the second lateral member 2328. For instance, the second lateral member 2328 may represent the first lateral member rotated about the Z-axis.

Figure 29:
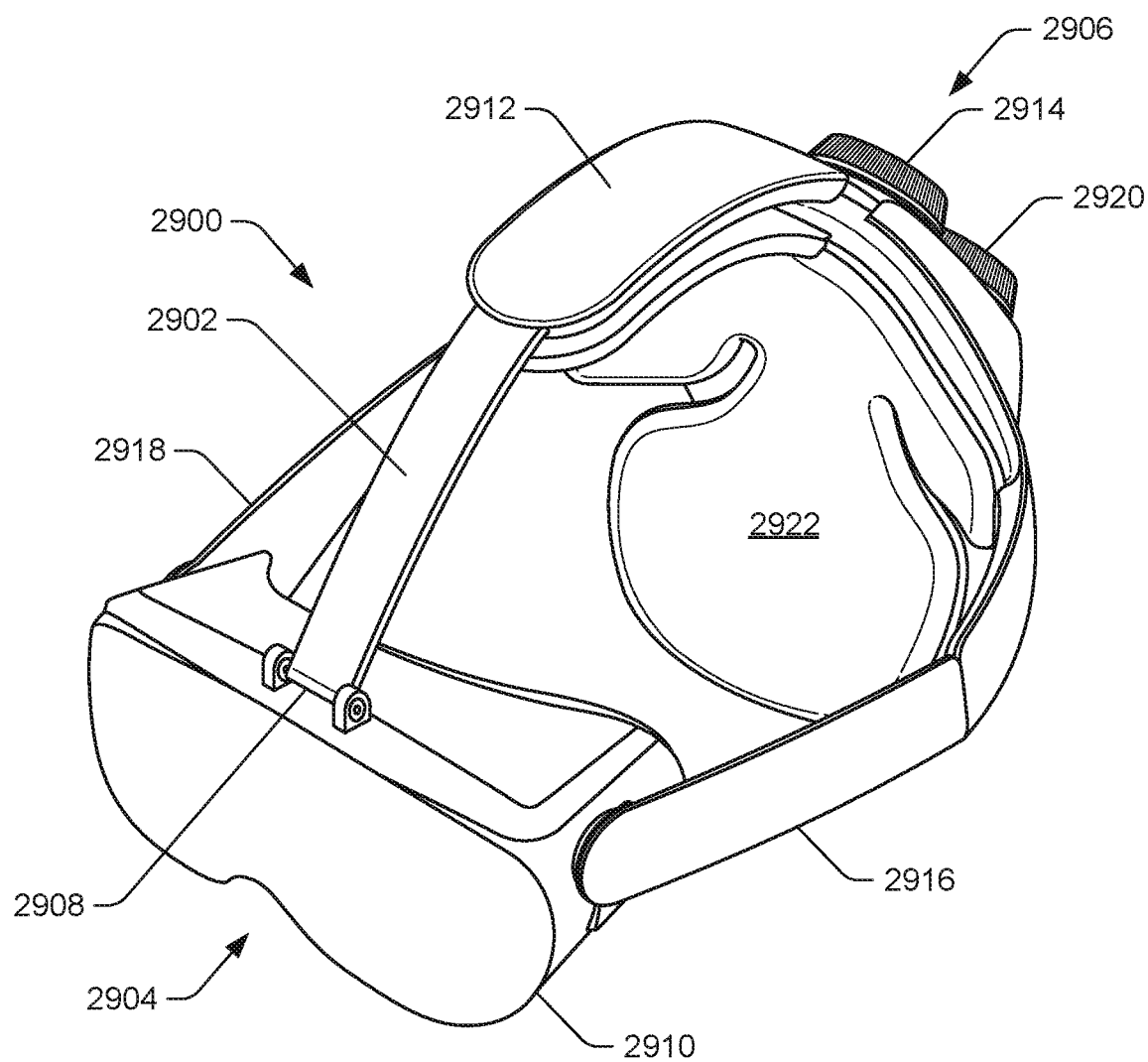
FIG. 29 illustrates a front perspective view of an example head-mounted display, according to an embodiment of the present disclosure.

FIG. 29 illustrates an example HMD 2900. As shown in FIG. 29, the HMD 2900 may include a top member 2902 extending from a front 2904 of the HMD 2900 towards a back 2906 of the HMD 2900. A first end 2908 of the top member 2902 is shown coupling to a display 2910 of the HMD 2900 (e.g., via a hinge). As a result, the top member 2902 may be configured to pivot in relation to the display 2910 to confirm the display 2910 to the face of the user when worn.

The top member 2902 may extend into or through a sleeve 2912 and route to the back 2906 of the HMD 2900. As discussed in detail herein, a second end of the top member 2902, or a portion of the top member 2902 may engage with a first actuator 2914 for adjusting a fit of the HMD 2900 on the user when user. For example, the top member 2902 may include slots that engage with the first actuator 2914. In some instances, the slots of the top member 2902 may be similar to the slots 118, and the first actuator 2914 may be similar to the top actuator 120, as discussed hereinabove with regard to the HMD 100. Accordingly, actuating the first actuator 2914 may cause the top member 2902 to telescopically extend and retract at various lengths, thereby increasing or decreasing a tightness of the HMD 2900 on the user. In some instances, the slots of the top member 2902 may be disposed internal to the back of the HMD 2900. The top member 2902 may comprise a flexible material (e.g., rubber, plastic, etc.) that is configured to arc, bend, and/or otherwise conform to the head of the user.

The HMD 2900 also includes one or more lateral members, such as a first lateral member 2916 and a second lateral member 2918. In some instances, the first lateral member 2916 and the second lateral member 2918 may be similar to the first lateral member 122 and the second lateral member 124, as discussed above with regard to the HMD 100. The first lateral member 2916 and the second lateral member 2918 may extend along opposing sides of the HMD 2900, between the front 2904 and the back 2906, and engage with a second actuator 2920. In such instances, the first lateral member 2916 and/or the second lateral member 2918 may extend into or be received by portions of a housing at the back of the HMD 2900.

In some instances, the second actuator 2920 may be similar to the rear actuator 202 and operably engage the first lateral member 2916 and the second lateral member 2918. Actuating the second actuator 2920 may cause an exposed length of the first lateral member 2916 and the second lateral member 2918 to increase or decrease t to tighten or loosen the HMD 2900 to/from the user.

As shown, the first actuator 2914 and the second actuator 2920 may be disposed, or located proximate to the back 2906 of the HMD 2900. That is, as compared to the HMD 100, for instance, whereby the top actuator 202 is located at a top of the HMD 100, the first actuator 2914 of the HMD 2900 may be disposed closer, proximate, and/or at the back 2906 of the HMD 2900. In some instances, locating the first actuator 2914 and/or the second actuator 2920 at the back 2906 of the HMD 2900 may allow the user to more conveniently tighten and loosen the HMD 2900 (i.e., as the first actuator 2914 and the second actuator 2920 may be disposed closer to one another). Details of the first actuator 2914 and the second actuator 2920 are discussed herein.

The HMD 2900 may further include a rear harness 2922 that engages with a back of the head of the user when the HMD 2900 is worn. In some instances, the rear harness 2922 may include fissions or features that permit the rear harness 2922 to flex or conform the head of the user (e.g., above and below the occipital lobe of the user). In some instances, the rear harness 2922 may engage with the housing at the back 2906 of the HMD 2900, or couple to the housing, using one or more ball joints.

As further discussed herein, the HMD 2900 may include a flexible printed circuit board assembly (FPCBA), one or more wires coupled together, and/or a flexible printed circuit (FPC) that communicatively couple components at the front 2904 with components at the back 2906. In some instances, the FPC may route through a jacket and/or the sleeve 2912 to conceal the FPC and provide the HMD 2900 with a clean aesthetic appearance. In some instances, the FPC may couple to portions of the top member 2902 for routing the FPC between the front 2904 and the back 2906. Moreover, the FPC may include a service loop that provides the FPC with slack, thereby permitting the FPC to extend and retract as the HMD 2900 tightens and loosens to the user (e.g., via actuating the first actuator 2914 and the second actuator 2920). In some instances, the FPC may include a "S-shaped" service loop that routes within the sleeve 2912 to provide the FPC slack when extending and retracting.

Although the HMD 2900 (or other HMDs discussed herein) is shown and described including the first actuator 2914 and the second actuator 2920 that engage with the top member 2902 and the first lateral member 2916 and the second lateral member 2918, respectively, in some instances, the HMD 2900 may include a single actuator that tightens and loosens the HMD 2900 to the user. For example, in some instances, the top member 2902, the first lateral member 2916, and the second lateral member 2918 may engage with a single actuator located at the back 2906 of the HMD 2900. In this sense, the functionalities of the first actuator 2914 and the second actuator 2920 may be combinable into a single actuator. For example, actuating (e.g., rotating) the actuator in a first direction may cause the HMD 2900 to tighten, while actuating (e.g., rotating) the actuator in a second direction may cause the HMD 2900 to loosen. To permit such operation, in some instances, the top member 2902, the first lateral member 2916, and the second lateral member 2918 may include slots that engage with the single actuator. In some instances, the top member 2902 may engage with a first portion of the single actuator (e.g., a first gear), while the first lateral member 2916 and the second lateral member 2918 may engage with a second portion of the single actuator (e.g., a second gear). The first portion and the second portion may operably couple to the single actuator such that actuating the single actuator tightens and loosens the HMD 2900 to the head of the user in multiple directions (e.g., vertically and horizontally). In some instances, the first portion and the second portion (or other portions of the single actuator) may include respective ratios (e.g., gear ratios) for tightening the top member 2902, the first lateral member 2916, and the second lateral member 2918, respectively. For example, the top member 2902, the first lateral member 2916, and/or the second lateral member 2918 may be extended and/or retracted at different rates.

Additionally, or alternatively, the HMD 2900 (or other HMDs discussed herein) may include self-tightening features that tighten the HMD 2900 to the user. For example, one or more of the top member 2902, the first lateral member 2916, and/or the second lateral member 2918 may be operably coupled to one or more motors within the HMD 2900. Actuating the one or more motors may tighten the top member 2902, the first lateral member 2916, and/or the second lateral member 2918. In some instances, the HMD 2900 may include sensors disposed throughout the HMD 2900 (e.g., on the display 2910, on the rear harness 2922, etc.) that sense a force exerted by the HMD 2900 on the user. If the force is too low, which may represent that the HMD 2900 is not securely fastened to the user, the one or more motors may tighten one or more of the top member 2902, the first lateral member 2916, and/or the second lateral member 2918 until the HMD 2900 securely couples to the user. Alternatively, if the sensors determine that the HMD 2900 is too tight, the one or more motors may loosen one or more of the top member 2902, the first lateral member 2916, and/or the second lateral member 2918. In some instances, the self-tightening features may be used in combination with the user manually (or physically) operating the first actuator 2914 and/or the second actuator 2920.

In some instances, the HMD 2900 (or another communicatively coupled device) may store characteristics of the head size, or tightening preferences of the user, in association with user profiles to automatically tighten the HMD 2900 to the user upon being worn. Such features may also learn the behaviors of the user to determine preferences associated with the user wearing the HMD 2900.

Moreover, in some instances, the HMD 2900 may communicatively couple to a mobile device to electronically tighten and loosen the HMD 2900. For example, the HMD 2900 may include motors that are operable through an application on the mobile device to tighten and loosen the HMD 2900. Such motors may also, in some instances, be operable through one or more buttons located on the HMD 2900.

The HMD 2900 may also include one or more loudspeakers disposed on the first lateral member 2916 and/or the second lateral member 2918 for outputting sound to the user.

FIG. 30 illustrates the first actuator 2914 and the second actuator 2920 disposed at, or proximate to, the back 2906 of the HMD 2900. In some instances, the first actuator 2914 and/or the second actuator 2920 may couple to, or disposed, on a housing 3000 of the HMD 2900. In some instances, the first actuator 2914 may be disposed above (Y-direction) the second actuator 2920. Within the housing 3000, the first actuator 2914 may engage with the top member 2902 and the second actuator 2920 may engage with the first lateral member 2916 and/or the second lateral member 2918. For instance, the first actuator 2914 and/or the second actuator 2920 may include teeth, gears (e.g., spur), a pinion, tabs, or a sprocket that engages with the slots of the top member 2902, the first lateral member 2916, and the second lateral member 2918, respectively, inside the housing 3000. As such, the first actuator 2914 may be mateable with the top member 2902 at different positions along the length of the top member 2902 to extend the top member 2902 at varying lengths from the housing 3000. In some instances, the first actuator 2914 and the top member 2902 may vertically adjust the HMD 2900 on the user, or relative to the eyes of the user.

Moreover, the second actuator 2920 may be mateable with the first lateral member 2916 and the second lateral member 2918 at different positions along a length of the first lateral member 2916 and the second lateral member 2918, respectively, to extend the first lateral member 2916 and the second lateral member 2918 at varying lengths from the housing 3000, respectively (as similarly shown and similarly discussed in relation to FIG. 7). In some instances, the housing 3000 may include wings, arms, or extensions for receiving the first lateral member 2916 and the second lateral member 2918, respectively.

In some instances, the housing 3000 may include component(s) of the HMD 2900, such as various input/output devices, battery(ies), memory, processor(s), network interfaces, etc. To communicatively couple the component(s) with the display 2910, or other components disposed at the front 2904 of the HMD 2900 (e.g., antenna), the HMD 2900 may include a FPC 3002. As discussed above, the FPC 3002 may route between the front 2904 and the back 2906 of the HMD 2900. In some instances, at least a portion of the FPC 3002 may couple (e.g., adhesives) to at least a portion of the top member 2902. For example, proximate to the first end 2908 of the top member 2902, or proximate to the front 2904 of the HMD 2900, the FPC 3002 may couple to an inside surface of the top member 2902. Additionally, or alternatively, in some instances the FPC 3002 may be disposed within a jacket, casing, or other sheath that wraps around (or portions of) the top member 2902 to secure the FPC 3002 to the top member 2902.

Figure 31:
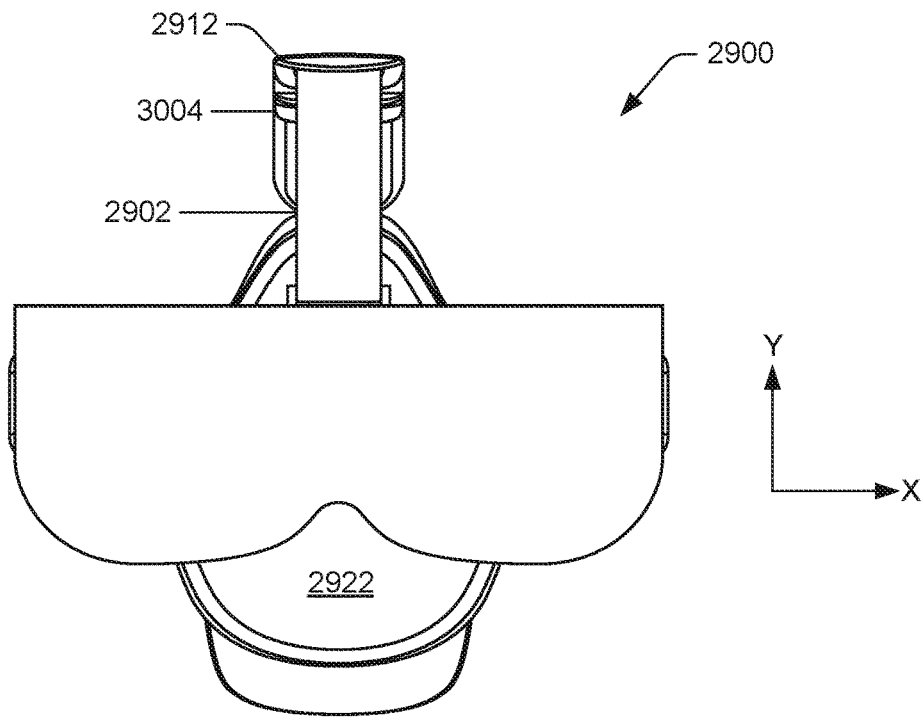
FIG. 31 illustrates a front view of the head-mounted display of FIG. 29, according to an embodiment of the present disclosure.

FIG. 31 illustrates a front view of the HMD 2900, showing the top member 2902 extending from the front 2904 and into the sleeve 2912, with a pad 3004 being disposed and/or coupled beneath the sleeve 2912.

Figure 32:
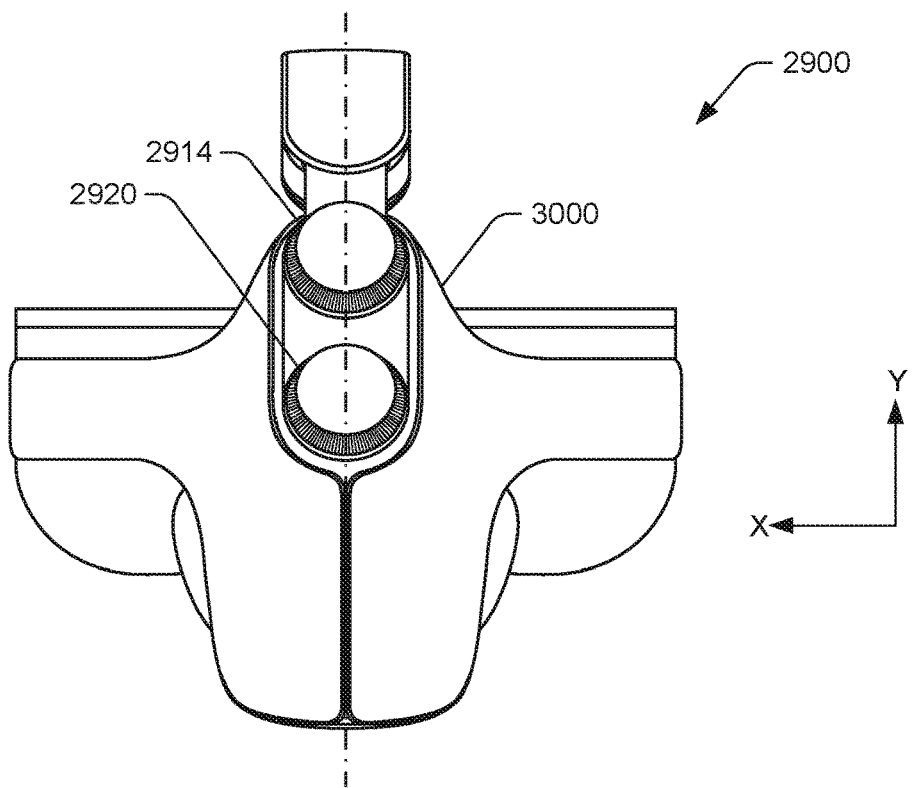
FIG. 32 illustrates a rear view of the head-mounted display of FIG. 29, according to an embodiment of the present disclosure.

FIG. 32 illustrates a rear view of the HMD 2900. In some instances, the first actuator 2914 and/or the second actuator 2920 may be disposed along a longitudinal axis 3200 (or plane) extending through a center of the HMD 2900. In doing so, in some instances, the first actuator 2914 and/or the second actuator 2920 may be centered (X-direction) on the HMD 2900.

Figure 33:
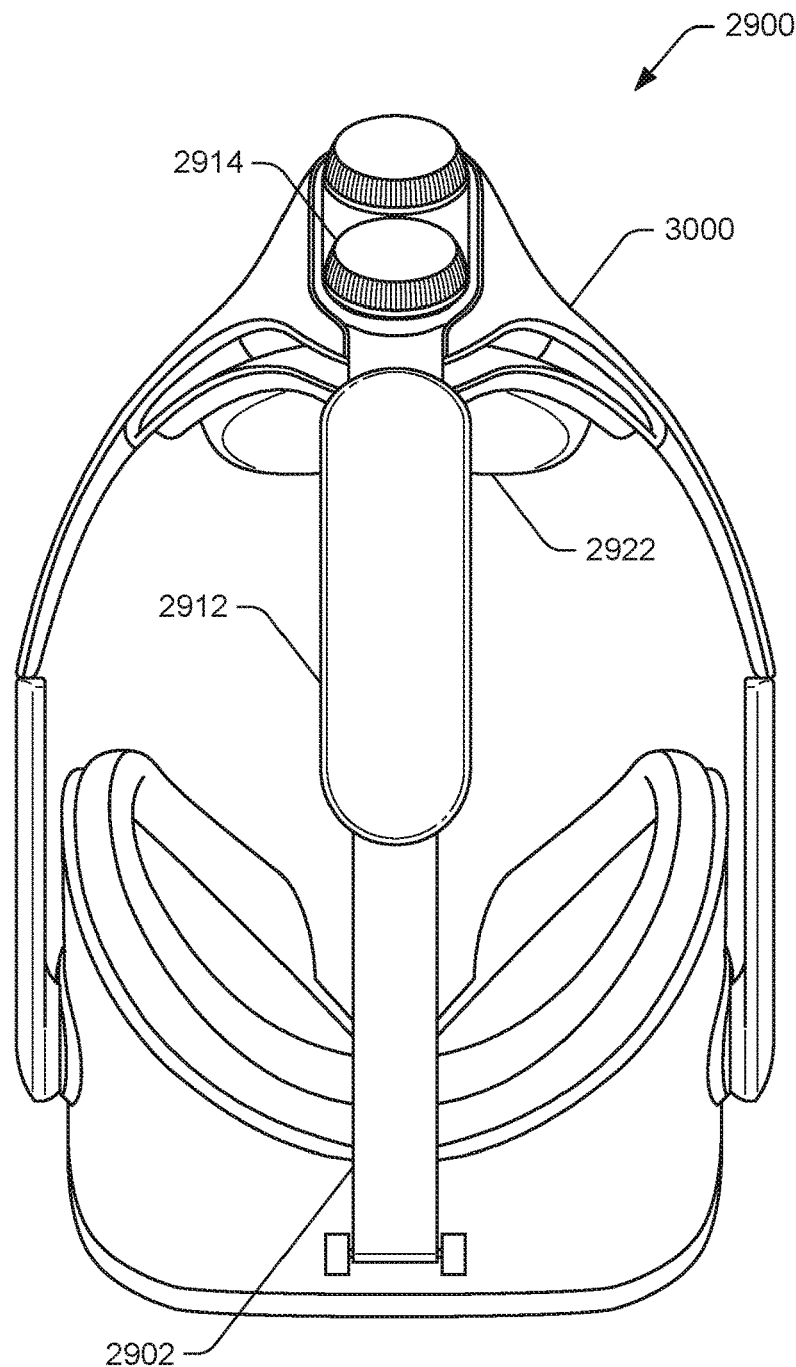
FIG. 33 illustrates a top view of the head-mounted display of FIG. 29, according to an embodiment of the present disclosure.

FIG. 33 illustrates a top view of the HMD 2900, showing the top member 2902 extending from the front 2904 to the back 2906 and through the sleeve 2912, so as to engage the first actuator 2914. The rear harness 2922 is shown extending from the back 2906, such as the housing 3000, to engage the head of the user when worn.

Figure 34:
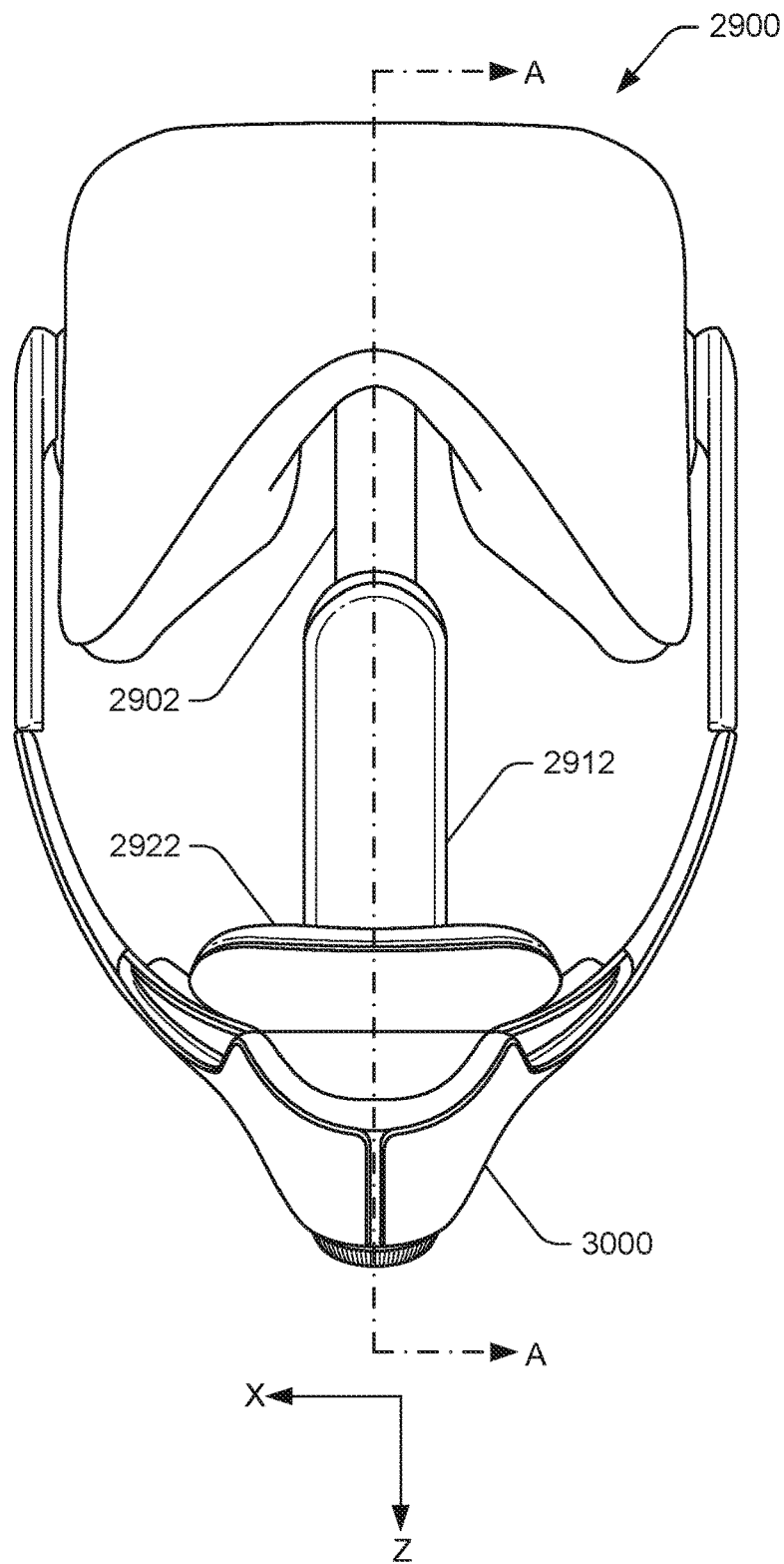
FIG. 34 illustrates a top view of the head-mounted display of FIG. 29, according to an embodiment of the present disclosure.

FIG. 34 illustrates a bottom view of the HMD 2900, showing the top member 2902 extending from the front 2904 to the back 2906 and through the sleeve 2912, so as to engage the first actuator 2914. The rear harness 2922 is shown extending from the back 2906, such as the housing 3000, to engage the head of the user when worn.

Figure 35:
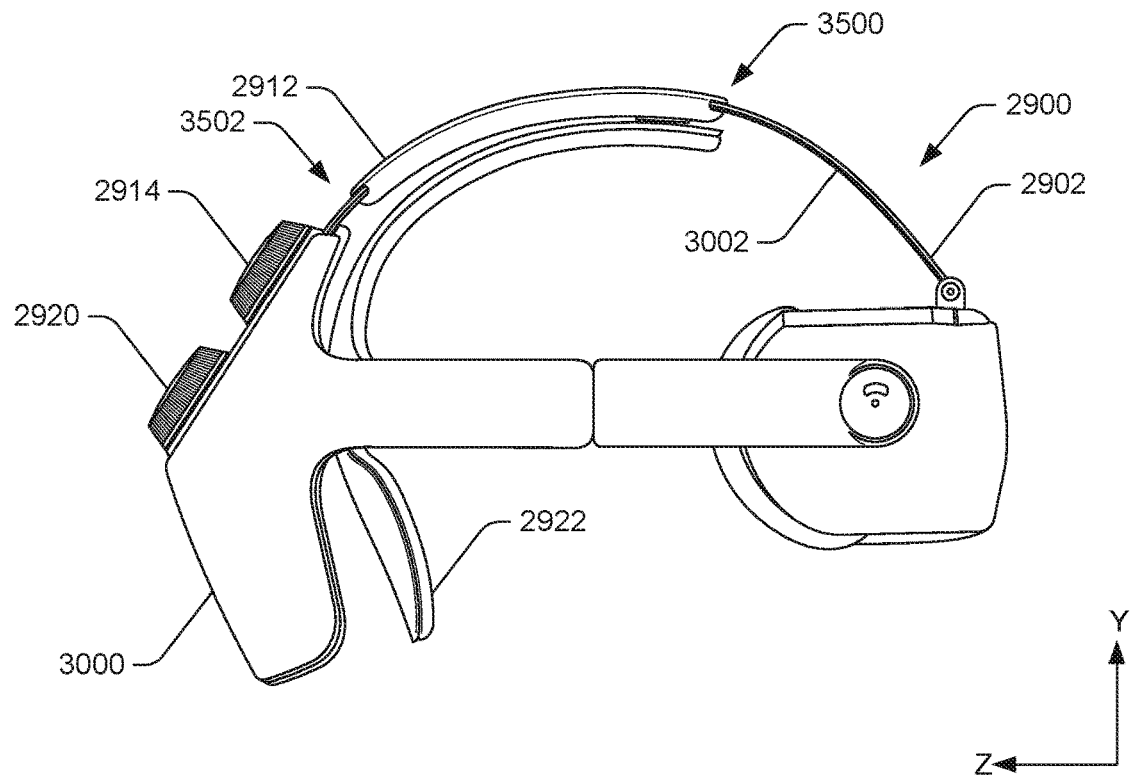
FIG. 35 illustrates a first side view of the head-mounted display of FIG. 29, according to an embodiment of the present disclosure.
Figure 36:
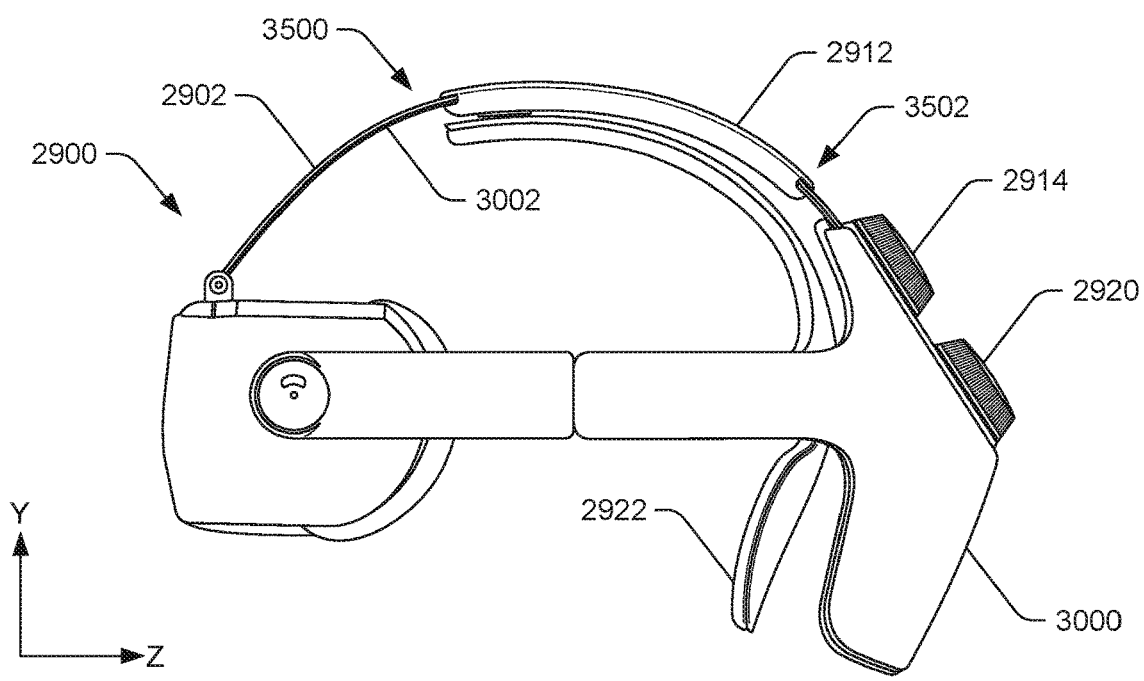
FIG. 36 illustrates a second side view of the head-mounted display of FIG. 29, according to an embodiment of the present disclosure.

FIGS. 35 and 36 illustrate a first side view and a second side view of the HMD 2900. As discussed above, the top member 2902 may extend through the sleeve 2912. For example, in some instances, the top member 2902 may extend into a first end 3500 of the sleeve 2912, and exit at a second end 3502 of the sleeve 2912. Similarly, as discussed above, the FPC 3002 may couple along a portion of the top member 2902, such as proximate to the front 2904 of the HMD 2900 and/or the back 2906 of the HMD 2900. Additionally, or alternatively, a jacket may be disposed over the FPC 3002 and/or the top member 2902 to adjoin or couple the top member 2902 and the FPC 3002. The jacket, for instance, may also conceal the FPC 3002. At a position between, the FPC 3002 may snake within the sleeve 2912 to provide a service loop, or slack, of the FPC 3002. In some instances, the FPC 3002 may couple to the top member 2902 at positions exterior to the sleeve 2912, and within the sleeve 2912, may snake back and forth (e.g., Z-direction) to provide slack for the FPC 3002 to extend and retract.

Also shown in FIGS. 35 and 36, the rear harness 2922 may extend from the housing 3000, so as to cusp the rear of the head when the HMD 2900 is worn. The rear harness 2922 may include components for conforming to individual head geometries. For example, springs or other biasing members may couple the rear hardness 2922 and the housing 3000 to provide pressure against the back of the head. This pressure may conform the rear harness 2922 to the user for providing a secure and comfortable fit. Additionally, or alternatively, the rear harness 2922 may include cutouts (e.g., slits, elliptical-shape, etc.) or void spots that provide the rear harness 2922 with flexure about one or more axes. For example, depending on the location and/or shape of the cutouts, the rear harness 2922 may flex at certain locations about one or more axes. This flexure may permit the rear harness 2922 to conform across the back of the head of the user to reduce pressure points and/or to evenly distribute pressure against the back of the head. In such instances, the rear harness 2922 may flex towards the front of the HMD 2900, towards the back 2906 of the HMD 2900, towards one or more sides of the HMD 2900, and/or towards the top of the HMD 2900.

Different materials and/or thicknesses at portions of the rear harness 2922 may also impact a flexure of the rear harness 2922. For example, different portions of the rear harness 2922 may be thicker while other portions may be thinner. This varying thickness may impact portions or locations of the rear harness 2922 that are configured to flex for conforming to the head of the user. The multi-axis flexure of the rear harness 2922 may provide for passive-suspension against the back of the head.

Moreover, in some instances, the rear harness 2922 may include the pad 3004 that rests on top of the head of the user. In this sense, in some instances, the pad 3004 may be integrally formed with the rear harness 2922. However, in some instances, the pad 3004 may include a separate component. In some instances, the rear harness 2922 and/or the pad 3004 may couple to the sleeve 2912, which may serve to position the sleeve 2912 on the HMD 2900 or locate the sleeve 2912 on the HMD 2900 (e.g., to prevent the sleeve 2912 from reposition and/or moving).

In some instances, the first actuator 2914 and/or the second actuator 2920 may be located on a portion of the housing 3000 that extends towards the front 2904 of the HMD 2900. In some instances, the first actuator 2914 may be disposed closer to the front 2904 of the HMD 2900 than the second actuator 2920 (Z-direction). In some instances, this may assist coupling the top member 2902 to the first actuator 2914 and/or providing a comfortable wear and feel of the HMD 2900 when worn. That is, the curvature of the top member 2902 may continue into the housing 3000 by disposing the first actuator 2914 and/or the second actuator 2920 as shown. Further, locating the first actuator 2914 and/or the second actuator 2920 on an inward slanted portion may assist in user in operating the first actuator 2914 and/or the second actuator 2920. In some instances, the second actuator 2920 may substantially horizontally align with the first lateral member 2916 and the second lateral member 2918. As discussed above, the first actuator 2914 and/or the second actuator 2920 may be angled or disposed and/or include corresponding shapes and/or features to engage the top member 2902 and the first lateral member 2916 and the second lateral member 2918, respectively.

Figure 37:
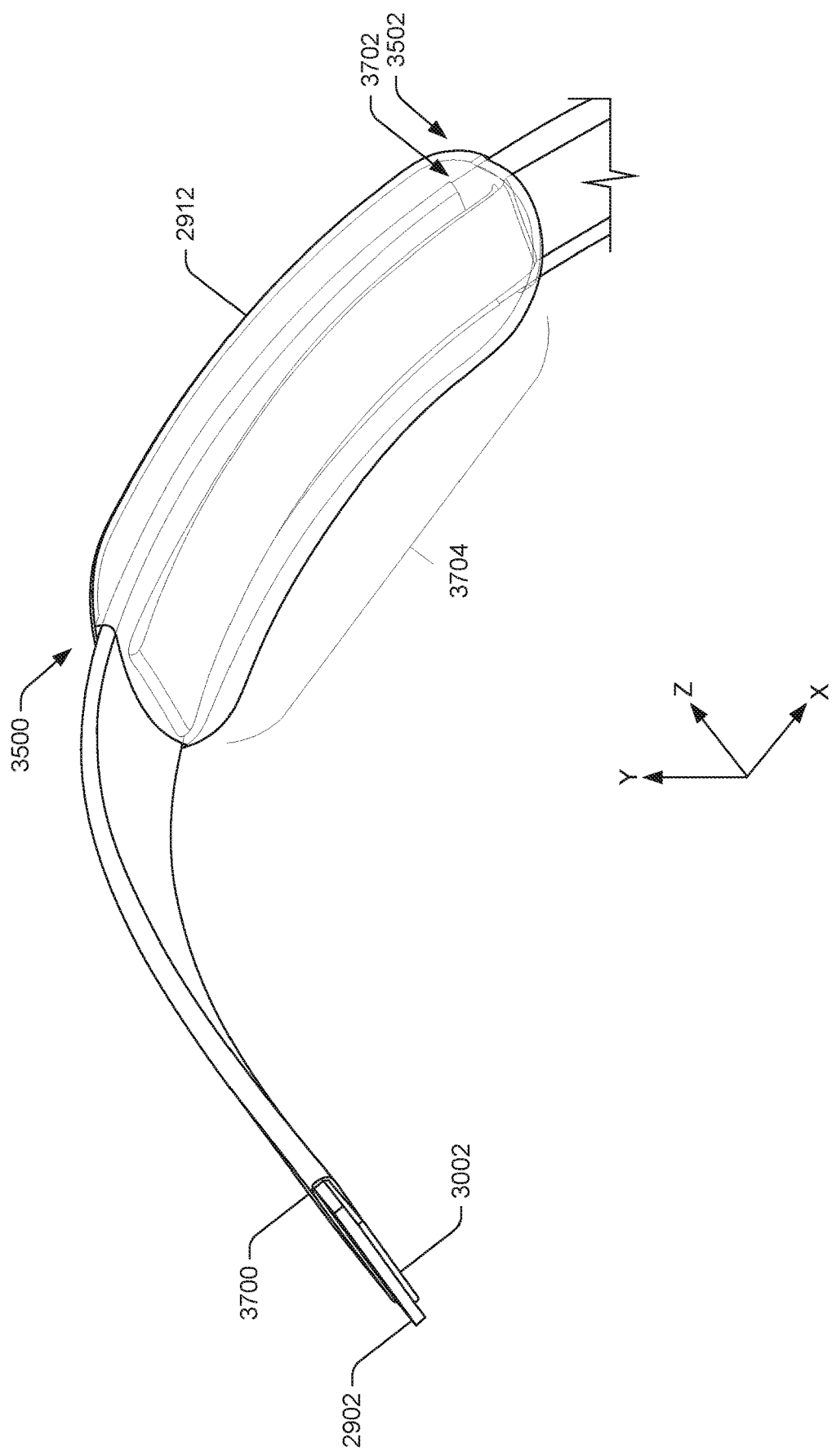
FIG. 37 illustrates an example member and a flexible printed circuit of the head-mounted display of FIG. 29, according to an embodiment of the present disclosure.

FIG. 37 illustrates the top member 2902, the sleeve 2912, and the FPC 3002. The sleeve 2912 is shown as transparent to illustrate the routing of the FPC 3002 within the sleeve 2912. In some instances, the FPC 3002 may couple to an underneath side of the top member 2902. Additionally, as discussed above, in some instances, the top member 2902 and/or the FPC 3002 may be disposed with a jacket 3700. The jacket 3700 may wrap over, around, and/or encase the top member 2902 and/or the FPC 3002, so as to couple the top member 2902 and/or the FPC 3002 together. The jacket 3700 may extend along a portion of the length of the top member 2902 and/or the FPC 3002. In some instances, the jacket 3700 may extend into the first end 3500 of the sleeve 2912.

The jacket 3700 may include an end 3702 at which the FPC 3002 exits the jacket 3700 and loops back in a direction towards the front 2904 of the HMD 2900. The FPC 3002 may include a service loop 3704 disposed within the sleeve 2912 and which provides slack to allow the FPC 3002 to extend and retract as the top member 2902 extends and retracts. In some instances, the service loop 3704 may remain within the sleeve 2912 as the top member 2902 extends and/or retracts. For example, in some instances, the jacket 3700 may couple to the sleeve 2912. After snaking through the sleeve 2912, the FPC 3002 may exit the sleeve 2912 at the second end 3502, at which point the FPC 3002 may couple to the top member 2902 and extend into the housing 3000.

To further illustrate, a first end of the FPC 3002 may couple adjacent to the first end 2908 of the top member 2902. The FPC 3002 may then couple to the top member 2902 and/or extend through the jacket 3700. In some instances, the FPC 3002 may exit the jacket 3700 at the end 3702 of the jacket 3700, at which point the FPC 3002 may extend in a direction towards the front 2904 of the HMD 2900 before looping back and extending in a direction towards the back 2906 of the HMD 2900 (i.e., thereby providing the service loop 3704). The FPC 3002 may then exit the sleeve 2912 and a second end of the FPC 3002 may communicatively couple to components within the housing 3000. In some instances, rather than the jacket 3700 including an end, the jacket 3700 may include a slit, or slot, through which the FPC 3002 exits (and/or reenters) to create the service loop 3704.

In some instances, portions of the top member 2902 and/or the FPC 3002 exiting the second end 3502 may also be disposed in a jacket, or other sheath, to further provide the HMD 2900 with an aesthetic appearance. Furthermore, while the above discussion is with regard to the sleeve 2912 being a separate component or features as the housing 3000, in some instances, the sleeve 2912 may be integrally formed with the housing 3000.

Figure 38:
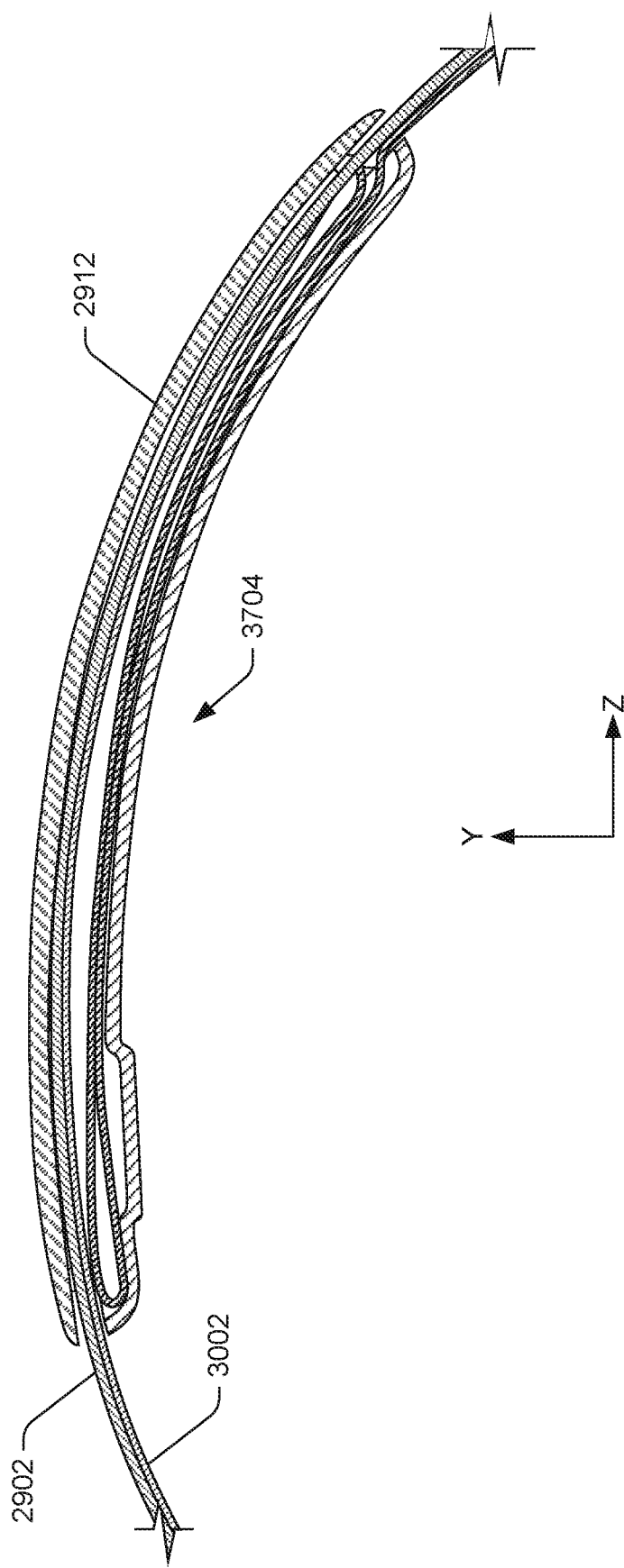
FIG. 38 is a cross-sectional view of the head-mounted display of FIG. 29, taken along line A-A of FIG. 34, showing the member and the flexible printed circuit, according to an embodiment of the present disclosure.

FIG. 38 illustrates a cross-sectional view of portions of the HMD 2900, taken along line A-A of FIG. 34. As shown, the FPC 3002 may loop within the sleeve 2912, to provide the service loop 3704. The sleeve 2912 may include an area, or chamber, for the FPC 3002 to loop back towards the second end 3502 of the sleeve.

Figure 39:
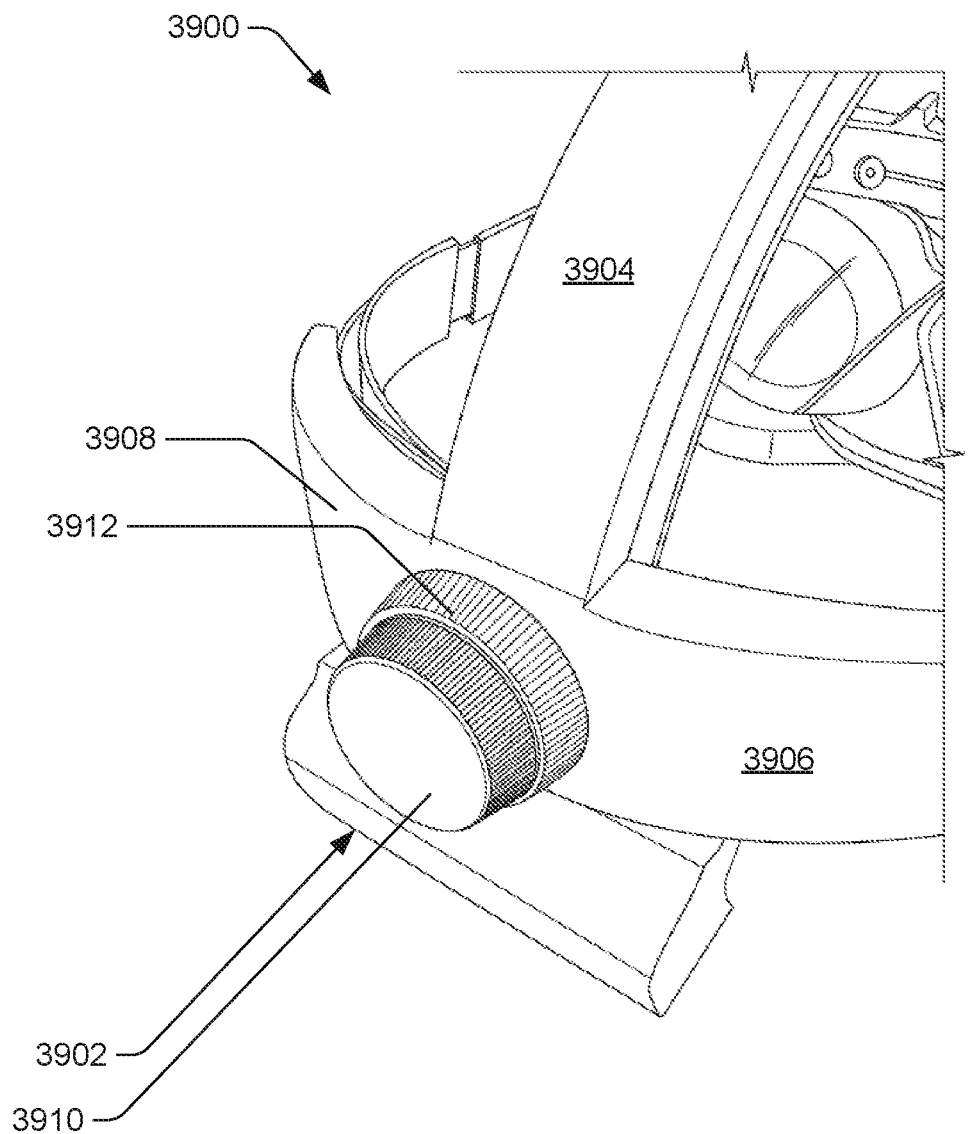
FIG. 39 illustrates a perspective view of an example head-mounted display, according to an embodiment of the present disclosure.

FIG. 39 illustrates a HMD 3900 having a single knob 3902 disposed at a back of the HMD 3900. The single knob 3902 may engage with one or more members for tightening and loosening the HMD 3900 to the user. In some instances, the one or more members may engage with the single knob 3902 within a rear housing of the HMD 3900. For example, a top member may extend through a top sleeve 3904 and engage with the single knob 3902. Lateral members may extend through lateral sleeves 3906 and 3908 to engage with the single knob 3902. In such instances, the user may operate the single knob 3902 to control the tightening and loosening of the top member and the lateral members (e.g., via the single knob 3902 engaging with slots of the top member and the lateral members, respectively). In some instances, the lateral members may overlap within the rear housing to permit the lateral members to tighten and loosen (or extend and retract). The top member may spool, coil, or extend within other portions of the housing to permit the top member to tighten and loosen (or extend and retract).

In some instances, the single knob 3902 may be considered a dual concentric knob that includes multiple knobs or actuators for tightening and loosening the top member and the lateral members, respectively. For example, the single knob 3902 may include multiple knobs that are nestled or integrated within one another. FIG. 39, for example, illustrates that the single knob 3902 may include a first knob 3910 and a second knob 3912. In some instances, the first knob 3910 may be disposed in front of the second knob 3912. As shown, and in some instances, the second knob 3912 may include a larger diameter than the first knob 3910. In some instances, the first knob 3910 and the second knob 3912 may be concentric.

The first knob 3910 and the second knob 3912 may be independently actuatable in multiple directions for tightening and loosening the HMD 3900. For example, the first knob 3910 may engage with the top member and rotated in a first direction (e.g., clockwise) to tighten the HMD 3900, and rotated in a second direction (e.g., counterclockwise) to loosen the HMD 3900. The second knob 3912 may engage with lateral members and rotated in a first direction (e.g., clockwise) to tighten the HMD 3900, and rotated in a second direction (e.g., counterclockwise) to loosen the HMD 3900. In some instances, the first knob 3910 and the second knob 3912 may respectively engage with the top member and the lateral members inside a rear housing, the top sleeve 3904, and/or the lateral sleeves 3906 and 3908.

Figure 40:
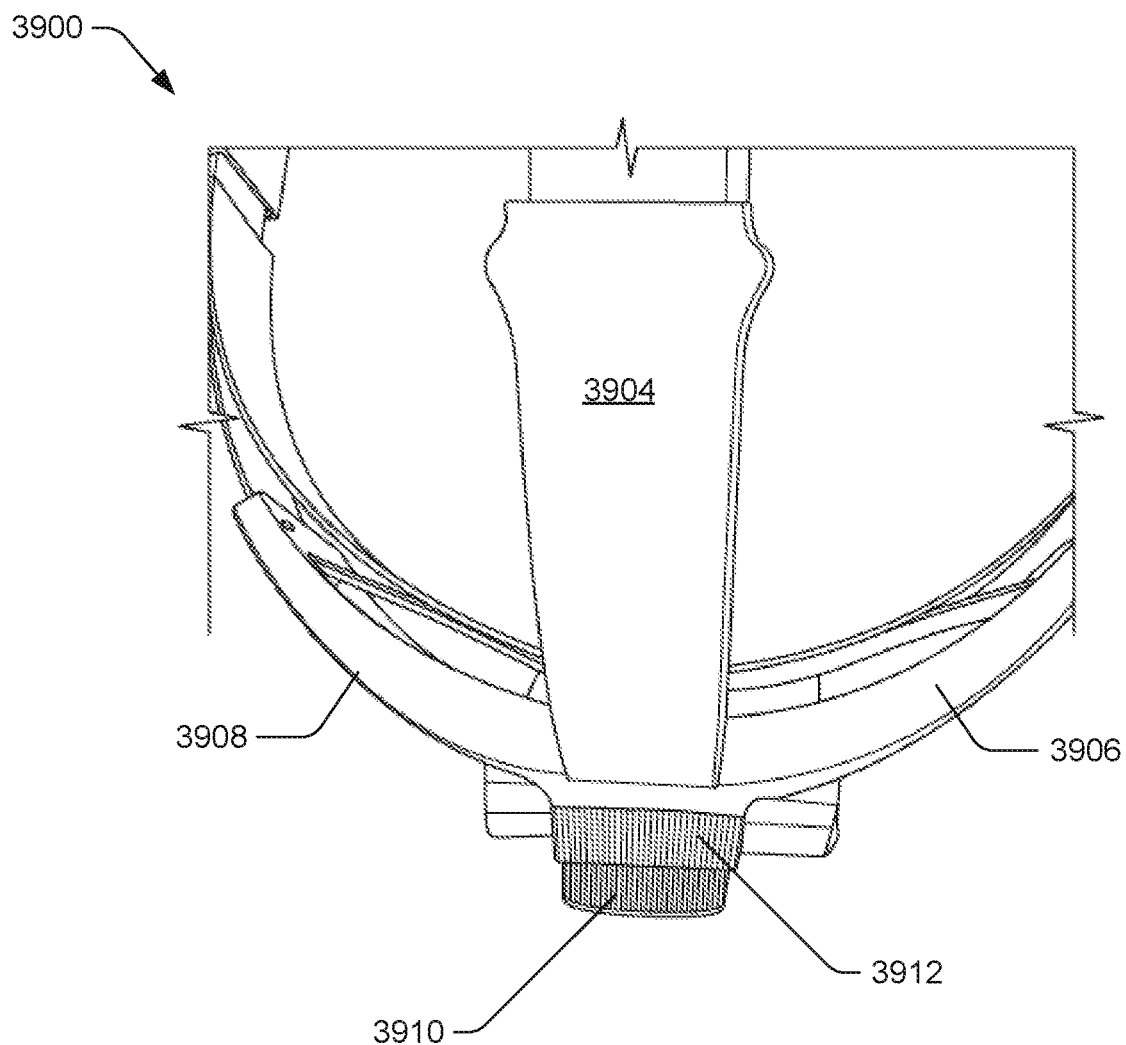
FIG. 40 illustrates a top view of the head-mounted display of FIG. 39, according to an embodiment of the present disclosure.

FIG. 40 illustrates a top view of the HMD 3900 of FIG. 39. As introduced above, the lateral sleeves 3906 and 3908 may route lateral members towards the back of the HMD 3900 for engaging with the single knob 3902. In some instances, the lateral members may engage with one of the first knob 3910 or the second knob 3912. Similarly, the top sleeve 3904 may route a top member towards the back of the HMD 3900 for engaging with the single knob 3902, or one of the first knob 3910 or the second knob 3912. As shown, the first knob 3910 may be disposed in front of the second knob 3912 (e.g., the second knob 3912 is disposed closed to the HMD 3900 or the rear housing) and the first knob 3910 and the second knob 3912 may be concentric.

Figure 41:
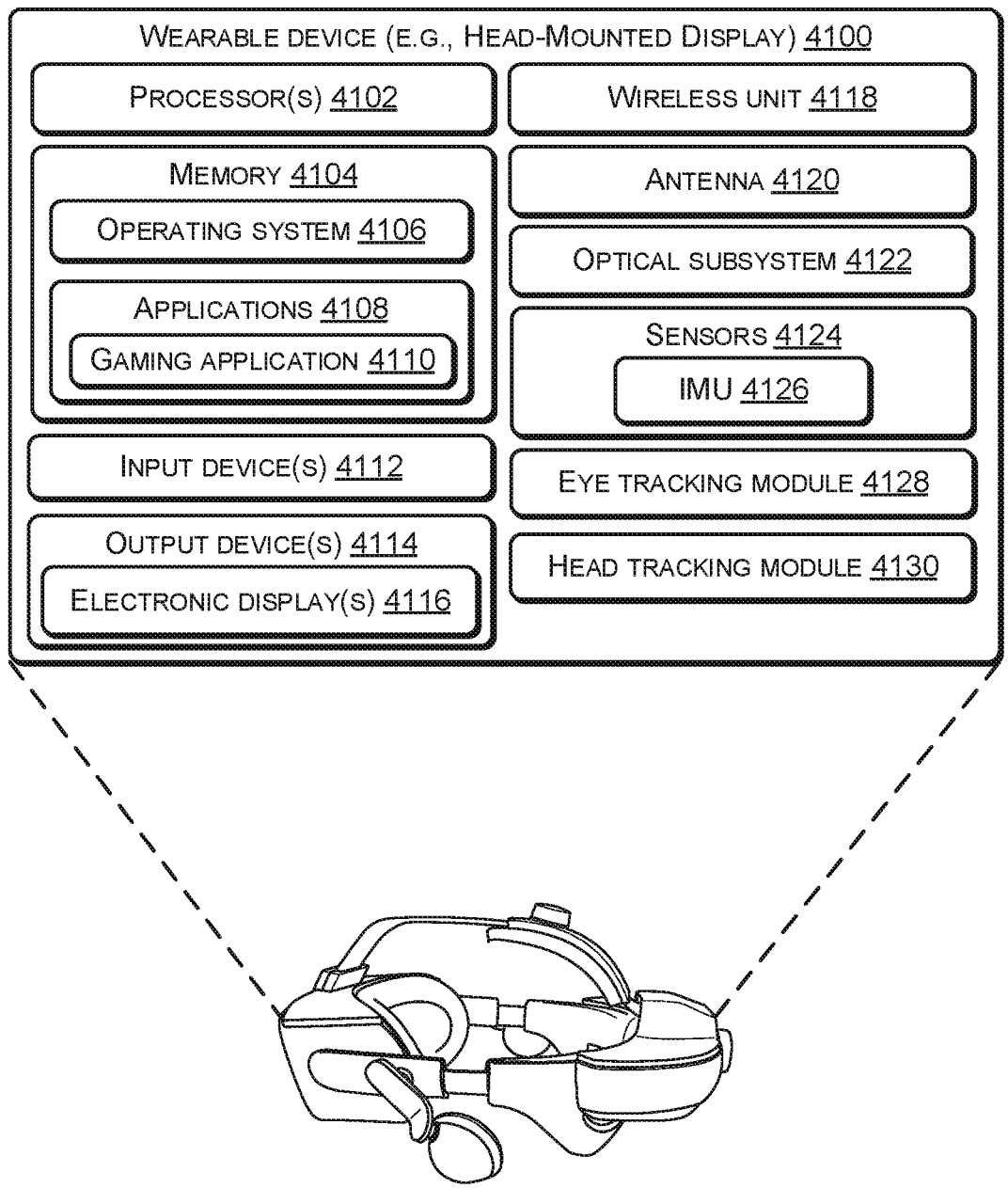
FIG. 41 illustrates example computing components of an example head-mounted display, according to an embodiment of the present disclosure.

FIG. 41 illustrates example components of a HMD 4100, such as a VR headset, according to the embodiments of the present disclosure. The HMD 4100 may represent, correspond, or be similar to, the HMD 100, the HMD 1400, the HMD 1600, the HMD 2200, the HMD 2300, and/or the HMD 2900 referenced herein and, therefore, the components of the HMD 4100 shown in FIG. 29 may be implemented in the HMD 100, the HMD 1400, the HMD 1600, the HMD 2200, the HMD 2300, the HMD 2900, and/or the HMD 3900.

In some instances, the HMD 4100 may be implemented as a standalone device worn by a user (e.g., on a head of the user) and may be head-mountable, such as by allowing the user to secure the HMD 4100 on his/her head and may be adjustable to accommodate varying users. In some embodiments, the HMD 4100 comprises a VR or AR headset that includes a near-eye or near-to-eye display(s).

The HMD 4100 may include one or more processors 4102 and memory 4104 (e.g., computer-readable media). In some implementations, the processors(s) 4102 may include a central processing unit (CPU), a graphics processing unit (GPU), both CPU and GPU, a microprocessor, a digital signal processor or other processing units or components known in the art. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 4102 may possess its own local memory, which also may store program modules, program data, and/or one or more operating systems.

The memory 4104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which may be accessed by a computing device. The memory 4104 may be implemented as computer-readable storage media ("CRSM"), which may be any available physical media accessible by the processor(s) 4102 to execute instructions stored on the memory 4104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information and which may be accessed by the processor(s) 4102.

In general, the HMD 4100 may include logic (e.g., software, hardware, and/or firmware, etc.) that is configured to implement the techniques, functionality, and/or operations described herein. The memory 4104 is shown including various modules, such as instruction, datastores, and so forth, which may be configured to execute on the processor(s) 4102 for carrying out the techniques, functionality, and/or operations described herein. A few example functional modules are shown stored in the memory 4104 and executable on the processor(s) 4102, although the same functionality may alternatively be implemented in hardware, firmware, or as a system on a chip (SOC), and/or other logic.

An operating system module 4106 may be configured to manage hardware within and coupled to the HMD 4100 for the benefit of other modules. In addition, in some instances the HMD 4100 may include one or more applications 4108 stored in the memory 4104 or otherwise accessible to the HMD 4100. In some instances, the application(s) 4108 includes a gaming application 4110. However, the HMD 4100 may include any number or type of applications. The gaming application 4110 may be configured to initiate gameplay of a video-based, interactive game (e.g., a VR game) that is playable by the user, and to output frames to be rendered on the display panels of the HMD 4100.

The HMD 4100 includes input device(s) 4112 and output devices 4114. The input devices 4112 may include control buttons. In some implementations, one or more microphones may function as the input devices 4112 to receive audio input, such as user speech. In some implementations, one or more cameras or other types of sensors (e.g., inertial measurement unit (IMU)) may function as the input devices 4112 to receive gestural input, such as a hand and/or head motion of the user. In some embodiments, additional input devices 4112 may be provided in the form of a keyboard, keypad, mouse, touch screen, joystick, and the like. In other embodiments, the HMD 4100 may omit a keyboard, keypad, or other similar forms of mechanical input. Instead, the HMD 4100 may be implemented relatively simplistic forms of the input device(s) 4112, a network interface (wireless or wire-based), power, and processing/memory capabilities. For example, a limited set of one or more input components may be employed (e.g., a dedicated button to initiate a configuration, power on/off, etc.) so that the HMD 4100 may thereafter be used. In one implementation, the input device(s) 4112 may include control mechanisms, such as basic volume control button(s) for increasing/decreasing volume, as well as power and reset buttons.

The output devices 4114 may include an electronic display(s) 4116, which may be the same as, or similar to, the display 108 described hereinabove. The output devices 4114 may further include, without limitation, a light element (e.g., LED), a vibrator to create haptic sensations, a speaker(s) (e.g., headphones), and/or the like. A light element (e.g., LED) to indicate a state such as, for example, when power is on.

The HMD 4100 may include a wireless unit 4118 coupled to one or more antennas 4120 to facilitate a wireless connection to a network. The wireless unit 4118 may implement one or more of various wireless technologies, such as Wi-Fi, Bluetooth, radio frequency (RF), and so on. However, the HMD 4100 may further include physical ports to facilitate a wired connection to a network, a connected peripheral device (including a PC, game console, etc.), or a plug-in network device that communicates with other wireless networks.

The HMD 4100 may include an optical subsystem 4122 that directs light from the electronic display(s) 4116 to eye(s) of a user using one or more optical elements. The optical subsystem 4122 may include various types and combinations of different optical elements, including, without limitations, such as apertures, lenses (e.g., Fresnel lenses, convex lenses, concave lenses, etc.), filters, and so forth. In some embodiments, one or more optical elements in the optical subsystem 4122 may have one or more coatings, such as anti-reflective coatings. Magnification of the image light by the optical subsystem 4122 allows the electronic display(s) 4116 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some instances, all of the FOV of the user. AR applications may have a narrower FOV (e.g., about 40 degrees FOV). The optical subsystem 4122 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to the electronic display(s) 4116 for display is pre-distorted, and the optical subsystem 4122 corrects the distortion when it receives image light from the electronic display(s) 4116 generated based on the content.

The HMD 4100 may further include one or more sensors 4124, such as sensors used to generate motion, position, and orientation data. The sensors 4124 may include gyroscopes, accelerometers, magnetometers, video cameras, color sensors, or other motion, position, and orientation sensors. The sensors 4124 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 4100 may include light sensors that are sensitive to light (e.g., infrared or visible light) that is projected or broadcast by base stations in the environment of the HMD 4100.

In an example, the sensors 4124 may include an inertial measurement unit (IMU) 4126. The IMU 4126 may be an electronic device that generates calibration data based on measurement signals received from accelerometers, gyroscopes, magnetometers, and/or other sensors suitable for detecting motion, correcting error associated with IMU 4126, or some combination thereof. Based on the measurement signals such motion-based sensors, such as the IMU 4126, may generate calibration data indicating an estimated position of the HMD 4100 relative to an initial position of the HMD 4100. For example, multiple accelerometers may measure translational motion (forward/back, up/down, left/right) and multiple gyroscopes may measure rotational motion (e.g., pitch, yaw, and roll). The IMU 4126 may, for example, rapidly sample the measurement signals and calculate the estimated position of the HMD 4100 from the sampled data. For example, the IMU 4126 may integrate measurement signals received from the accelerometers over time to estimate a velocity vector and integrates the velocity vector over time to determine an estimated position of a reference point on the HMD 4100. The reference point is a point that may be used to describe the position of the HMD 4100. While the reference point may generally be defined as a point in space, in various embodiments, reference point is defined as a point within the HMD 4100 (e.g., a center of the IMU 4126). Alternatively, the IMU 4126 provides the sampled measurement signals to an external console (or other computing device), which determines the calibration data.

As mentioned, in some embodiments, the sensors 4124 may include light sensors that are sensitive to light emitted by base stations in the environment of the HMD 4100 for purposes of tracking position and/or orientation, pose, etc., of the HMD 4100 in 3D space. The calculation of position and/or orientation may be based on timing characteristics of light pulses and the presence or absence of light detected by the sensors 4124.

The HMD 4100 may further include an eye tracking module 4128. A camera or other optical sensor inside the HMD 4100 may capture image information of eyes of the user, and the eye tracking module 4128 may use the captured information to determine interpupillary distance, interocular distance, a three-dimensional (3D) position of each eye relative to the HMD 4100 (e.g., for distortion adjustment purposes), including a magnitude of torsion and rotation (i.e., roll, pitch, and yaw) and gaze directions for each eye. In one example, infrared light is emitted within the HMD 4100 and reflected from each eye. The reflected light is received or detected by a camera of the HMD 4100 and analyzed to extract eye rotation from changes in the infrared light reflected by each eye. Many methods for tracking the eyes of the user 102 may be used by the eye tracking module 4128. In some instances, the eye tracking module 4128 may track up to six degrees of freedom of each eye (i.e., 3D position, roll, pitch, and yaw) and at least a subset of the tracked quantities may be combined from two eyes of the user to estimate a gaze point (i.e., a 3D location or position in the virtual scene where the user is looking). For example, the eye tracking module 4128 may integrate information from past measurements, measurements identifying a position of the head of the user, and 3D information describing a scene presented by the electronic display(s) 4116. Information for the position and orientation of the eyes of the user may be used to determine the gaze point in a virtual scene presented by the HMD 4100 where the user is looking.

The HMD 4100 may include a head tracking module 4130. The head tracking module 4130 may leverage one or more of the sensors 4124 to track head motion, including head rotation, of the user, as described above. For example, the head tracking module 4130 may track up to six degrees of freedom of the HMD 4100 (i.e., 3D position, roll, pitch, and yaw). These calculations may be made at every frame of a series of frames so that the application(s) 4108 may determine how to render a scene in the next frame in accordance with the head position and orientation. In some embodiments, the head tracking module 4130 is configured to predict a future position and/or orientation of the HMD 4100 based on current and/or past data. This is, because the application is asked to render a frame before the user actually sees the light (and, hence, the image) on the electronic display(s) 4116. During runtime, the head tracking module 4130 of the HMD 4100 may generate data about the position and pose of the HMD 4100 that is provided to the application in order to inform the application regarding how to render a next frame in the series of frames in accordance with position of the head position/pose of the user. This allows for rendering imagery within the image area(s) on the electronic display(s) 4116 in a way that makes the user believe he/she is looking around a virtual environment that includes objects (both static and moving objects), and these objects move within the scene in an expected manner along with the head movement of the user. Accordingly, frames be rendered based on this future prediction of head position and/or orientation that was made at an earlier point in time, such as roughly 25-30 milliseconds (ms) prior to rendering the frame. Rotation data provided by the head tracking module 4130 may be used to determine both direction of the HMD 4100 rotation, and amount of the HMD 4100 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 4100.

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A head-mounted display comprising:
a front including a display having a top, a bottom, a first side, and a second side opposite the first side;
a back including a rear actuator;
a first lateral member pivotably coupled to the first side of the display at a first end of the first lateral member and extending between the front of the head-mounted display and the back of the head-mounted display, the first lateral member including a second end operably engaged with the rear actuator to adjust a length of the first lateral member;
a second lateral member pivotably coupled to the second side of the display at a first end of the second lateral member and extending between the front of the head-mounted display and the back of the head-mounted display, the second lateral member including a second end operably engaged with the rear actuator to adjust a length of the second lateral member; and
a harness disposed at the back, the harness comprising:
a first portion configured to engage a head of a user above the occipital lobe, the first portion comprising one or more channels for the first lateral member and the second lateral member to extend into; and
a second portion configured to engage the head below the occipital lobe, wherein the rear actuator is disposed on the first portion of the harness.

2. The head-mounted display of claim 1, wherein the rear actuator comprises a rotatable knob having gears, and wherein:
the gears of the rear actuator are operable to engage one or more slots extending along a portion of the length of the first lateral member; and
the gears of the rear actuator are operable to engage one or more slots extending along a portion of the length of the second lateral member.

3. The head-mounted display of claim 1, wherein:
actuating the rear actuator in a first direction increases a gap distance interposed between the front of the head-mounted display and the back of the head-mounted display; and
actuating the rear actuator in a second direction decreases the gap distance interposed between the front of the head-mounted display and the back of the head-mounted display.

4. The head-mounted display of claim 1, wherein the back of the head-mounted display further includes a housing, and wherein the rear actuator is coupled to the housing.

5. The head-mounted display of claim 1, further comprising a flexible printed circuit (FPC) extending from the front to the back.

6. The head-mounted display of claim 1, further comprising a top member extending between the front and the back, the top member being adjustable in length.

7. The head-mounted display of claim 6, wherein the top member includes a first end coupled to the top of the display.

8. The head-mounted display of claim 1, wherein:
the rear actuator is actuatable to engage with the first lateral member at different positions along the length of the first lateral member; and
the rear actuator is actuatable to engage with the second lateral member at different positions along the length of the second lateral member.

9. A head-mounted display comprising:
a front including a display having a top, a bottom, a first side, and a second side opposite the first side;
a back including a rotatable actuator;
a first lateral member extending between the front and the back, the first lateral member including a first end pivotably coupled to the first side of the display and a second end operably coupled to the rotatable actuator, the first lateral member being adjustable in length via an actuation of the rotatable actuator;
a second lateral member extending between the front and the back, the second lateral member including a first end pivotably coupled to the second side of the display and a second end operably coupled to the rotatable actuator, the second lateral member being adjustable in length via the actuation of the rotatable actuator; and
a harness disposed at the back, the harness comprising:
a first portion configured to engage a head of a user above the occipital lobe, the first portion comprising one or more channels for the first lateral member and the second lateral member to extend into; and
a second portion configured to engage the head below the occipital lobe, wherein the rotatable actuator is disposed on the first portion of the harness.

10. The head-mounted display of claim 9, wherein:
the first lateral member is disposed along a first side of the head-mounted display; and
the second lateral member is disposed along a second side of the head-mounted display, the second side of the head-mounted display being opposite the first side of the head-mounted display.

11. The head-mounted display of claim 9, wherein at least one of:
the first lateral member includes first adjustable elements extending along a portion of a length of the first lateral member, the first adjustable elements being operable to engage the rotatable actuator; or
the second lateral member includes second adjustable elements extending along a portion of a length of the second lateral member, the second adjustable elements being operable to engage the rotatable actuator.

12. The head-mounted display of claim 11, wherein at least one of the first adjustable elements or the second adjustable elements comprise at least one of slots, notches, tabs, slits, or teeth.

13. The head-mounted display of claim 9, further comprising a top member extending between the front and the back, and wherein the top member is adjustable in length.

14. The head-mounted display of claim 13, wherein:
the top member includes a first end coupled to the top of the display.

15. The head-mounted display of claim 13, further comprising a pad coupled to the top member.

16. The head-mounted display of claim 9, further comprising:
a flexible printed circuit (FPC) extending from the front to the back.

17. The head-mounted display of claim 9, wherein the rotatable actuator comprises a rotatable knob having gears, and wherein:
the gears of the rotatable actuator are operable to engage one or more slots extending along a portion of a length of the first lateral member; and
the gears of the rotatable actuator are operable to engage one or more slots extending along a portion of a length of the second lateral member.

18. The head-mounted display of claim 9, wherein:
the head-mounted display is configured to increase a gap distance between the front and the back via actuating the rotatable actuator in a first direction; and
the head-mounted display is configured to decrease the gap distance between the front and the back via actuating the rotatable actuator in a second direction.

19. The head-mounted display of claim 9, wherein:
the rotatable actuator is actuatable to engage with the first lateral member at different positions along a length of the first lateral member; and
the rotatable actuator is actuatable to engage with the second lateral member at different positions along a length of the second lateral member.

20. A wearable display comprising:
a front;
a back;
a display disposed on the front, the display having a top, a bottom, a first side, and a second side opposite the first side;
an actuator disposed on the back;
a first lateral member extending from the front towards the back, wherein a first end of the first lateral member is pivotably coupled to the first side of the display, and wherein a second end of the first lateral member is engaged with the actuator;
a second lateral member extending from the front towards the back, wherein a first end of the second lateral member is pivotably coupled to the second side of the display, and wherein a second end of the second lateral member is engaged with the actuator; and
a harness disposed at the back, the harness comprising:
a first portion configured to engage a head of a user above the occipital lobe, the first portion comprising one or more channels for the first lateral member and the second lateral member to extend into; and
a second portion configured to engage the head below the occipital lobe, wherein the actuator is disposed on the first portion of the harness.

21. The wearable display of claim 20, wherein:
the actuator is engaged with the first lateral member along a portion of a length of the first lateral member; and
the actuator is engaged with the second lateral member along a portion of a length of the second lateral member.

22. The wearable display of claim 20, wherein:
the actuator is actuatable to engage with the first lateral member at different positions along a length of the first lateral member; and
the actuator is actuatable to engage with the second lateral member at different positions along a length of the second lateral member.

23. The wearable display of claim 20, wherein:
the wearable display is configured to increase a gap distance between the front and the back via actuating the actuator in a first direction; and
the wearable display is configured to decrease the gap distance between the front and the back via actuating the actuator in a second direction.

24. The wearable display of claim 20, wherein at least one of:
the actuator comprises a rotatable knob;
the first lateral member comprises at least one of slots, notches, tabs, or teeth that operably engage with the actuator; or
the second lateral member comprises at least one of slots, notches, tabs, or teeth that operably engage with the actuator.

25. The wearable display of claim 20, further comprising a top member extending between the front and the back, the top member being adjustable in length.

26. The wearable display of claim 25, wherein the top member includes a first end coupled to the top of the display.

27. The wearable display of claim 20, further comprising:
a housing disposed at the back.

28. The wearable display of claim 20, further comprising a wire routing assembly configured to transition between an extended state and a retracted state, the wire routing assembly including:
a housing having a first end, a second end, and a channel extending between the first end of the housing and the second end housing, the second end of the housing coupling to the back of the wearable display;
a slide at least partially disposed within the channel, the slide having a first end and a second end, the first end of the slide extending from the first end of the housing and coupling to the front, and wherein the slide is configured to telescopically extend from or retract into the housing to transition the wire routing assembly between the extended state and the retracted state; and
a wire extending from the first end of the slide to the second end of the housing.

29. The wearable display of claim 20, wherein the actuator comprises a rotatable knob having gears, and wherein:
the gears of the actuator are operable to engage one or more slots extending along a portion of a length of the first lateral member; and the gears of the actuator are operable to engage one or more slots extending along a portion of a length of the second lateral member.

\* \* \* \* \*